US010533768B2

(12) United States Patent
Mowris et al.

(10) Patent No.: US 10,533,768 B2
(45) Date of Patent: Jan. 14, 2020

(54) SMART FAN CONTROLLER

(71) Applicants: Robert J. Mowris, Olympic Valley, CA (US); John Walsh, Bozeman, MT (US)

(72) Inventors: Robert J. Mowris, Olympic Valley, CA (US); John Walsh, Bozeman, MT (US)

(*) Notice: Subject to any disclaimer, the term of this patent is extended or adjusted under 35 U.S.C. 154(b) by 0 days.

(21) Appl. No.: 16/005,666

(22) Filed: Jun. 11, 2018

(65) Prior Publication Data

US 2018/0292102 A1 Oct. 11, 2018

Related U.S. Application Data

(63) Continuation-in-part of application No. 15/144,806, filed on May 2, 2016, now Pat. No. 9,995,493, which
(Continued)

(51) Int. Cl.
*F24F 11/77* (2018.01)
*F24F 11/46* (2018.01)
(Continued)

(52) U.S. Cl.
CPC ............ *F24F 11/77* (2018.01); *F04D 27/004* (2013.01); *F24D 19/1084* (2013.01);
(Continued)

(58) Field of Classification Search
CPC ........ F24F 11/0001; F24F 11/46; F24F 11/77; F24D 19/1084; F04D 27/004; G05D 23/275
See application file for complete search history.

(56) References Cited

U.S. PATENT DOCUMENTS 2,394,920 A 2/1946 Kronmiller
3,415,309 A 12/1968 Fielder
(Continued)

OTHER PUBLICATIONS

Southern California Edison, Proctor Engineering Group, Ltd., Bevilacqua-Knight, Inc., Energy Performance of Hot Dry Air Conditioning Systems, Date: Jul. 2008. pp. 128, California Energy Commission (CEC), Sacramento, CA, USA.
(Continued)

*Primary Examiner* — Marc E Norman
(74) *Attorney, Agent, or Firm* — Kenneth L. Green; Averill & Green

(57) ABSTRACT

The efficient fan controller includes a microprocessor receiving at least one signal input from thermostat/equipment control terminals to control a fan relay to operate a system fan. The microprocessor monitors a thermostat call for cooling/heating duration and determines a variable fan-off delay based on the cooling/heating cycle duration, and at an end of a cooling/heating cycle energize the fan relay to operate the system fan for the variable fan-off delay. The fan controller avoids false thermostat activation signals and includes a common wire adapter to provide continuous power to a smart communicating thermostat and is configured to evaluate floating, zero, rectified, false positive and active input signals. The fan controller can be embodied on a forced-air-unit control board or thermostat. The fan controller installation methods ensure the system fan/blower operates at high speed for heating and cooling to improve thermal comfort, efficiency and satisfy the thermostat sooner to save energy.

50 Claims, 22 Drawing Sheets

Related U.S. Application Data is a continuation-in-part of application No. 14/168,503, filed on Jan. 30, 2014, now Pat. No. 9,328,933, which is a continuation-in-part of application No. 13/427,542, filed on Mar. 22, 2012, now Pat. No. 9,797,405, which is a continuation-in-part of application No. 13/085,119, filed on Apr. 12, 2011, now Pat. No. 8,763,920.

(60) Provisional application No. 61/324,229, filed on Apr. 14, 2010.

(51) Int. Cl.
*G05D 23/275* (2006.01)
*F24F 11/00* (2018.01)
*F24D 19/10* (2006.01)
*F04D 27/00* (2006.01)

(52) U.S. Cl.
CPC .......... *F24F 11/0001* (2013.01); *F24F 11/46* (2018.01); *G05D 23/275* (2013.01)

(56) References Cited

U.S. PATENT DOCUMENTS

| | | |
|---|---|---|
| 4,136,730 A | 1/1979 | Kinsey |
| 4,136,822 A | 1/1979 | Felter |
| 4,369,916 A | 1/1983 | Abbey |
| 4,773,587 A | 9/1988 | Lipman |
| 4,842,044 A | 6/1989 | Flanders |
| 4,897,798 A | 1/1990 | Cler |
| 5,142,880 A | 9/1992 | Bellis |
| 5,239,834 A | 8/1993 | Travers |
| 5,248,083 A | 9/1993 | Adams |
| 5,582,233 A | 12/1996 | Noto |
| 6,220,039 B1 | 4/2001 | Kensok |
| 6,464,000 B1 | 10/2002 | Kloster |
| 6,684,944 B1 | 2/2004 | Byrnes |
| 6,695,046 B1 | 2/2004 | Byrnes |
| 6,708,135 B2 | 3/2004 | Southworth |
| 7,240,851 B2 | 7/2007 | Walsh |
| 8,091,375 B2 | 1/2012 | Crawford |
| 8,195,313 B1 | 6/2012 | Fadell |
| 8,543,244 B2 | 9/2013 | Keeling |
| 8,600,561 B1 | 12/2013 | Modi |
| 8,630,742 B1 | 1/2014 | Stefanski |
| 9,091,453 B2 | 7/2015 | Matsuoka |
| 9,410,713 B2 | 8/2016 | Lau |
| 9,519,295 B2 | 12/2016 | Burton |
| 9,995,493 B2 * | 6/2018 | Mowris ............... F24D 19/1084 |
| 10,047,969 B2 | 8/2018 | Lau |
| 10,066,849 B2 | 9/2018 | Lau |
| 10,119,719 B2 | 11/2018 | Lau |
| 2004/0217182 A1 | 11/2004 | St. Jean |
| 2007/0057075 A1 | 3/2007 | Votaw |
| 2007/0262161 A1 | 11/2007 | Davies |
| 2008/0083834 A1 | 4/2008 | Krebs |
| 2009/0001179 A1 | 1/2009 | Dempsey |
| 2012/0232969 A1 | 9/2012 | Fadell |
| 2012/0233478 A1 | 9/2012 | Mucignat |
| 2013/0090767 A1 | 4/2013 | Bruck |
| 2013/0211783 A1 | 8/2013 | Fisher |
| 2013/0255297 A1 | 10/2013 | Matsuoka |
| 2014/0058806 A1 | 2/2014 | Guenette |
| 2015/0060557 A1 | 3/2015 | Lau |
| 2016/0223219 A1 | 8/2016 | Lau |
| 2017/0051925 A1 | 2/2017 | Stefanski |
| 2018/0038611 A1 | 2/2018 | Lau |
| 2018/0038651 A1 | 2/2018 | Lau |

OTHER PUBLICATIONS

Proctor Engineering Group, Ltd., Hot Dry Climate Air Conditioner Pilot Field Test, Emerging Technologies Application Assessment Report #0603, Date: Mar. 2, 2007, pp. 41, Pacific Gas & Electric Company (PG&E), San Francisco, CA, USA.

Proctor Engineering Group, Ltd., Hot Dry Climate Air Conditioner Pilot Field Test Phase II, Emerging Technologies Program Application Assessment Report #0724, Date: Feb. 8, 2008, pp. 39, Pacific Gas & Electric Company (PG&E), San Francisco, CA, USA.

Conant A., Proctor, A., Elberling, L., Field Tests of Specially Selected Air Conditioners for Hot Dry Climates, Published in the Proceedings of the 2008 ACEEE Summer Study on Energy Efficiency in Buildings, Asilomar, California, Date: Aug. 2008, pp. 14, American Council for an Energy Efficient Economy (ACEEE), Washington, DC, USA.

Proctor Engineering Group Ltd., Concept 3™ Furnace Fan Motor Upgrade, Date: Oct. 1, 2009, pp. 14, Published by Proctor Engineering Group Ltd., 65 Mitchell Blvd Ste 201, San Rafael, CA 94903, USA.

Mars Inc., Series 325 Mars solid state timers, Mars No. 32393 and 32378, Date: Sep. 4, 2007, pp. 1, Motors & Armatures, Inc. (MARS), 250 Rabro Drive East, Hauppauge, NY 11788, USA.

ICM Controls Inc., ICM 254 Post Purge Timers, Date: Oct. 2, 2007. pp. 1, ICM Controls Inc., 6333 Daedalus Drive, Cicero, N.Y. 13039, USA.

Proctor Engineering Group Ltd., California Air Conditioner Upgrade—Enhanced Time Delay Relay Residential, Work Paper WPPEGPGE0001, Date: May 18, 2008, pp. 15, Published by Proctor Engineering Group Ltd., 65 Mitchell Blvd. Suite 201, San Rafael, CA 94903, USA.

Proctor, J. Fan Controller for Extracting Evaporative Cooling from an Air Conditioning System, Date: Feb. 4, 2008, pp. 2, Electronic Filing Receipt for U.S. Appl. No. 61/026,058, John Proctor, 415 Mission Ave., San Rafael CA 94901, USA.

Proctor Engineering Group Ltd., Workpaper Extended Fan Time Delay Relay, Date: Feb. 9, 2007, pp. 7, Published by Proctor Engineering Group Ltd., 418 Mission Ave., San Rafael, CA 94901 USA.

Proctor Engineering Group Ltd., CheckMe!® Concept 3—Brush Free DC by McMillan Installation nstructions, Date: Dec. 31, 2008, pp. 7, Published by Proctor Engineering Group Ltd., 418 Mission Ave., San Rafael, CA 34901 USA.

Energy Federation Inc., Promo—Concept 3 High Efficiency Motor, Date: Jan. 29, 2009, pp. 3, Published by Energy Federation Inc., 40 Washington St, Westborough, MA 01581 USA.

Proctor Engineering Group Ltd., Promo—Concept 3 PEG Calif—Photo, Date: Dec. 31, 2008, p. 1, Published by Proctor Engineering Group Ltd., 418 Mission Ave., San Rafael, CA 94901, USA.

Proctor Engineering Group Ltd., Enhanced Time Delay Relay Installation Procedure, Date: Nov. 28, 2006, pp. 2, Published by Proctor Engineering Group Ltd., 418 Mission Ave., San Rafael, CA 94901, USA.

Proctor Engineering Group Ltd., Air Conditioner Enhanced Time Delay Relay (DelayRelayFactSheet 3-LR. pdf), Date: Dec. 31, 2007, pp. 2, Published by Proctor Engineering Group Ltd., 418 Mission Ave., San Rafael, CA 94901, USA.

Conant, A., Proctor Engineering Group, Ltd., California Climate Air Conditioner Upgrade—Enhanced Time Delay Measure Codes H796 Cooling Optimizer Program, Work Paper PGE3PHVC150 Enhanced Time Delay Relay Revision # 1, Date: May 5, 2014, pp. 36, Published by PG&E Customer Energy Solutions, San Francisco, CA, USA Available online at: http://deeresources.net/workpapers.

California Utilities Statewide Codes and Standards Team, Codes and Standards Enhancement (CASE) Initiative: Residential Refrigerant Charge Testing and Related Issues, 2013 California Building Energy Efficiency Standards, Date: Dec. 2011, pp. 51-61, Published by Pacific Gas and Electric (PG&E) Company, San Francisco, CA, USA.

Proctor, J., Hairrell, A., An Innovative Product's Path to Market. The influence of laboratory and field evaluations on adoption and implementation, Date: Aug. 2013, pp. 7-8, Published by the International Energy Program Evaluation Conference (IEPEC), Chicago, IL, USA.

Southern California Edison, "SCEData.xls," embedded Excel workbookRef2 on p. 28 of PG&E 2014 (Reference 16), Date: Dec.

(56) References Cited

OTHER PUBLICATIONS 5, 2007, pp. 5, Pacific Gas and Electric (PG&E) Company, San Francisco, CA, USA Available online at: http://deeresources.net/workpapers.
Carrier Corporation, "48ES-A Comfort 13 SEER Single-Packaged Air Conditioner and Gas Furnace System with Puron® ®-410A) Refrigerant Single and Three Phase 2-5 Nominal Tons (Sizes 24-60), 48ES-A Installation Instructions," Date: Sep. 2010, p. 23 (CARRIER 2010). Available online at: http://dms.hvacpartners.com/docs/1009/Public/0E/48ES-05SI.pdf.
Lux Products Corporation, "Electro-Mechanical Power Bridge Product" provides 24V AX power to thermostats in homes without C-wires. allows homes with 3 and 4 wire systems to use smart thermostats without requiring a new wire to be installed between furnace and thermostat. See https://pro.luxproducts.com/powerbridge/.
Honeywell International Inc., "Electro-Mechanical Wiresaver THP9045A1023/U Wiring Module" for Honeywell thermostats is a C-Wire Adapter for Wi-Fi thermostats or RedLINK 8000 series Honeywell thermostat models. See https://customer.honeywell.com/en-US/Pages/Product.aspx?cat=HonECC+Catalog&pid=thp9045a1023/U.
Ecobee Inc. "Electro-Mechanical EBPEK01 Smart SI Power Extender Kit" provides common wire for 5-wire thermostats if only 4 wires are available at existing thermostat. See https://support.ecobee.com/hc/en-us/articles/227874107-Installing-the-Power-Extender-Kit-withecobee-Si-thermostats.
Venstar, Inc. "Add-a-Wire™" in applications where additional wiring cannot be installed, the Add-A-Wire accessory can be used to add a wire to the thermostat. See https://venstar.com/thermostats/accessories/add-a-wire/.
Florida Solar Energy Center (FSEC) authored by Henderson, H., Shirey, D., Raustad, R., "Understanding the Dehumidification Performance of Air-Conditioner Equipment at Part-Load Conditions," Final Report FSEC-CR-1537-05, Date: Jan. 2006. See http://www.fsec.ucf.edu/en/publications/pdf/FSEC-CR-1537-05.pdf.

\* cited by examiner

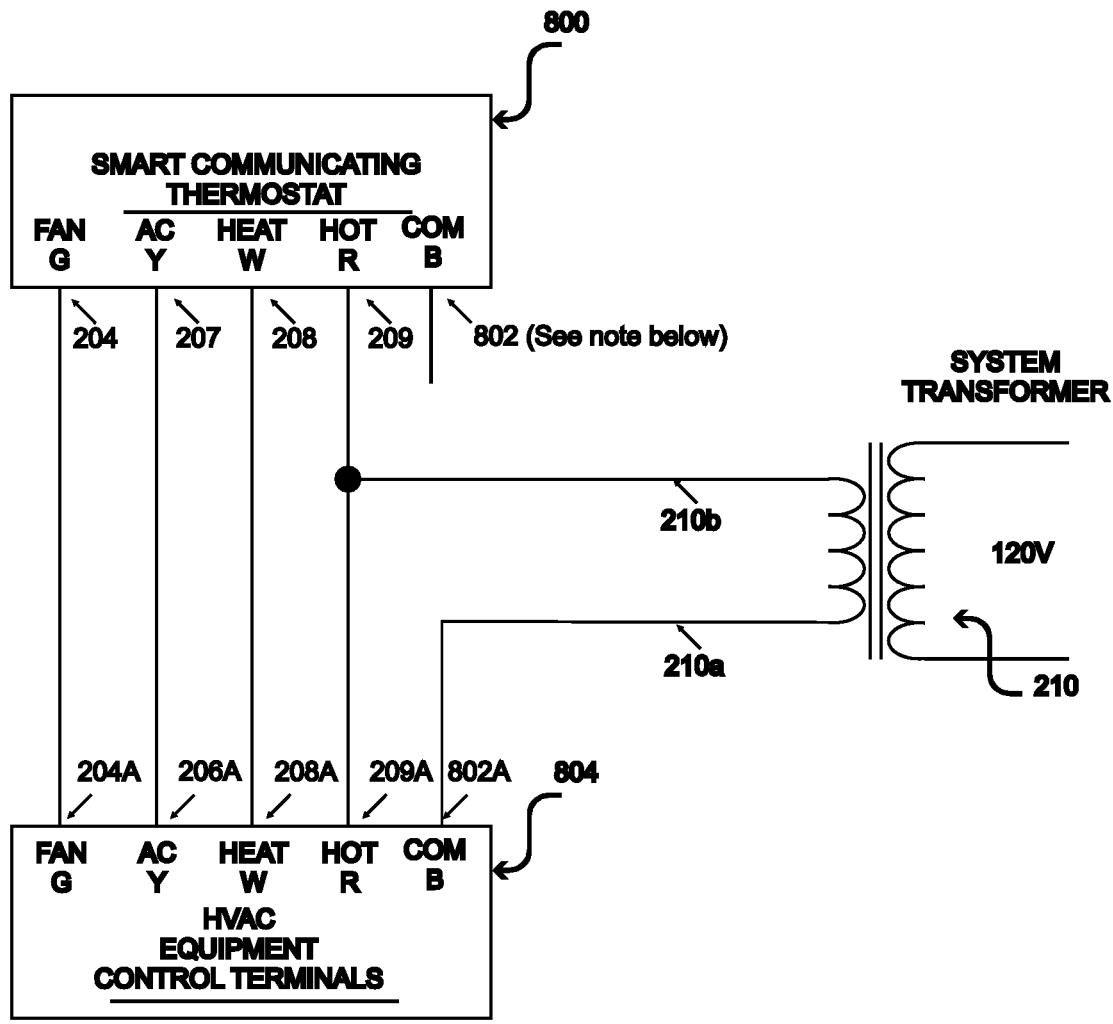

Note: Most pre-existing buildings do not provide a common wire at the thermostat. Prior art electro-mechanical products are available on the market to provide common wire functionality, but the prior art products are large and expensive costing $18 to $99 or 16 to 90% of the retail cost of Smart Communicating Thermostats. Therefore, an unresolved need exists for a low-cost product to meet this unresolved need.

*FIG. 13*

Internal elements of signal conditioning 308 (see FIGS. 5, 12, 16).
Signal conditioning element 308 converts active analog HVAC control signals to Zero VDC digital HVAC control signals, and converts inactive analog HVAC control signals to Non-zero VDC digital HVAC control signals.

SMART FAN CONTROLLER

CROSS-REFERENCE TO RELATED APPLICATIONS

The present application claims the priority of U.S. Provisional Patent Application Ser. No. 61/324,229 filed Apr. 14, 2010, and is a Continuation In Part of U.S. patent application Ser. No. 13/085,119 filed Apr. 12, 2011, and is a Continuation In Part of U.S. patent application Ser. No. 13/427,542 filed Mar. 22, 2012, and is a Continuation In Part of U.S. patent application Ser. No. 14/168,503 filed Jan. 30, 2014, and is a Continuation In Part of U.S. patent application Ser. No. 15/144,806 filed May 2, 2016, which applications are incorporated in their entirety herein by reference.

BACKGROUND OF THE INVENTION

The present invention relates to a Heating, Ventilation, Air Conditioning (HVAC) efficient fan controller device and in particular to an apparatus and methods for improving cooling or heating system energy efficiency.

Residential and commercial HVAC system power consumption in the United States accounts for 30% of average summer peak-day electricity loads, 14% of total electricity use, and 44% of total natural gas use, as reported by the US Energy Information Agency Residential and Commercial Energy Consumption Surveys from 2003 and 2009.

Known gas furnace central heating systems are controlled by thermostats which energize a relay to turn on the gas furnace heat source with a brief delay followed by turning on the heater ventilation fan at a lower fan speed than the higher fan speed used for cooling. Unfortunately, maintaining a lower heater ventilation fan speed often results in increased heat soak within the central heating unit and the portion of the heat generated by the heat source not delivered to conditioned space is lost to the environment. The heat loss increases the central heating unit operational time consuming more energy. Further, the amount of heat soak increases as the central heating unit is operated for longer periods of time leaving significantly more unrecovered energy and higher temperatures (i.e., 260 to 350 degrees Fahrenheit) in the heat exchanger after the heater ventilation fan is turned off. In most heating systems a significant portion of this unrecovered heating energy is wasted and lost to the environment after the heat source and the heater ventilation fan are tuned off.

Known direct-expansion cooling systems are controlled by thermostats which turn on a cooling ventilation fan when the cool source is energized and turn off the fan when the cool source is de-energized. When the cooling source is de-energized there is a significant amount of cold water condensed onto the evaporator coil which is not used to deliver sensible cooling capacity to the conditioned space and this sensible cooling capacity is lost to the environment after the cool source and the cooling ventilation fan are tuned off. This increases the cooling system operational time and energy use.

Known heat pump, electric resistance, and hydronic heating systems are controlled by thermostats which turn on the ventilation fan when the hydronic heat source is energized and turn off the fan when the heat source is de-energized. Hydronic heating and cooling systems circulate a liquid from a central location to a heat exchanger in a Forced Air Unit (FAU). Known heat pump and hydronic systems do not provide a fan-on delay. Nor do heat pump and hydronic systems provide a heating fan-off time delay due to lower heat exchanger temperatures of 130 to 180 degrees Fahrenheit which are 2 to 3 times lower than gas furnace heat exchanger temperatures. During the start-up period there is no useful heating delivered by the ventilation air which can waste fan energy and cause thermal comfort issues for building occupants. When the heat source is de-energized there is a significant amount of heating energy left in the heating coil which is not used to deliver heating capacity to the conditioned space and this heating capacity is lost to the environment after the heat source and the heating ventilation fan are tuned off. This increases the heat pump, electric resistance, or hydronic heating system operational time and energy use.

Known electro-mechanical devices are available in the market to provide a common wire at the thermostat, but these devices are large and expensive costing from $18 to $99 per unit which is 16 to 90% of the cost of the Smart Communicating Thermostat. Due to the larger size and expense, Smart Communicating Thermostat manufacturers are attempting to design around the problem of no common wire at the thermostat using power stealing, but this has caused numerous problems with loss of power and reliability causing Smart Communicating Thermostats not to function properly. Smart Communicating Thermostats must keep their batteries charged by drawing power through low-voltage wires connected to the Air Conditioning (AC) contactor, the gas valve, or the fan relay. This power stealing creates numerous problems for Heating Ventilating Air Conditioning (HVAC) system. First, the device from which the power is drawn can activate unintentionally or not activate. For example, the AC compressor can be turned on unintentionally when there is no call for cooling. The HVAC system can unintentionally activate a heating cycle, or the fan can come on when there is no call for the fan. During periods of high HVAC usage, such as very hot or very cold days, the battery can be drawn down during longer periods of heating or cooling. Since the heating or cooling cycle is frequent due to the outdoor temperature, the battery does not get a chance to re-charge and the HVAC system must shut down for a period of time until the battery charge is restored. This can cause building occupants to be uncomfortably hot with no AC during summer or cause building occupants to be uncomfortably cold with no heating during winter or cause water in a plumbing system to freeze causing water damage in the building.

U.S. Pat. No. 6,684,944 (Byrnes et al, 2004) and U.S. Pat. No. 6,695,046 (Byrnes et al, 2004) disclose a variable speed fan motor control for forced air heating/cooling systems using an induction-type fan motor controlled by a controller circuit which is operable to continuously vary the speed of the fan motor during a start-up phase and a shut-down phase of the heating and/or cooling cycle. The controller circuit includes temperature sensors which are operable to control start-up and shutdown of the fan motor over continuously variable speed operating cycles in response to sensed temperature of the air being circulated by the fan. Byrnes teaches control of the heater fan from low to high speed but the high speed is limited specifically to the motor speed used for heating which is low, medium, or medium high and not the motor's high speed used for cooling. Byrnes' patents do not include a method or a fan relay to energize the high speed used for cooling after a short time period when the heat exchanger has reached its maximum temperature to deliver more heating output to satisfy the thermostat temperature sooner and save heat source energy. Brynes' does not teach a variable fan-off time delay based on AC compressor or heat source operational time.

U.S. Pat. No. 4,369,916 (Abbey 1983) discloses a 120 VAC heating or cooling system fan override relay control to immediately start the blower to circulate air when the heating or cooling element turns on and continue to operate the override for a fixed timed interval by a time delay relay after the heating or cooling element turns off. U.S. Pat. No. 4,369,916 teaches starting the blower fan instantly when the heating element is turned on and not waiting for the heat exchanger to reach maximum temperature before turning the fan from the low speed used for heating to the high speed used for cooling. U.S. Pat. No. 4,369,916 does not vary the fan-off time delay based on air conditioning compressor or heat source operational time.

U.S. Pat. No. 6,464,000 (Kloster 2002) discloses is a temperature controlled device for a two-stage furnace: 1) low fan speed for low heat mode, and 2) higher fan speed for high heat mode. The higher fan speed is limited to available heater fan speeds; not the high speed used for cooling. U.S. Pat. No. 6,464,000 does not provide instructions for a variable fan-off time delay based on heat source operational time and does not provide instructions to initially operate the heater fan at the low speed used for heating and switch to the high speed used for cooling after the heat exchanger has reached maximum temperature.

U.S. Pat. No. 5,248,083 (Adams 1993) discloses an adaptive furnace controller using analog temperature sensing to maintain a constant preselected heat exchanger temperature (i.e., 120 Fahrenheit) during operation and operates the fan time delay until a fixed lower heat exchanger temperature(i.e. 90 Fahrenheit) is reached. The adaptive furnace control regulates a controllable valve to adjust burner firing rate, thereby holding heat exchanger operating temperature constant to create constant on/off times based on the previous cycle on/off times of the furnace by regulating circulation blower speed. By increasing blower speeds to shorten "on" times or decreasing blower speeds to increase "on" times, and thereby achieving optimum cycle times.

ICM Controls, Inc. (www.icmcontrols.com) has manufactured on delay/off delay controls for HVAC circulating fans for more than 25 years. The ICM fan delays connect between the fan "G" terminal of a thermostat to an HVAC fan relay used to energize the HVAC fan, but the on delay/off delay are fixed time delays and only have one input and one output to interrupt and control the fan. The present invention monitors the fan "G" signal as a proxy for AC compressor operation and varies the extended fan-off time delay for cooling based on AC compressor operational time.

U.S. Pat. No. 5,142,880 (Bellis, 1992) discloses a solid state control circuit for use in connection with existing low-voltage thermostat terminals of a split-system or packaged HVAC system having a refrigerant system compressor and condenser with outdoor fan and an evaporator and gas-fired furnace or electrical heating elements with indoor blower fan. The U.S. Pat. No. 5,142,880 patent relates generally to systems for increasing the efficiency of air conditioning units by continuing the blower run time after the compressor is turned off. Specifically, the U.S. Pat. No. 5,142,880 patent claims an air conditioning control unit comprising a low voltage room thermostat fan terminal, a low voltage compressor relay terminal, a timing circuit means, a sensitive gate triac, and a power triac. The U.S. Pat. No. 5,142,880 patent also claims a method for controlling the on-off time of an indoor fan that is controlled by and associated with an indoor thermostat for a room air conditioning system. The apparatus of the U.S. Pat. No. 5,142,880 patent is not programmable or adaptable. It does not have a fixed delay from one system to another. The delay is related to the supply voltage, which varies from system to system. Bellis provides constant current to the triac gates on the order of 6 milliamps. The total current draw is even higher than that when all components are included. Many systems have do not accommodate this much current draw through control relays without causing a humming noise which irritates the user. The Bellis design momentarily de-energizes the relay when switch from thermostat driven fan to his delay. This can cause relay chatter and excessive wear. Bellis does not provide for an override function if the unit fails. The Bellis design is a "fixed" delay. Bellis does not disclose a variable fan-off time delay based on air conditioning compressor or heat source operational times or increasing the heater fan speed from the low speed used for heating to the high speed used for cooling after the heat exchanger has reached the approximate maximum temperature.

U.S. Pat. No. 5,882,233 (Noto '233) teaches of a device used to extend the fan run time and also periodically activate the fan during times the system is not calling for heating or cooling. Noto requires the circuit to have access to the 24 VAC signals from the AC transformer. This requirement precludes his device from being connected directly to the thermostat since most thermostats do not have both the hot and neutral legs of the transformer. Household wiring only provides the hot (red) signal to the transformer. Although Noto teaches of a range of delays, his invention uses fixed times for the delays. The delays in Noto's invention are not based on the duration of the air conditioning compressor or heat source operational time.

U.S. Pat. No. 4,842,044 (Flanders et al., 1989) provides a heating and cooling control system that works by energizing a fan or other fluid circulating device to circulate fluid and effect thermal transfer of energy from the fluid to the spaces being heated and by de-energizing the circulating means at a selected time interval after de-energization of the heating and control system. The U.S. Pat. No. 4,842,044 patent also claims a heating control system comprising a switching means to effect energization of the fluid circulating means, a switching control means that is energizable in response to operation of the control circuit, and an additional circuit means that energizes the switching control means a selected time interval after de-energization of the heating system. The U.S. Pat. No. 4,842,044 patent is intended to increase the time the fan is turned on after a heating cycle to improve energy efficiency. The device draws power continuously from the gas solenoid through a 680 ohm resistor, and this method has proven to be problematic in practice. Too much current drawn in this way, can cause a humming noise in the gas valve and false operation. The U.S. Pat. No. 4,842,044 patent also enables the fan relay to activate the blower as soon as the gas valve is activated. This results in cool air being circulated throughout the home since the plenum is not sufficiently warm. Normal heat operation retards the blower until the temperature in the plenum reaches a preset operating temperature. The U.S. Pat. No. 4,842,044 patent also requires the addition of a relay circuit. This relay must be active the entire time the fan is to be off, creating a significant current draw even when the system is in not calling for heating or cooling. The U.S. Pat. No. 4,842,044 patent also describes fixed delays. It has no way to adapt the fan delay times either by user input or by the compressor run time. The delays provided by the U.S. Pat. No. 4,842,044 patent are also subject to the variations of the components selected. Additionally, although Flanders touches on the subject of how his invention works when the fan switch on the thermostat is moved from the AUTO position to the ON position, as described, there is no way for the fan to come on when the occupant requests.

U.S. Pat. No. 4,136,703 (Kinsey '703) teaches of a device that intervenes with the controls coming from a thermostat and going to the heating/cooling system. The U.S. Pat. No. 4,136,703 patent discloses a fixed upper limit to the time that the compressor or heating source can be activated and then his invention adds additional time to the blower fan. This activity can increase the efficiency of an air conditioner system by allowing a certain amount of water to condense on the evaporator coil and then re-evaporating this water to cool the home. The amount of water collected will vary based on the humidity of the ambient air. Having a fixed compressor run time with a fixed blower time can create a less efficient system than the current invention. In many environments, limiting the compressor run time and counting on evaporative cooling to reduce the home's temperature will increase the time required to cool the home. In many cases, the desired set point may never be achieved.

U.S. Pat. No. 7,240,851 (Walsh '851) teaches about a furnace fan timer. The Walsh '851 device is a timer with a user programmable interval and duration. The device runs continuously in a never ending loop counting down minutes before operating the fan and then counting the minutes to keep the fan activated. Walsh's device is not compatible with air conditioner systems. Most thermostats connect the fan switch to the air conditioner compressor switch when operating in the automatic fan mode. In systems with air conditioners, Walsh's invention will activate the air conditioner compressor when it turns on the fan. This requires users to turn off the circuit breakers for their air conditioner systems when using his device. Walsh's invention has two interchangeable wire connections.

U.S. Pat. No. 2,394,920, (Kronmiller '920 assigned to Honeywell) teaches of an HVAC thermostat device to control room temperatures using a pair of thermally responsive bimetallic strips mounted within a circular-shaped housing to control space cooling or heating equipment using low voltage signals. U.S. Pat. No. 7,140,551 (de Pauw '551 assigned to Honeywell) teaches of a similar HVAC thermostat device with a simplified user interface and circular-shaped housing to control space cooling or heating equipment using low voltage signals. U.S. Pat. Nos. 2,394,920 and 7,140,551 provide no instructions about how to monitor the fan, AC compressor, or heat source to provide a variable fan-off time delay to recover and deliver useful cooling and heating energy otherwise wasted. The prior patents do not teach about increasing heater fan speed from the low speed used for heating to the high speed used for cooling.

Non-patent publication published by SOUTHERN CALIFORNIA EDISON and authored by PROCTOR ENGINEERING GROUP, LTD., BEVILACQUA-KNIGHT, INC., "Energy Performance of Hot Dry Air Conditioning Systems," Report Number CEC-500-2008-056, July 2008, Pages 15, 50, 65-66, California Energy Commission, Sacramento, Calif. USA (CEC '056). Available online at: http://www.energy.ca.gov/2008publications/CEC-500-2008-056/CEC-500-2008-056.PDF. Pages 65 and 66 of the CEC '056 non-patent publication provides laboratory test data performed by Southern California Edison (SCE) of a latent recovery method where the fan operates continuously and the compressor is paused or turned off intermittently which is referred to as a Compressor Pause Mode (CPM) on page 2 of the PG&E #0603 non-patent publication discussed below. CEC '056 describes the latent recovery method as "cooling energy . . . stored as moisture removal" which "will be lost down the condensate drain unless it is recovered at the end of the compressor cycle."

Non-patent publication published by PACIFIC GAS & ELECTRIC (PG&E) and authored by PROCTOR ENGINEERING GROUP, LTD., "Hot Dry Climate Air Conditioner Pilot Field Test," Emerging Technologies Application Assessment Report #0603. Date: Mar. 2, 2007, Pages 41, Pacific Gas & Electric (PG&E) Company, San Francisco, Calif., USA (PG&E #0603). Available online at: http://www.etcc-ca.com/reports/hot-dry-climate-air-conditioner-pilot-field-test. The PG&E #0603 non-patent publication discloses two latent recovery methods: 1) Compressor Pause Mode; and 2) optimal fixed fan-off delays for different climate zones with high, medium, or low speed fan during the fan-off delays. Variable speed fan motor operation during fan-off delays was disclosed by Byrnes in U.S. Pat. No. 6,684,944 issued on Feb. 3, 2004 and U.S. Pat. No. 6,695,046 issued Feb. 24, 2004.

Non-patent publication published by PACIFIC GAS & ELECTRIC (PG&E) and authored by PROCTOR ENGINEERING GROUP, LTD., "Hot Dry Climate Air Conditioner Pilot Field Test Phase II, Emerging Technologies Program Application Assessment Report #0724," Date: Feb. 8, 2008, Pages 39, PG&E Company, San Francisco, Calif., USA, (PG&E #0724). Available online at: https://newbuildings.org/sites/default/files/PGE_2008_Pilot_Field_Test_Report.pdf. The PG&E #0724 non-patent publication discloses optimal fixed fan-off delays for various AC operating times in different climate zones where the fan is operated at high, medium, or low speed fan operation during the fan delay using a variable speed Electronically Commutated Motor (ECM). Variable speed fan motor operation during fan-off delays was disclosed by Byrnes in U.S. Pat. No. 6,684,944 issued on Feb. 3, 2004 and U.S. Pat. No. 6,695,046 issued Feb. 24, 2004.

Non-patent publication published by American Council for an Energy Efficient Economy (ACEEE) and authored by ABRAM CONANT, JOHN PROCTOR, LANCE ELBERLING, "Field Tests of Specially Selected Air Conditioners for Hot Dry Climates," Published in the Proceedings of the 2008 ACEEE Summer Study on Energy Efficiency in Buildings, Asilomar, Calif., Date: August 2008, Pages 14, American Council for an Energy Efficient Economy, 529 14th Street NW, Suite 600, Washington, D.C. 20045 USA (Conant 2008). Available online at: http://aceee.org/files/proceedings/2008/data/papers/1_537.pdf. The Conant 2008 non-patent publication discloses potential energy efficiency improvements from fixed fan-off time delays for various air conditioning operating times using a variable-speed brushless DC fan motor to operate the fan at a lower speed during the fan-off delay. Variable speed fan motor operation during fan-off delays was disclosed by Byrnes in U.S. Pat. No. 6,684,944 issued on Feb. 3, 2004 and U.S. Pat. No. 6,695,046 issued Feb. 24, 2004.

Non-patent unpublished report authored by PROCTOR ENGINEERING GROUP, LTD., "Concept 3™ Furnace Fan Motor Upgrade," Prepared by Proctor Engineering Group. Date: Oct. 1, 2009. Pages 14. Published by Proctor Engineering Group Ltd., 65 Mitchell Blvd Ste 201, San Rafael, Calif., 94903. (Proctor 2009). The Proctor 2009 unpublished report discloses a method of controlling a variable speed fan motor to provide a cooling fan-off delay. Variable speed fan motor operation during fan-off delays was disclosed by Byrnes in U.S. Pat. No. 6,684,944 issued on Feb. 3, 2004 and U.S. Pat. No. 6,695,046 issued Feb. 24, 2004.

Non-patent publication published by MOTORS AND ARMATURES (MARS) Inc., SERIES 325 MARS Solid State Timers, MARS number 32393 and 32378, Date: Sep. 4, 2007, Pages 1, Published by Motors & Armatures, Inc. (MARS), 250 Rabro Drive East, Hauppauge, N.Y. 11788, USA (Mars 2007). MARS describes two fan-off delay relay controls: 1) MARS 32393 and 2) MARS 32377. Available online: www.marsdelivers.com. MARS 32393 provides a fixed 2-minute fan-off delay and is installed between the fan "G" terminal of a thermostat and the HVAC fan relay used to energize the HVAC fan. MARS 32393 and 32377 connect to both sides of the system transformer, hot and neutral, and use a single input and a single output. MARS 32377 provides a knob on the front of the device for the user to select a fixed fan-off delay time from 0 to 360 seconds.

Non-patent unpublished report authored by PROCTOR ENGINEERING GROUP, LTD., "California Air Conditioner Upgrade—Enhanced Time Delay Relay—Residential, Work Paper WPPEGPGE0001," Date: May 18, 2008, Pages 15, Provided to me on Oct. 12, 2017 by Proctor Engineering Group Ltd., 65 Mitchell Blvd. Suite 201, San Rafael, Calif. 94903, USA (Proctor 2008). The Proctor 2008 non-patent unpublished report was not disseminated or made available to the extent that persons interested and ordinarily skilled in the subject matter or art, exercising reasonable diligence, could locate the reference. Proctor 2008 describes a cooling fan-off delay Enhanced Time Delay (ETD) product providing a fan-off delay with a variable speed Electronically Commutated Motor (ECM or a fixed speed Permanent Split Capacitance (PSC) motor. Data provided in the Proctor 2008 workpaper are for continuous high speed fan operation and intermittent compressor operation (i.e., variable compressor "ON" and "OFF" times) per the Compressor Pause Mode (CPM) method disclosed on page 21 of the PG&E #0603 and FIG. 48 (p. 66) of CEC '056. Variable fan speed operation during fan-off delays was disclosed by Byrnes in U.S. Pat. No. 6,684,944 issued on Feb. 3, 2004 and U.S. Pat. No. 6,695,046 issued Feb. 24, 2004.

Non-patent unpublished report authored by PROCTOR ENGINEERING GROUP, LTD., "Workpaper Extended Fan Time Delay Relay," Date: Feb. 9, 2007, Pages 7, Prepared by Proctor Engineering Group Ltd., 418 Mission Ave., San Rafael, Calif. 94901 USA (Proctor 2007). Proctor 2007 was not disseminated or made available to the extent that persons interested and ordinarily skilled in the subject matter or art, exercising reasonable diligence, could locate the reference. Data provided in the Proctor 2007 workpaper are for continuous high speed fan operation and intermittent compressor operation per the CPM method disclosed on page 21 of the PG&E #0603 and FIG. 48 (p. 66) of CEC '056. Proctor 2007 suggests that a fixed time delay is optimal (i.e., "5-minute time delay is closer to optimum" and "energy savings for ECM units with low speed are double the PSC savings"). No information is provided in Proctor 2007 to define any relationship between the fan-off delay "tail" and the AC compressor cycle length. Variable fan speed operation during fan-off delays was disclosed by Byrnes in U.S. Pat. No. 6,684,944 issued on Feb. 3, 2004 and U.S. Pat. No. 6,695,046 issued Feb. 24, 2004.

Non-patent unpublished instructions authored by PROCTOR ENGINEERING GROUP, LTD., "CheckMe!® Concept 3—Brush Free DC by McMillan Installation Instructions," Dated: Dec. 31, 2008, Pages 7, Prepared by Proctor Engineering Group Ltd., 418 Mission Ave., San Rafael, Calif. 94901 USA (Proctor 2008a). The Proctor 2008a installation manual is currently available online at: https://www.proctoreng.com/dnld/Concept3_Installation_forCM.pdf. However, the Proctor 2008a was not disseminated or made available to the extent that persons interested and ordinarily skilled in the subject matter or art, exercising reasonable diligence, could locate the reference. Concept 3 motor installation manual describes a variable speed fan motor operating at low speed during fan-off delay. Variable fan speed operation during fan-off delays was disclosed by Byrnes in U.S. Pat. No. 6,684,944 issued on Feb. 3, 2004 and U.S. Pat. No. 6,695,046 issued Feb. 24, 2004.

Non-patent unpublished advertising flier authored by ENERGY FEDERATION INC. (EFI), "Promo—Concept 3 High Efficiency Motor," Date: Jan. 29, 2009, Pages 3, Prepared by Energy Federation Inc. (EFI), 40 Washington St, Westborough, Mass. 01581 USA (EFI 2009). EFI 2009 is a promotional flier for a variable speed motor operating at low speed during fan-off delays which was disclosed by Byrnes in U.S. Pat. No. 6,684,944 issued on Feb. 3, 2004 and U.S. Pat. No. 6,695,046 issued Feb. 24, 2004.

Non-patent unpublished flier authored by PROCTOR ENGINEERING GROUP, LTD., "Promo—Concept 3 PEG Calif—Photo," Date: Nov. 4, 2008, Page 1, Proctor Engineering Group Ltd., 418 Mission Ave., San Rafael, Calif. 94901 USA (Proctor 2008b). Proctor 2008b is a promotional flier for a variable speed motor operating at low speed during fan-off delays. Variable speed fan motor operation during fan-off delays was disclosed by Byrnes in U.S. Pat. No. 6,684,944 issued on Feb. 3, 2004 and U.S. Pat. No. 6,695,046 issued Feb. 24, 2004.

Non-patent unpublished installation manual authored by PROCTOR ENGINEERING GROUP, LTD., "Enhanced Time Delay Relay Installation Procedure," Date: Nov. 28, 2006, Pages 4, Prepared by Proctor Engineering Group Ltd., 418 Mission Ave., San Rafael, Calif. 94901 USA (Proctor 2006). Proctor 2006 is an installation manual for adjustable fixed fan-off delay products.

Non-patent unpublished advertising flier authored by PROCTOR ENGINEERING GROUP, LTD., "Air Conditioner Enhanced Time Delay Relay" (DelayRelayFactSheet 3-LR.pdf), Date: Dec. 31, 2007, Pages 2, Proctor Engineering Group Ltd., 418 Mission Ave., San Rafael, Calif. 94901 USA (Proctor 2007b). This is an advertising document targeting homeowners.

U.S. Pat. No. 6,708,135 (Southworth '135) describes several timer functions (e.g. delay on make, delay on break, recycle, single shot, etc.) expressed in terms of a series of timer subfunctions, and code segments for each subfunction. A program of a timer is established to include a plurality of subfunction code segments and a subfunction ordering table for determining the ordering of execution for the subfunction code segments. The ordering of subfunctions of the subfunction ordering table may be selectable in accordance with a model number input received at a program builder system adapted for use in programming the programmable timer. In one embodiment, the programming method provides for reprogramming of a timer including a control circuit having a one-time programmable processor.

Non-patent publication published by the Florida Solar Energy Center (FSEC) authored by HENDERSON, H., SHIREY, D., RAUSTAD, R., "Understanding The Dehumidification Performance of Air-Conditioner Equipment at Part-Load Conditions," Final Report FSEC-CR-1537-05, Date: January 2006, Pages 613, Florida Solar Energy Center, Cocoa, Fla., USA (Henderson 2006), Available online at: http://www.fsec.ucfedu/en/publications/pdf/FSEC-CR-1537-05.pdf. Henderson 2006 is cited in CEC '056. Henderson 2006 provides data for a fixed fan-off delay of 26 minutes based on AC compressor operating time of 12 minutes (FIG. 6, p. 14).

Non-patent publication published by PACIFIC GAS & ELECTRIC (PG&E) and authored by Abram Conant of PROCTOR ENGINEERING GROUP, LTD., titled "California Climate Air Conditioner Upgrade—Enhanced Time Delay Measure Codes H796 Cooling Optimizer Program, Work Paper PGE3PHVC150 Enhanced Time Delay Relay Revision # 1," Date: May 5, 2014, pages 36, published by PG&E Customer Energy Solutions, San Francisco, Calif., USA (PG&E 2014). Available online at: http://deeresources.net/workpapers. PG&E 2014 was published 48 months after the Walsh '229 patent application was filed on Apr. 14, 2010 which issued as the '920 patent. PG&E 2014 is the earliest published Proctor workpaper available that can be located by persons interested and ordinarily skill in the subject matter or art, exercising reasonable diligence. No earlier published references of Proctor workpapers were disseminated or otherwise made available to the extent that persons interested and ordinarily skilled in the subject matter or art, exercising reasonable diligence, could locate the references. PG&E 2014 references an undisclosed proprietary algorithm providing a fan-off delay after the air conditioner compressor turns off. This disclosure of an undisclosed algorithm is almost identical to the disclosure on page 9 of Proctor 2008 regarding an undisclosed proprietary algorithm. PG&E 2014 does not provide an enabling disclosure regarding how "the fan-off time delay is recalculated during every air conditioner cycle as a function of the available cooling capacity remaining on the indoor coil." PG&E 2014 provides field test data for seven homes that "received a device with control characteristics identical to the WCC (ETDR) device" (Table 8, pp. 8-9) from a study published in August 2011 by Queen, R., titled "Proportional Time Delay Relay for Air Conditioner Latent Capacity Recovery," Report to the California Energy Commission Public Interest Energy Research Program, August 2011. The Queen report was published 16 months after Walsh filed the provisional '229 patent application on Apr. 14, 2010. PG&E 2014 also provides Intertek laboratory test data from CASE 2011 published in December 2011 or 20 months after the Walsh filed the provisional '229 application on Apr. 14, 2010. PG&E 2014 also provides tests of continuous fan operation with Compressor Pause Mode (CPM) in FIG. 5 and Table 11 (p. 13) taken from Table 23 (p. 65) and FIG. 48 (p. 66) of the CEC '056. FIG. 5 (p. 13) and FIG. 48 (p. 66) of the CEC '056 only show the Y-axis from 5.5 to 10. FIG. 5 also shows three arrows pointing to a "5 minute tail" and one arrow pointing to a "10 minute tail," but these are not "enhanced time delay tests" as stated in the caption of FIG. 5. Rather, these are Compressor Pause Mode (CPM) tests as indicated in an embedded Excel spreadsheet titled "SCEData.xls" in PG&E 2014 showing the full lab test data including evaporator fan power and continuous fan operation with compressor pause and the entire Y-axis from 0 to 10 (sensible EER and kW). The CPM method is described on page 21 of PG&E #0603. PG&E 2014 also provides laboratory test data described in Henderson 2006 cited in CEC '056. Henderson 2006 provides data for a fixed fan-off delay of 26 minutes based on AC compressor operating time of 12 minutes.

Non-patent publication published by the CALIFORNIA UTILITIES STATEWIDE CODES AND STANDARDS TEAM, Codes and Standards Enhancement (CASE) Initiative: Residential Refrigerant Charge Testing and Related Issues, 2013 California Building Energy Efficiency Standards, Date: December 2011, pages 51-61, authored by Pacific Gas and Electric (PG&E) Company, San Francisco, Calif., USA (CASE 2011). Available online at: http://www.energy.ca.gov/title24/2008standards/special_case_appliance/refrigerant/2013_CASE_R_Refrigerant_Charge_Testing_Dec_2011.pdf. CASE 2011 was published 20 months after filing the '229 application on Apr. 14, 2010 which issued as the Walsh '920 patent. The CASE 2011 discloses a fixed fan-off delay based on variable AC run time or variable fan-off delay based on fixed AC run time. Cycling test summaries are provided in Appendix C (pp. 60-61) for various fan-off time delay times of 80 to 610 seconds with 6 minutes of compressor run times for all tests with one set of tests using a Permanent Split Capacitance (PSC) motor and one set of tests using a Brushless Permanent Magnet (BPM) motor. Appendix A (pp. 50-54) provides Intertek testing conditions, test descriptions, test date, conditions, and airflow (cfm/ton) indicating the test were performed from Sep. 16, 2010 (p. 50) through Oct. 1, 2010 (p. 54). The Intertek tests provided in Appendix A (pp. 50-54), Appendix B (pp. 55-59), and Appendix C (pp. 60-61) were performed approximately five months after filing the '229 application on Apr. 14, 2010. Page 33 and 34 provide laboratory test data regarding the duct loss effect for fan-off time delay times ranging from 80 to 610 seconds with compressor run times of 6 minutes where one set of tests was performed using a PSC motor (FIG. 20) and another set of tests was performed using a BPM motor (FIG. 21).

Non-patent publication published by the International Energy Program Evaluation Conference (IEPEC) and authored by PROCTOR, J., HAIRRELL, A., "An Innovative Product's Path to Market. The influence of laboratory and field evaluations on adoption and implementation," Date: August 2013, pages 7-8, IEPEC, Chicago, Ill., USA (Proctor 2013). Available online at: https://www.iepec.org/conf-docs/conf-by-year/2013-Chicago/050.pdf#page=1. Proctor 2013 was published 40 months after the Walsh '229 application was filed on Apr. 14, 2010 that led to the '920 patent. Proctor 2013 references an undisclosed algorithm embodied in a relay to provide a fan-off delay after air conditioning compressor turns off. Page 8 of the Proctor 2013 report provides the following statement.

"In the winter of 2009 fall of 2010 (sic) various time delay lengths were tested at the psychometric test facility in Plano Texas. This facility is regularly used by air conditioning manufacturers to certify their units to AHRI. The facility consists of a climate controlled indoor room and a climate controlled outdoor room. The facility has the ability to cover a wide range of climate conditions from very hot summer conditions to very cold winter conditions. These tests were sponsored by the California Investor Owned Utilities in support of codes and standards."

The above statement asserts that tests were performed in the "winter of 2009" appears to be a typographical error and is crossed out. Evidence of this typographical error is provided in CASE 2011 Appendix A (pp. 50-54) showing tests dates ranging from Sep. 16, 2010 (p. 50) through Oct. 1, 2010 (p. 54). Furthermore, Robert Mowris, Verified Inc., was the first client to use the new Intertek psychrometric test facility in Plano, Tex., from February through March 2010. The Intertek tests provided in Appendix A (pp. 50-54) of the CASE 2011 report were performed approximately five months after the '229 application was filed on Apr. 14, 2010. The Proctor relay product was labeled with Southworth U.S. Pat. No. 6,708,135. The Southworth '135 patent applies to a timer that has the ability to be field programmed, but does not monitor any inputs nor does the patent vary the fan time delay based on the inputs. The Southworth '135 patent was assigned to ABB, an international company. Within ABB, the relay division was called SSAC, and SSAC was acquired by Symcom which was subsequently acquired by Littelfuse. SymCom manufactured at least two part numbers for Proctor Engineering Group. The first part number is KRLS2C-4713 with date code "4510" indicating first date of manufacturing was the 45th week of 2010. The second part number is KRLS2C-4827 with date code "4412" indicating first date of manufacturing was the 44th week of 2012. The first part number KRLS2C-4713 provided two optional variable fan-off delays of 4 to 10 minutes and 2 to 5 minutes. The second part number KRL2S2C-4827 provided a variable fan-off delay of 2 to 5 minutes. SymCom Technical Support indicated that the date code is "WWYY" so "4510" is 45th week of 2010. Therefore, the first product KRL2S2C-4713 with a variable fan-off time delay relay reprogrammed "to follow the algorithm that related the fan run time to the compressor run time" was first manufactured in November 2010. This is approximately seven months after the Walsh '229 application was filed on Apr. 14, 2010.

Non-patent installation instructions published by CARRIER CORPORATION for a packaged HVAC system "48ES-A Comfort 13 SEER Single-Packaged Air Conditioner and Gas Furnace System with Puron® ®-410A) Refrigerant Single and Three Phase 2-5 Nominal Tons (Sizes 24-60), 48ES-A Installation Instructions," date: September 2010, Page 23 (CARRIER 2010). Available online at: http://dms.hvacpartners.com/docs/1009/Public/0E/48ES-05SI.pdf. CARRIER 2010 discloses a method of changing the fan speed by selecting a fan speed tap on the motor and connecting it to the blower relay.

Non-patent publication by Venstar Inc., for an electro-mechanical Add-a-Wire™ product that costs from $21 to $99. In applications where additional wiring cannot be installed, the Add-A-Wire accessory can be used to add a wire to the thermostat. See https://venstar.com/thermostats/accessories/add-a-wire/. Venstar uses a thermostat element with two opposing diodes to combine two original analog signals from a thermostat into one combined analog signal carried on an existing repurposed wire to an HVAC element where the one combined analog signal is reconstituted into the two original analog signals using two opposing diodes, two capacitors and two mechanical relays that activate or deactivate simultaneously with the two original analog signals from the thermostat. Similar apparatus and methods are used in the Lux Products Corporation electro-mechanical Power Bridge product, Honeywell International Inc., electro-mechanical Wiresaver THP9045A1023/U wiring module, and Ecobee Inc., an electro-mechanical EBPEK01 Smart SI Power Extender Kit (see following paragraphs).

Non-patent publication by Lux Products Corporation for an electro-mechanical Power Bridge product that costs from $18 to $22. The LUX Power Bridge provides 24V AC power to thermostats in homes without C-wires. Thermostats that connect to WiFi networks and home automation systems like Amazon Alexa and Apple HomeKit need a consistent 24V AC power source for optimal performance. The LUX Power Bridge allows homes with 3 and 4 wire systems to reap the benefits of smart thermostats without requiring a new wire to be installed between the furnace and the thermostat. See https://pro.luxproducts.com/powerbridge/.

Non-patent publication by Honeywell International Inc., for an electro-mechanical Wiresaver THP9045A1023/U wiring module that costs $12 to $16 but only works with Honeywell thermostats and does not provide a connector at the thermostat for other manufacturers. The Honeywell WireSaver is a C-Wire Adapter for Wi-Fi thermostats or RedLINK 8000 series Honeywell thermostat models. See https://customer.honeywell.com/en-US/Pages/Product.aspx?cat=HonECC+Catalog&pid=thp9045a1023/U.

Non-patent publication by Ecobee Inc., for an electro-mechanical EBPEK01 Smart SI Power Extender Kit that costs $20 to $27. A common wire is required for 5-wire thermostats. If there are only 4 wires to the existing thermostat (i.e. there is no common wire), the Ecobee Power Extender Kit can be used to power the Ecobee WIFI thermostat. See https://support.ecobee.com/hc/en-us/articles/227874107-Installing-the-Power-Extender-Kit-with-ecobee-Si-thermostats.

U.S. Pat. No. 9,410,713 (Lau '713) abstract discloses an "integrated efficient fan controller circuit device for controlling a fan of a heating, ventilating and air conditioning (HVAC) system." Lau '713 describes and claims a fan controller having well-known circuit elements and configurations. Before the filing date of the Lau '713 (Aug. 30, 2013), fan controllers for HVAC systems had already existed. The fan controller disclosed and claimed by Lau, including each of the circuit components and their connections were either known or obvious to a person of ordinary skill based on decades-old circuit theory or disclosed in U.S. Pat. No. 8,763,920 (Walsh '920), issued on Jul. 1, 2014 from an application filed on Apr. 12, 2011 and claiming priority from a provisional application, 61/324,229, filed on Apr. 14, 2010.

U.S. Patent application 20150159905 (Lau '905) discloses a "method and apparatus for controlling an air handler including a fan and at least a member of a group consisting of a heater and a compressor, the method comprising: installing an energy saving controller ("ESC") between a thermostat and the air handler, monitoring by the ESC of ON and OFF durations of the heater if the air handler is in a heating mode, or the compressor if the air handler is in cooling mode, in a previous cycle and of ON duration of a current cycle, and determining the fan's first run time extension amount based on the ON and OFF durations of the previous cycle and the ON duration of the current cycle."

U.S. Patent application 20150060557 (Lau '557) discloses a "method for energy saving during the operation of an HVAC system comprising an energy saving unit, comprising: installing a temperature probe in the supply air that can send data to the energy saving unit; configuring the energy saving unit to perform a set of functions comprising: receiving a user's instructions for turning on the HVAC system and setting a target room temperature; shutting off the heater or compressor when the target temperature is reached; measuring the temperature of the air in the room that is being heated or cooled and comparing the temperature of the supply air with the temperature of the air in the room; and causing the blower to keep running after shutting off the heater or compressor for as long as the temperature of the air in the room is smaller or greater than the temperature of the supply air, respectively."

U.S. Patent application 20160223219 (Lau '219) discloses an "energy saving controller for an air handler having a fan and a heater or a compressor, the energy saving controller having circuitry for monitoring of ON and OFF durations of the heater if the air handler is in a heating mode, or the compressor if the air handler is in a cooling mode, in a previous cycle, and, of ON duration of a current cycle, and determining the fan's first run time extension based on the ON and OFF durations of the previous cycle and the ON duration of the current cycle. Lau '219 was filed Apr. 7, 2016 about five years after the Walsh U.S. patent application Ser. No. 13/085,119 was filed on Apr. 12, 2011 with provisional application No. 61/324,229 filed on Apr. 14, 2010 that led to U.S. Pat. No. 8,763,920 (Walsh '920). Walsh '920 discloses "monitoring a duration of the air conditioner compressor cycle; and determining an amount of time fan operation is extended after the cooling cycle based on the duration" where the cooling cycle includes the OFF and ON duration. U.S. Pat. No. 9,995,493 (Mowris '493) is a continuation in part from the Walsh '920. Mowris '493 discloses a heating fan-off delay P2 "based on at least one heating cycle duration selected from the group consisting of: a heating on time defined from when the thermostat initiates a call for heating until the thermostat terminates the call for heating, and a heating off time defined from when the thermostat terminates the call for heating until the thermostat initiates the call for heating plus the heating on time."

U.S. Patent Application Publication No. 20170051936 (Lau '936) discloses an "energy saving controller configured for mounting between a thermostat and the controller for an air handler unit having a fan and at least a member of a group consisting of a heater and a compressor. The energy saving controller includes a temperature probe for reading the temperature of a room where the thermostat is located and being configured to control the air handler unit based on a demand response request received from a utility provider via the Internet and an input from the temperature probe." Known air handlers are controlled by thermostats which have a temperature sensor. Smart communication thermostats devices with temperature sensors and WIFI technology for wireless local area networking based on the IEEE 802.11 are enabled to control air handler units based on a demand response request received from the thermostat manufacturer (i.e., Nest, ecobee, Venstar) or a utility provider.

U.S. Patent Application Publication No. 201800386511 (Lau '511) discloses an "An energy saving controller for an air handler having a heater and a dual speed fan adapted to switch between a first speed and a second higher speed via a gas furnace controller, the energy saving controller being configured to be mounted between a thermostat and the gas furnace controller, and having: input terminals configured to connect to corresponding thermostat output terminals and receive output signals; a microcontroller configured to: process the output signals into revised signals; and cause the gas furnace controller to alternate between the first speed and the second higher speed to mimic a behavior of a variable speed fan; drivers configured to receive the revised signals and use the revised signals to actuate mechanical relays; wherein the mechanical relays are configured to actuate the fan or the compressor via ESC output terminals; and means for causing the alternation."

BRIEF SUMMARY OF THE INVENTION

The present invention addresses the above and other needs by providing an efficient fan controller consisting of a circuit, AC-DC converter, zero crossing detector, signal conditioner, microprocessor, switching devices, optional user interface, optional battery, and leads to connect to HVAC thermostat terminals or an HVAC equipment terminal block and system transformer, to provide efficient control of an HVAC fan. The efficient fan controller microprocessor receives low-voltage input signals from the HVAC system and determines forced air unit system type, mode of operation, and appropriate output signals to enable variable fan-on time delays, high speed fan operation during heating mode for applicable systems, and variable fan-off time delays to reduce energy use and improve energy efficiency of the HVAC system.

In accordance with one aspect of the invention the efficient fan controller can determine the following forced air unit system type and modes of operation based on input signals to the microprocessor: 1) direct-expansion air conditioning system in cooling mode, 2) heat pump system in cooling mode, 3) gas furnace system in heating mode, 4) heat pump system in heating mode, 5) hydronic coil system in heating mode, and 6) electric resistance heating system in heating mode.

In accordance with another aspect of the invention for direct-expansion air conditioning systems in cooling mode, the efficient fan controller can energize a fan relay after a short fan-on time delay period P0 based on the previous HVAC system off-cycle time period P11 to allow the refrigerant in the air conditioning evaporator to cool down before energizing the fan relay in order to avoid delivering undesirable warm air into the conditioned space to improve customer satisfaction and cooling efficiency compared to known fan control.

In accordance with one aspect of the invention for direct-expansion air conditioning systems in cooling mode, the efficient fan controller can energize the fan relay for an extended variable fan-off time delay P2 after an air conditioning compressor has stopped operating where the variable fan-off time period P2 is based on the air conditioning compressor cooling cycle duration P3 defined as a cooling on time from when the thermostat initiates a call for cooling until the thermostat terminates the call for cooling or the cooling cycle duration is defined as a cooling off time defined from when the thermostat terminates the call for cooling until the thermostat initiates the call for cooling plus the cooling on time. The extended variable fan-off time delay period P2 increases sensible cooling from the evaporator coil to increase cooling capacity delivered to the conditioned space, improve overall efficiency, extend the off cycle time, and save energy.

In accordance with another aspect of the invention for a gas furnace system in heating mode, the efficient fan controller can increase the heater ventilation fan speed from the low speed used for heating to the high speed used for cooling after a short time period P1 after the heat exchanger has reached its approximate maximum temperature to improve heat transfer, deliver more heating capacity and increase warm air movement and circulation in the conditioned space to satisfy the thermostat set point in less time to reduce heating system operation, and therefore reduce energy use and improve heating efficiency compared to known fan control.

In accordance with another aspect of the invention for a gas furnace system in heating mode, the efficient fan controller can continue the HVAC ventilation fan operation for an extended variable fan-off time delay period P2 after the gas furnace heat source has stopped operating. The variable fan-off time delay period P2 is determined based on gas furnace heating cycle duration P3 defined as the heating on time from when the thermostat initiates a call for heating until the thermostat terminates the call for heating or the heating cycle duration P3 is defined as the heating off time defined from when the thermostat terminates the call for heating until the thermostat initiates the call for heating plus the heating on time. The extended variable fan-off time delay period P2 recovers additional heat from the heat exchanger to increase heating capacity delivered to the conditioned space, improve overall efficiency, extend the off cycle time, and saves energy.

In accordance with another aspect of the invention for heat pump, electric resistance, or hydronic systems in heating mode, the efficient fan controller can energize a fan relay after a short fan-on time delay period P0 based on the previous HVAC system off-cycle time period P11 to allow the hydronic heating coil to heat up before energizing the fan relay in order to avoid delivering undesirable cool air to the conditioned space to improve customer satisfaction and heating efficiency compared to known fan control.

In accordance with another aspect of the invention for heat pump, electric resistance, or hydronic systems in heating mode, the efficient fan controller can energize a fan relay after an extended variable fan-off time delay period P2 after the air conditioning compressor or heat source turn-off allows recovery of additional cooling from an evaporator to increase sensible cooling capacity, or heat from a heat exchanger delivered to the conditioned space, thereby improving efficiency, extending the off cycle time, and saving energy.

In accordance with another aspect of the invention, the efficient fan controller circuit provides an extended fan-off time delay P2 based on monitoring of a thermostat "G" terminal (provides a fan relay signal) or a thermostat "Y" terminal (provides an AC compressor signal) or a thermostat "W" terminal (provides a heat source signal) or a heat pump reversing valve "O" or "BR" terminal (provides a heating or cooling reversing valve signal).

In accordance with another aspect of the invention, the efficient fan controller increases the sensible cooling or heating capacity delivered to the conditioned space and improves the application energy efficiency ratio of an air conditioning system or the heating efficiency of a heating system. In known HVAC systems, the HVAC fan is turned off when the compressor or heat source are turned off or shortly after the compressor or heat source are turned off. The cooling evaporator is very cold when the compressor is turned off and the heating coil or heat exchanger are very hot when the heat sources are turned off. Continuing to run the HVAC fan for a period of time P2 after the AC compressor or heat source are turned off, based on the duration of the cooling cycle or the duration of the heating cycle P3 including the on time or the on plus off time, provides additional cooling or heating to the conditioned space. The additional cooling takes advantage of cold water which has condensed on the evaporator coils. By running the HVAC fan after the compressor has stopped, the cold water is evaporated and the system functions as an evaporative cooler, especially in hot dry climates. Additional heating takes advantage of very hot heating coil or heat exchanger temperatures. Increasing the delivered sensible cooling or heating capacity will extend the off cycle time period P11, reduce the duration of the cooling or heating cycle operating time P3 and increase energy efficiency. The sensible cooling or heating capacity are responsible for satisfying the thermostat set point, which determines air conditioner or furnace operational time and energy use. Laboratory and field studies have shown the efficient fan controller improves gas furnace, heat pump, or hydronic heating efficiency by 4 to 21 percent above conventional systems with fixed-time delays and 8 to 25 percent above conventional systems with no time delay. For heating systems with degraded conventional temperature delay sensors, the fan controller improves heating efficiency by 9 to 25 percent. Laboratory studies have shown the efficiency fan controller improves cooling efficiency 4 to 17 percent above conventional time delay and 6 to 20 percent above no time delay.

In accordance with still another aspect of the invention, there is provided an efficient fan controller apparatus connected by as few as three electrical leads to terminals of common HVAC thermostats or equipment terminal blocks. The efficient fan controller uses the information from the thermostat to determine an extended time delay for the fan based on the run time of the compressor or fan switch or heat source. In one embodiment, all delay calculations are done autonomously using an algorithm based on AC compressor/fan run time or heat source run time. The delays improve HVAC unit sensible cooling and heating capacity, energy efficiency, and reduce unnecessary supply fan operation during unoccupied periods.

In accordance with another aspect of the invention, there is provided a efficient fan controller easily connected to existing HVAC systems. Many new air conditioning systems incorporate a fixed fan-off delay directly into their new products. Older air conditioning systems do not include any fan-off time delay. The efficient fan controller allows the delay to be applied to new and existing HVAC systems.

In accordance with still another aspect of the invention, there is provided a efficient fan controller circuit including a microprocessor, an AC/DC converter, a zero crossing detector, and one or more switching devices. The efficient fan controller may be an external fan controller connected directly to existing HVAC thermostat terminals or equipment terminal leads with minimal need for rewiring. The efficient fan controller may also be designed into a Forced Air Unit (FAU) electronic control board. The efficient fan controller receives power present in the HVAC thermostat leads or the 24 VAC HVAC equipment transformer. The fan controller can operate with a minimum of three leads which can be connected directly to the wiring presently connected to known HVAC thermostats or equipment terminal blocks. The fan controller generally only requires electrical connection to existing 24 VAC transformer, and control terminals of the thermostat.

In accordance with yet another aspect of the invention, there is provided a fan controller including at least one switching device. Many suitable switching devices may be used to provide the requisite function. When the switching device is an electro-mechanical switch, the fan controller further can include a battery to power the microprocessor when the switch is closed, or 24 VAC power from the AC transformer. In one embodiment, the switching device is a triac. The fan controller circuit selectively gates the triac for milliseconds, and in doing so, has a total current draw on the order of 100 microamps allowing use of the fan controller without an additional power source added to the HVAC system. The triac draws very little power when the heating/cooling system is not active since there is no relay to be controlled.

In accordance with still another aspect of the invention, the fan controller uses a 60 Hz electrical signal as a time base providing precise timing which does not vary from system to system or due to aging or temperature of the components.

In accordance with another aspect, there is provided a fan controller which controls the fan relay through the entire cycle without interruption, preventing relay chatter and excessive wear.

In accordance with still another aspect, the fan controller restores all thermostat connections to their original states when turned off, providing continued HVAC system function if the fan controller fails.

In accordance with yet another aspect, the fan controller does not limit the amount of time the compressor operates and thus maintains system efficiency. The fan controller relies on the thermostat to determine when the desired set point has been reached, and only then does it extend the fan run time. This ensures occupant comfort and provides for the efficiency gains during and at the end of the cycle.

In accordance with yet another aspect, the fan controller works with HVAC systems containing both heating and air conditioning. Known HVAC systems require a user interface to enter information. The fan controller may contain a user interface, but does not require one. The fan controller measures the air conditioning compressor cooling cycle duration or the heating cycle duration and determines the variable fan-off delay time automatically. The fan controller interrupts the signal from the thermostat to the fan relay and overrides the fan control. The fan controller can monitor supply fan, heat source, or compressor operation and turn off the supply fan during unoccupied time periods to reduce unoccupied supply fan operational energy.

In accordance with another aspect of the invention, there is provided a fan controller using fan speeds native to the HVAC system. The fan controller can use a temperature sensor, but does not require a temperature sensor to control the fan. The fan controller be configured to operate with a variable speed fan Electronically Commutated (EC) motor, but does require variable speed operating modes for the fan.

In accordance with another aspect of the invention, two diodes connected to signals from thermostat terminals. One diode will positively rectify a 24 VAC signal from the thermostat, and the other will negatively rectify the 24 VAC signal. The outputs from the diodes are connected together to send a single signal conducted over a single wire to a microprocessor located at the furnace. The microprocessor receives the positively rectified, negatively rectified, or a full sinusoid signal The microprocessor monitors the output signal from the diodes and determine if the signal is positively rectified, negatively rectified, or a complete sinusoid. In this way, more than one signal can be transmitted to the invention using a single wire. This aspect of the invention allows the re-purposing of one of the wires in the wire bundle from the HVAC control terminals to the thermostat to be used to carry the common signal from the system transformer to the thermostat when the common wire is missing from the bundle to provide power to the thermostat.

In accordance with another aspect of the invention, a method is disclosed of using a jumper wire on the high-speed tap of the system fan/blower to enable high-speed fan operation for both heating and cooling.

In accordance with another aspect of the invention, a method is disclosed to increase fan speed to a higher fan speed, higher than a lower fan speed used for heating to improve comfort, efficiency and satisfy the thermostat sooner to save energy by controlling the system fan/blower to high speed operation using at least one mechanism selected from the group consisting of: 1) installing a 24-volt wire jumper from the fan only tap to the high-speed or "cool" tap of the system fan/blower to enable the thermostat "G" signal wire to control high speed fan operation, and 2) installing a high-voltage Y-adapter configured to combine the two high-voltage signal outputs, one from the fan relay and one from the Forced Air Unit (FAU) control board furnace fan relay to the high speed tap of the system fan/blower to enable high speed fan operation in cooling and heating modes, and 3) using a dip switch or other electrical control switching device on the FAU control board to enable high speed system fan/blower operation when the thermostat G terminal is energized in cooling or heating modes, and 4) using wired or wireless (WIFI) software application configured to command a switching device to enable higher speed system fan/blower operation when the thermostat G terminal is energized in cooling or heating modes, and 5) a fan speed controller configured to identify an electrical signal waveform 848 when the thermostat G terminal is energized in cooling or heating modes to enable high speed system fan/blower operation.

In accordance with another aspect of the invention, the method of extending the indoor fan operation based on the duration of the heating or cooling cycle can be designed into a Forced Air Unit (FAU) control board which would not require the installation of an external fan controller.

In accordance with another aspect of the invention, the microprocessor is programmed to monitor the rising and falling edges of the 24 VAC power signal either from the 24 VAC relay, or through the fan relay. The input signals are pulled up to the power supply voltage by a resistor. After the rising or falling edges, the microprocessor is programmed to sample the input signals from the thermostat. If the signal is high at both the rising edge and the falling edge the processor interprets the signal as inactive or floating. If the signal is low after the rising and falling edges, the microprocessor interprets the signal as active or the thermostat is calling for heating, cooling, or fan depending on the signal sampled. If the input signal is positive after a rising edge and zero after a falling edge, then the microprocessor interprets the signal as inactive, or simply following the 24 VAC signal with positive and negative states that would be present if the input signal were pulled to common through a fan relay, compressor contactor, or gas valve.

In accordance with another aspect of the invention, the apparatus includes at least one temperature sensor input configured to connect to a temperature sensor to monitor at least one temperature selected from the group consisting of: a conditioned space temperature, a return air temperature and a supply air temperature. The apparatus includes a method to monitor the temperature sensor input, and at an end of the cooling cycle or heating cycle either energize or continue to energize the fan relay signal output to operate a system fan for a variable fan-off delay time to deliver additional cooling or heating energy to a conditioned space wherein the variable fan-off delay time is determined based on at least one threshold temperature selected from the group consisting of: the conditioned space temperature, the return air temperature and the supply air temperature. The temperature threshold can be based on at least one temperature threshold selected from the group consisting of: a supply air temperature threshold less than the conditioned space temperature for cooling, a supply air temperature threshold greater than the conditioned space temperature for heating, a supply air temperature threshold less than the return air temperature for cooling, a return air temperature threshold less than the supply air temperature for heating, a temperature split threshold for cooling defined as the return air temperature minus the supply air temperature, a temperature rise threshold for heating defined as the supply air temperature minus the return air temperature, and a threshold inflection point where the rate of change of the conditioned space temperature with respect to time equals zero plus or minus a confidence interval tolerance. In this embodiment, the fan controller temperature sensor can monitor and record the end-of-cycle conditioned space temperature at the end of the thermostat call for heating or cooling. For heating, the fan controller will then energize or continue to energize the fan relay to operate the system fan/blower for the fan-off delay until the fan controller temperature sensor monitors a conditioned space temperature that is, for example, −0.5 degrees Fahrenheit (° F.) less than the recorded end-of-cycle heating temperature plus or minus a confidence interval tolerance whereupon the fan controller will de-energize the fan relay to turn off the system fan/blower and end the fan-off delay. The end-of-cycle heating temperature is equivalent to the heating upper limit thermostat differential temperature. For cooling, the fan controller will energize or continue to energize the fan relay to operate the system fam/blower for the fan-off delay until the fan controller temperature sensor monitors a conditioned space temperature that is, for example, +0.5° F. greater than the recorded end-of-cycle cooling temperature plus or minus a confidence interval tolerance whereupon the fan controller will de-energize the fan relay to turn off the system fan/blower and end the fan-off delay. The end-of-cycle cooling temperature is equivalent to the cooling lower limit thermostat differential temperature.

BRIEF DESCRIPTION OF THE SEVERAL VIEWS OF THE DRAWING

The above and other aspects, features and advantages of the fan controller will be more apparent from the following more particular description thereof, presented in conjunction with the following drawings wherein:

FIG. 13 shows the connections between a Smart Communicating Thermostat and the HVAC Equipment Control Terminals without a common wire input 802 connected to the thermostat which will not provide reliable electric power to the Smart Communicating Thermostat.

FIG. 22 shows a method for turning off a fan if it has been left accidentally on.

Corresponding reference characters indicate corresponding components throughout the several views of the drawings.

DETAILED DESCRIPTION OF THE INVENTION

The following description is of the best mode presently contemplated for carrying out the fan controller invention. This description is not to be taken in a limiting sense, but is made merely for the purpose of describing one or more preferred embodiments of the invention. The scope of the invention should be determined with reference to the claims.

Figure 1:
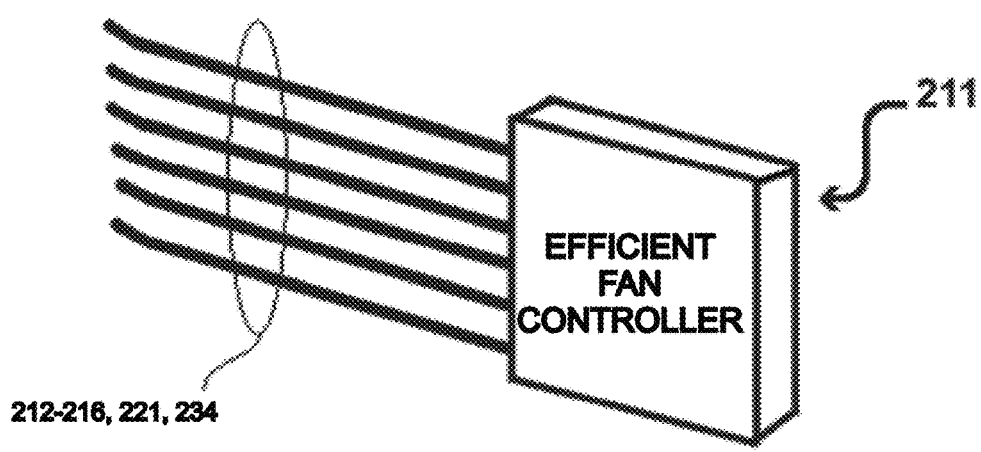
FIG. 1 shows a fan controller according to the present invention for installation at a thermostat or at the HVAC equipment terminal block.

FIG. 1 shows a fan controller 211 according to the present invention for installation at a thermostat or at an HVAC equipment terminal block. The efficient fan controller 211 includes leads 212-222.

Figure 2:
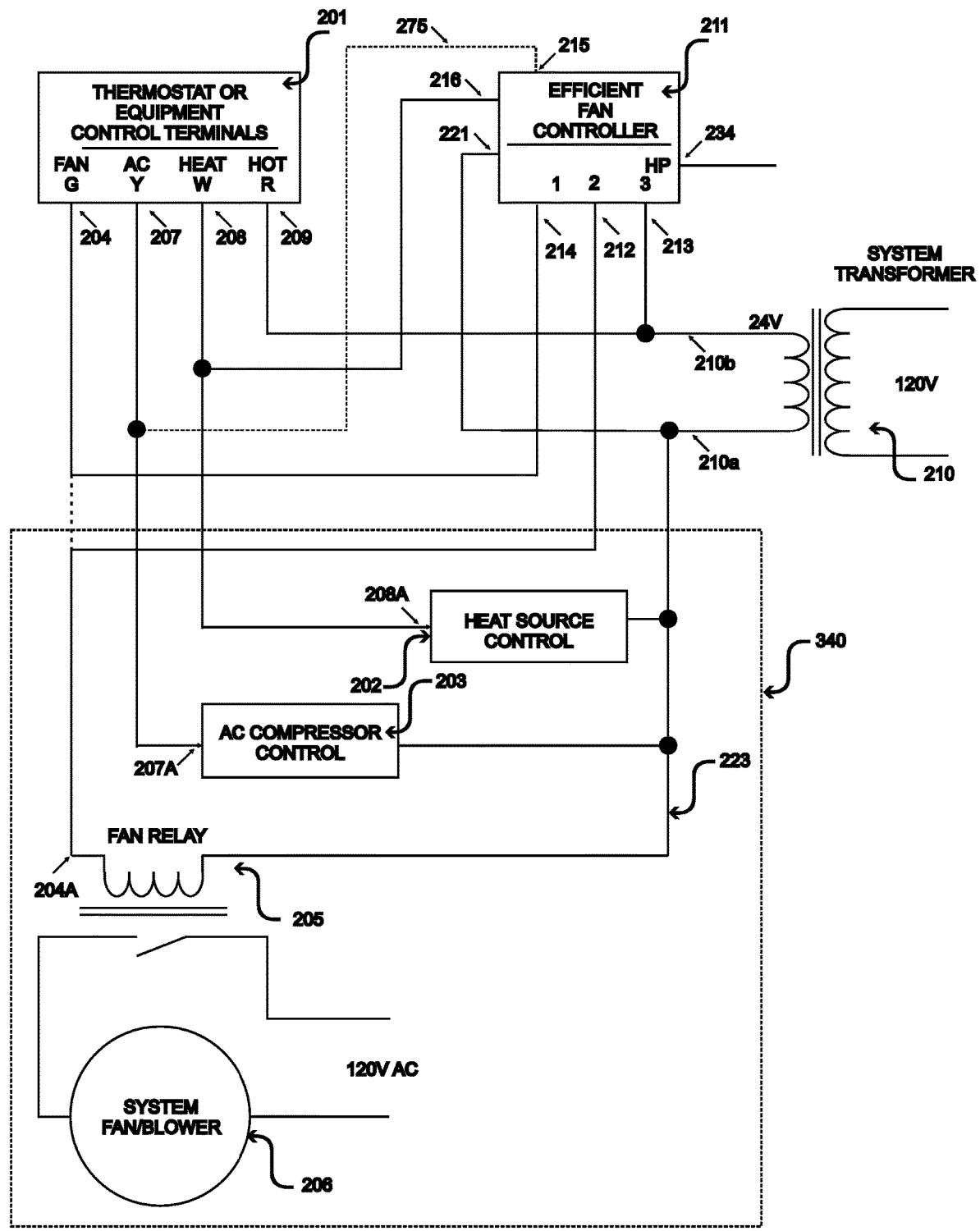
FIG. 2 shows the fan controller according to the present invention connected to an HVAC system with gas furnace, electric resistance, or hydronic heating coils.

FIG. 2 shows the efficient fan controller 211 connected to an HVAC system with AC compressor control (203) for direct-expansion cooling and heat source (202) for gas furnace, electric resistance, or hydronic heating. The following existing thermostat or equipment control terminals (201) are connected and transmitting low-voltage signals to the efficient fan controller (211):

1) Fan signal "G" 204 transmits voltage signals to the efficient fan controller 211 through input lead 214;
2) cooling signal AC "Y" 207 transmits voltage signals to the efficient fan controller 211 through input lead 215;
3) heat source signal HEAT "W" 208 transmits voltage signals to the through input lead 216;
4) system transformer (210) common 24 VAC signal is connected to the efficient fan controller 211 through input lead 221; and
5) system transformer Hot "R" 209 is connected to the efficient fan controller 211 by lead 213 or optionally connected to efficient fan controller 211 lead 234 for connecting to enable control for a heat pump system.

The dashed line 217 indicates where the original thermostat fan signal wire to the fan relay (205) has been disconnected in order to route this signal to the efficient fan controller 211 and transfer control of the fan relay 205 to the efficient fan controller 211. The efficient fan controller 211 transmits a low-voltage control signal to the fan relay 205 through efficient fan controller 211 output signal 212.

Figure 3:
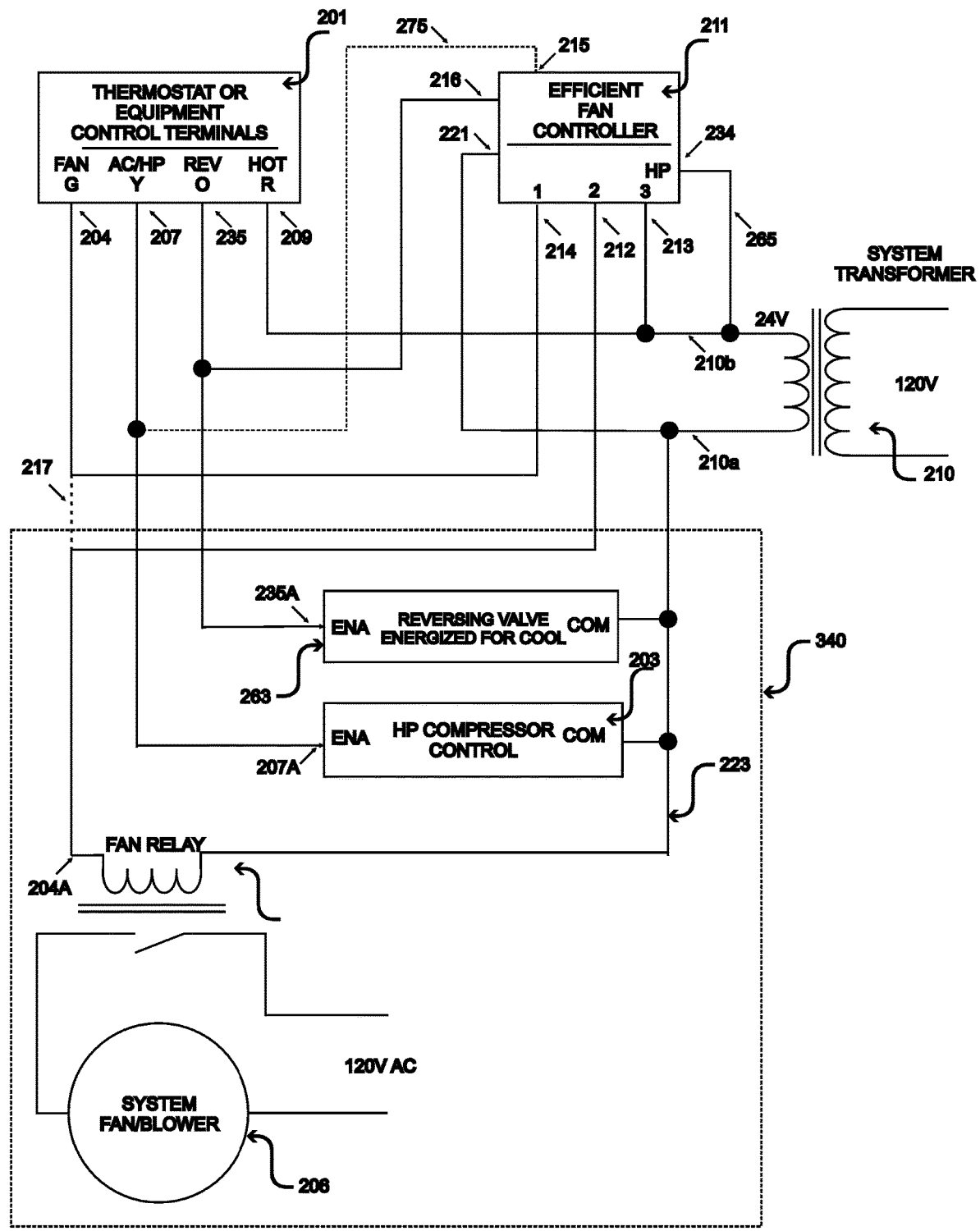
FIG. 3 shows the fan controller according to the present invention connected to a heat pump HVAC system with reversing valve energized for cooling.

FIG. 3 shows the efficient fan controller 211 connected to an HVAC system with AC compressor control 203 for direct-expansion cooling and heat pump reversing valve 263 energized for cooling. The efficient fan controller 211 is connected directly to the following existing thermostat or equipment control terminals 201 connected and transmitting low-voltage signals to the efficient fan controller 211:

1) FAN "G" 204 transmits voltage signals to the efficient fan controller 211 through input lead 214;
2) AC "Y" 207 transmits voltage signals to the efficient fan controller 211 through input lead 215;
3) reversing valve REV "O" 235 transmits voltage signals to the efficient fan controller 211 through input lead 216;
4) system transformer (210) common 24 VAC is connected to the efficient fan controller 211 through input lead 221; and
5) system transformer Hot "R" 209 is connected to the efficient fan controller 211 by lead 213 and connected to efficient fan controller 211 lead 234.

When the efficient fan controller 211 detects current flowing in both the positive cycle and negative cycle on the lead 213, the efficient fan controller 211 responds to control for a heat pump system by energizing the reversing valve 263 for cooling mode. The dashed line 217 indicates where the original thermostat fan signal wire to the fan relay (205) has been disconnected in order to route this signal to the efficient fan controller 211 input 214. The efficient fan controller transmits a low-voltage control signal to the fan relay 205 through efficient fan controller 211 output signal 212.

Figure 4:
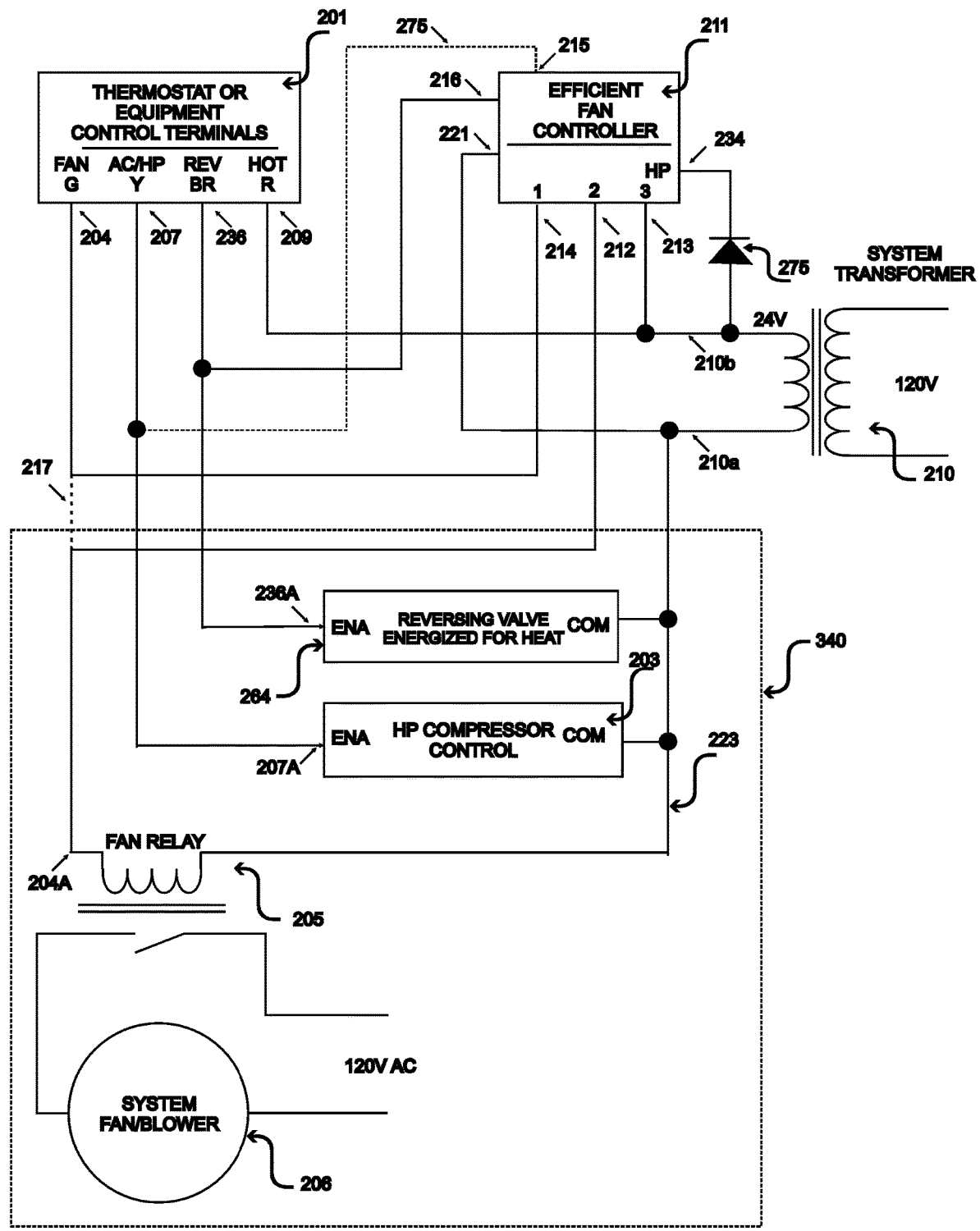
FIG. 4 shows the fan controller according to the present invention connected to a heat pump HVAC system with reversing valve energized for heating.

FIG. 4 shows the efficient fan controller 211 connected to an HVAC system with AC compressor control (203) for direct-expansion cooling and heat pump reversing valve energized for heat (264). The efficient fan controller 211 is connected directly to the following existing thermostat or equipment control terminals (201) connected and transmitting low-voltage signals to the efficient fan controller (211):

1) FAN "G" 204 transmits voltage signals to the efficient fan controller 211 through input lead 214;
2) AC "Y" 207 transmits voltage signals to the efficient fan controller 211 through input lead 215;
3) reversing valve REV "BR" 235 transmits voltage signals to the efficient fan controller 211 through input lead 216;
4) system transformer (210) common 24 VAC is connected to the efficient fan controller 211 through input lead 221; and
5) system transformer Hot "R" 209 is connected to the efficient fan controller 211 by lead 213 and also connected to efficient fan controller 211 lead 234 with a diode 275.

The diode 275 only allows current to flow to the efficient fan controller 211 on positive cycles of the system transformer hot signal (209). By seeing current flowing only during the positive cycle and not on the negative cycle, the efficient fan controller 211 is commanded to control for a heat pump system with reversing valve energized for heating mode. The dashed line 217 indicates where the original thermostat fan signal wire to the fan relay (205) has been disconnected in order to route this signal to the efficient fan controller 211 input 214. The efficient fan controller transmits a low-voltage control signal to the fan relay 205 through efficient fan controller 211 output signal 212.

Figure 5:
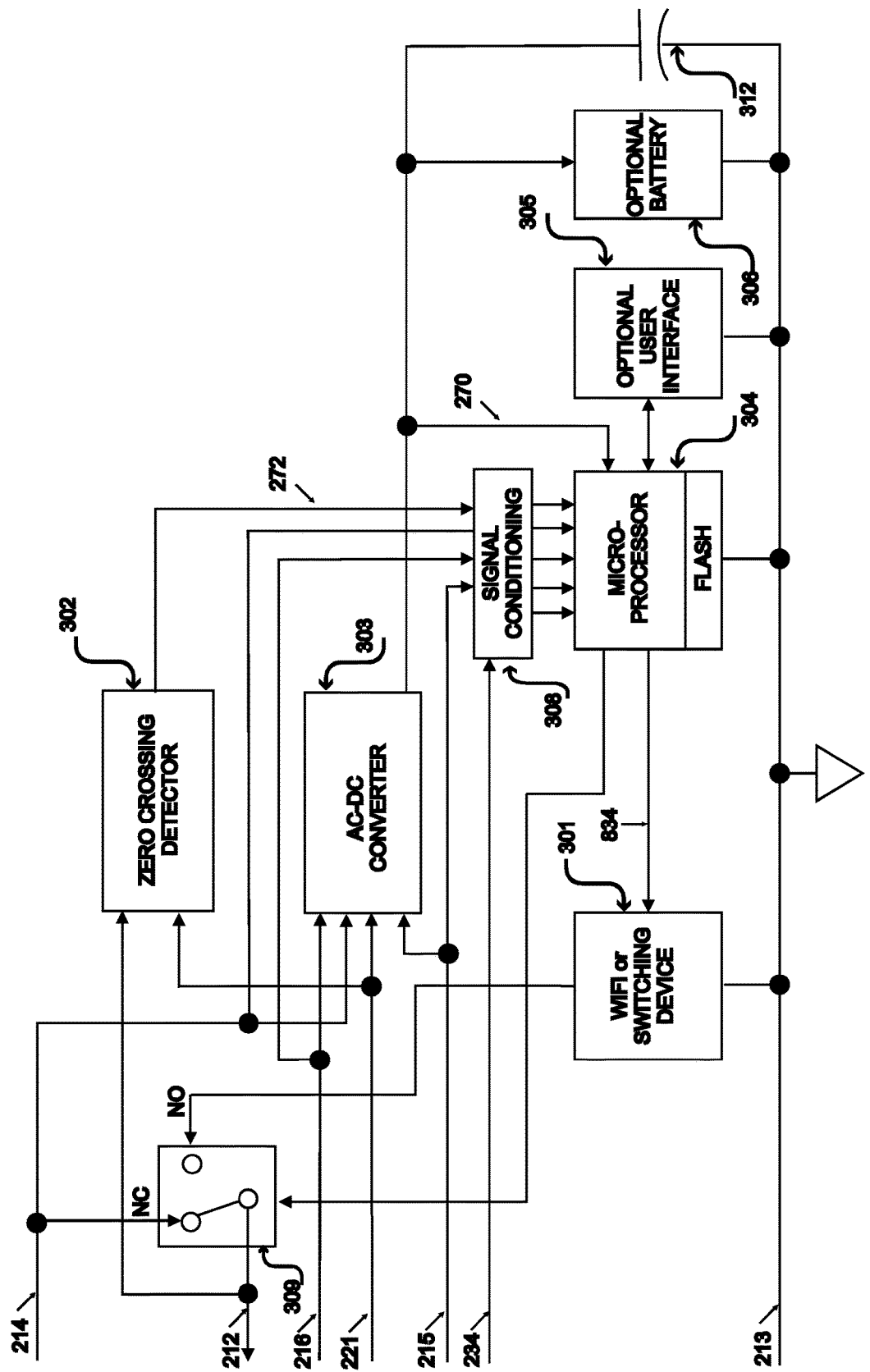
FIG. 5 shows elements of the efficient fan controller according to the present invention for HVAC systems with direct-expansion air conditioning, gas furnace, heat pump, electric resistance, or hydronic heating.

FIG. 5 shows components of the efficient fan controller 211 used for systems with gas furnace, electric resistance, heat pump or hydronic heating. A switch 309 is a normally closed relay which connects the input lead (214) signal from the thermostat to the fan relay control (212). In this way, if the efficient fan controller 211 device fails, the FAN "G" 204 is connected to the fan relay 205 and the system will perform as if the efficient fan controller 211 was not in the control loop.

In normal operation, when the efficient fan controller 211 is controlling the fan relay 205, the relay 309 is enabled and the switching device 301 output is presented to the fan relay control signal 212. The efficient fan controller 211 has the following input signals from the thermostat:

fan enable 214, A/C compressor enable 215;
heat source enable 216; and
heat pump mode 234.

The efficient fan controller 211 has a single output 212 which is the signal to enable the fan relay 205.

The input signals 214, 215, 216, and 234 and an output of the zero crossing detector pass through a signal conditioning element 308 before being passed to the microprocessor 304. The signal conditioning element 308 (shown in FIG. 5) converts analog HVAC control signals from the thermostat 201 to digital HVAC control signals used by the microprocessor 304, and shifts the level of the thermostat inputs to a level that will not harm the microprocessor 304. The microprocessor 304 is used to control switching devices 301 and 309. The microprocessor 304 also has an input from a zero crossing detector 302. This zero crossing detector 302 may monitor either the current feeding through the fan relay 205 via output signal 212 or a neutral leg 210b (see FIG. 2) of the system transformer 210. When monitoring the signal 212, which is normally an output of the efficient fan controller 211 to the fan relay 205, the fan relay 205 has the leg opposite signal 212 tied to the neutral leg 210b of the system transformer 210. Current can flow from that neutral leg 210b, up through the fan relay 205 and into the efficient fan controller 211 since the efficient fan controller 211 ground is referenced to the hot leg 210b of the system transformer 210.

The zero crossing detector 302 then presents a zero crossing signal 272 to the microprocessor 304 which enables the microprocessor to determine when the system transformer input signal 221 passes above zero volts and below zero volts. This information is used to count cycles for timekeeping purposes and to determine when to activate the switching device 301. The zero crossing times are also required when the switching device 301 is a triac. To operate the triac as a switch, the triac must be fired at all zero crossing transitions.

The AC-DC converter 303 has inputs from the system transformer 221 as well as the thermostat output signals for heat source enable signal 216, compressor enable signal 215, and fan enable signal 212. Any of these signals can be rectified in the AC-DC converter to provide DC power to the microprocessor 304 and to keep an optional battery 306 charged.

The switching device 301 is controlled by the microprocessor 304 and connects the efficient fan controller 211 input 213 to the fan relay control line 212 which in turn, energizes the fan relay 205. The output of switching device 301 is routed through the normally closed relay 309 which when operating properly is switched by the microprocessor 304 to the normally open position allowing a complete circuit from the switching device 301 to the fan relay control output 212.

There is also an optional user interface 305 which may be used to configure the microprocessor 304 to perform in an alternate manner. An optional battery 306 is also shown which could be used in the event that common wire 221 is not present and the switching device 301 is not a triac. A Heat Pump (HP) signal 234 is passed through the signal conditioning 308 element before being passed to the microprocessor. By nature of the zero crossing detector 302, the microprocessor 304 knows when thermostat signals should be above ground and below ground. If the HP signal 234 is not connected to the system transformer 210 as shown in FIG. 2, the microprocessor 304 detects the HP signal 234 is floating and performs like it is connected to a conventional HVAC system. If the HP signal 234 is connected to the system transformer 210 as shown in FIG. 3, the microprocessor 304 sees the HP signal 234 driven above and below ground and preforms like it is connected to a heat pump system with the reversing valve driven for cooling.

Figure 18:
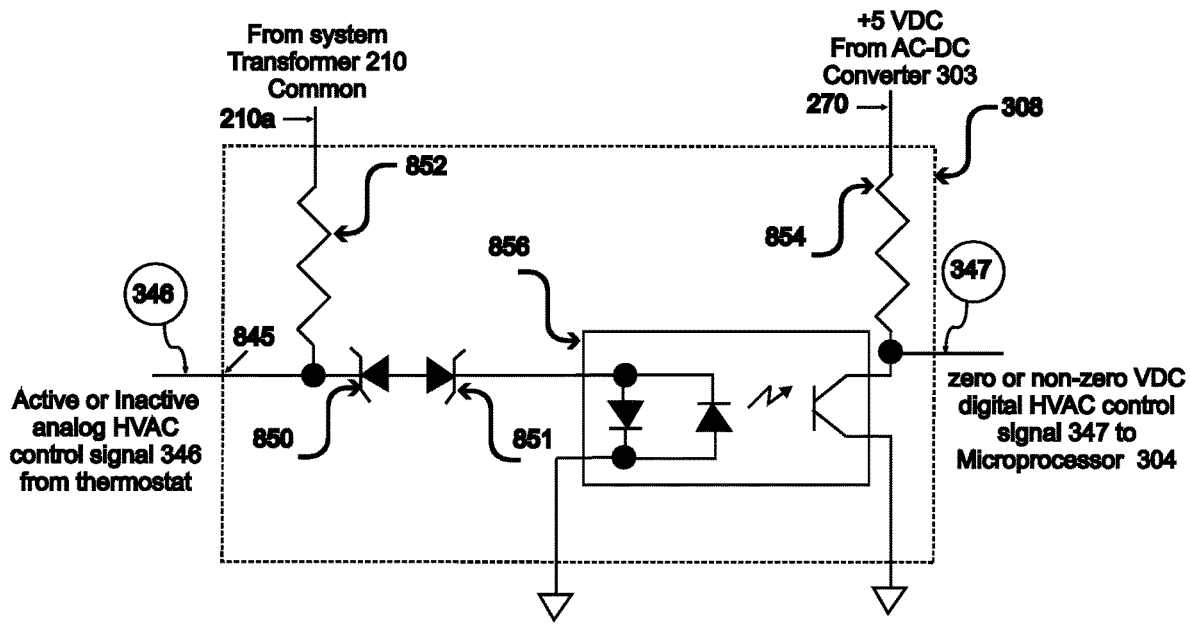
FIG. 18 shows the detail of the signal conditioning circuitry in FIG. 5.

When a diode 275 is introduced as shown in FIG. 4, the HP signal 234 is driven during the positive cycle and floats because of the direction of the diode 275, during the negative cycle where the signal is rectified. The microprocessor 304 detects this state and performs like it is connected to a heat pump system with a HP reversing valve (263 or 264) driven for heating. As discussed above, the microprocessor 304 is configured to detect whether or not a specific signal input is active or inactive based on input signals received from the signal conditioning element 308 which is able to process five low-voltage electrical input signal states: 1) a ground or zero VAC signal (104), 2) a 24 VAC signal (108), 3) a floating signal (102), a false positive stray voltage signal (342) and 5) rectified signal (110). The signal conditioning element 308 converts active analog HVAC control signal inputs from the thermostat 201 to zero Volts Direct Current (VDC) digital HVAC control signals, and converts inactive analog HVAC control signals to non-zero VDC digital HVAC control signals used by the microprocessor 304. The internal elements of signal conditioning element 308 are shown in FIG. 18.

The microprocessor 304 performs several major functions. In terms of timing, the microprocessor 304 keeps track of seconds and minutes by either monitoring the synchronous zero to +5 VAC 60 Hz square wave output from the AC-DC converter 303 referred to as a fifth digital timing HVAC control signal 345 on wire connection 830 to the microprocessor 304, or by counting microprocessor clock cycles. Each positive zero edge accounts for $\frac{1}{60}$th of a second; therefore, sixty positive crossings occur each second. The seconds are then accumulated to keep track of minutes. The negative crossings are also monitored to provide timing for the switching device 301.

The efficient fan controller 211 draws power through the HVAC thermostat or equipment terminal block C common 223 of the 24 VAC transformer 210 (see FIG. 2, FIG. 3, or FIG. 4). The switching device 301 could be standard relay type device, a reed relay or some other electro-mechanical device, and could also be a solid state device such as an FET switch or a triac. In the event that an electro-mechanical switch was used, either an optional battery would be added to power the microprocessor 304 or the inputs 215, 216 or 221 could provide power through the AC-DC converter when the switch is closed. A preferred embodiment of the fan controller uses only the 24 VAC Hot 213 from the system transformer 210 and a triac 301 and does not require a battery.

The microprocessor 304 continuously monitors all inputs to determine if there is any change to the current system operation. In one embodiment, the microprocessor 304 contains FLASH memory, which allows the unit to store the programming instructions and data when there is no power applied to the unit.

The microprocessor 304 monitors the duration of the following thermostat or equipment terminal signals 201: fan "G" 204, AC compressor "Y" 207, and/or heat "W" 208 and adjusts the variable fan-off delay accordingly. If the AC compressor 203 or heat source 202 are operated for a short period of time and there is not much condensation stored on the evaporator or heat stored in the heat exchanger, then the fan relay 205 and system fan/blower 206 operating time will be extended for a shorter period of time or not at all. Likewise, if the AC compressor 203 operates allowing more condensate to be stored on the evaporator, or heater 202 operates longer storing more heat in the heat exchanger, then the efficient fan controller 211 will energize the fan relay 205 and operate the system fan/blower 206 to run for a longer fan-off delay period of time after the AC compressor 203 or heat source 202 have stopped. Timing table and/or algorithms may be modified for particular HVAC system, environments, user preferences, and the like.

In the embodiment of the efficient fan controller 211 using a triac as the switching device 301, the microprocessor 304 does not enable the triac at exactly the zero crossing of the 24 VAC signal. Instead, the microprocessor 304 delays an amount of time into the positive going cycle and allows the positive going waveform to provide a small amount of charge into the AC/DC circuitry. After a small charge has been accumulated, the microprocessor 304 enables the triac to pass the remainder of the power through to the fan relay 205. The sinusoid waveform rises for a short period and then completely shorts out for the duration of the cycle, which passes this energy on to the fan relay 205 and thus actuates it. In this way, the fan relay 205 gets the majority of the full sinusoid waveform and actuates, while enough charge is stored by the AC/DC circuitry to keep the microprocessor 304 running until the next positive going cycle of the full sinusoid waveform.

In another embodiment of the fan controller, a battery 306 is used to supply power to the microprocessor 304 when the efficient fan controller 211 is actuating the fan relay 205. In this embodiment, the 24 VAC signal would be passed to the fan relay 205. This method is less complex but increases the cost of the invention and adds an item (the battery 306) that requires maintenance and periodic replacement.

Figure 6:
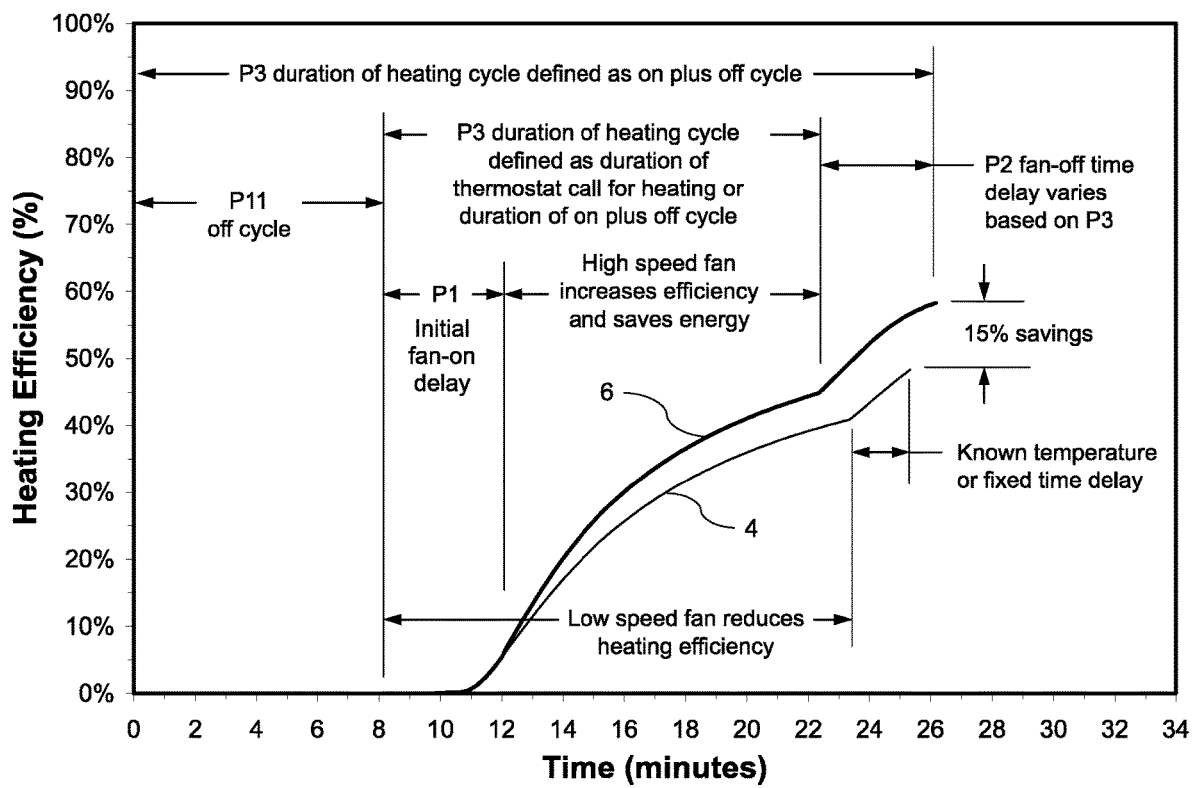
FIG. 6 shows a graph of delivered gas furnace heating efficiency for a known HVAC system fan control and the fan control according to the efficient fan controller.

FIG. 6 shows a graph comparing delivered gas furnace heating efficiency for the known HVAC fan control 4 and efficient fan control 6. The efficient HVAC fan control 6 improves xheating system efficiency and reduces gas furnace operation by energizing a fan relay 205 to switch the heating fan speed to a higher fan speed than when the fan relay 205 is not energized increasing fan speed from the low speed used for heating to a fan speed higher than the low speed where the higher fan speed is typically used for cooling wherein the fan relay 205 is energized after a first time period P1 initial fan-on delay of 0 to 4 minutes after the heat exchanger reaches operating temperature. The efficient HVAC fan control 6 also maximizes heat recovery from the heat exchanger after the heat source is turned off with an extended variable fan-off delay based on the heating cycle duration P3 defined as the heating on time from when the thermostat initiates a call for heating until the thermostat terminates the call for heating or the heating cycle duration is defined as the heating off time defined from when the thermostat terminates the call for heating until the thermostat initiates the call for heating plus the heating on time. Known fixed-time or temperature fan-off delay control 4 wastes more energy by leaving the heat exchanger with significantly higher temperatures of 260 to 380 degrees Fahrenheit (° F.). FIG. 6 shows the efficient HVAC fan control 6 improving heating efficiency and savings 15% compared to known control 4.

Figure 7:
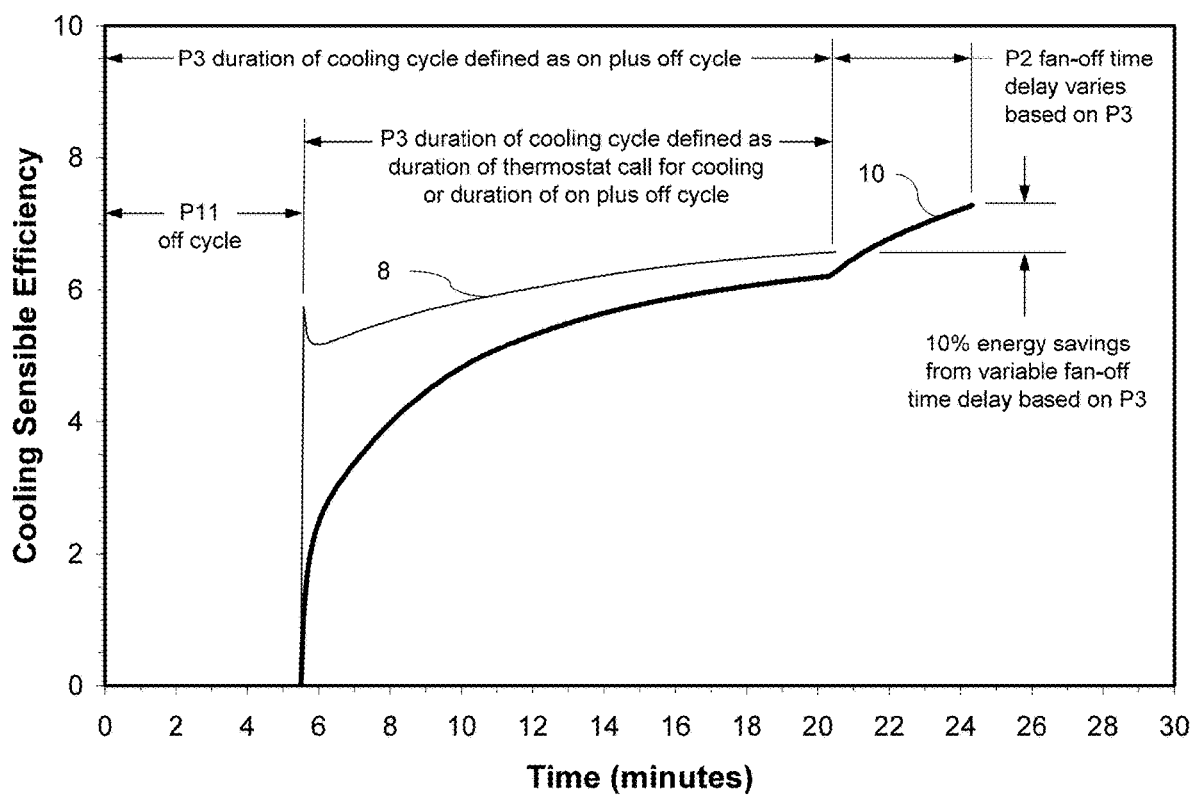
FIG. 7 shows a graph of direct-expansion air conditioning sensible cooling efficiency for the known HVAC fan control and the fan control according to the efficient fan controller.

FIG. 7 shows a graph comparing sensible cooling efficiency for the known HVAC fan control 8 and efficient fan control 10. The efficient fan controller 211 control 10 monitors and controls the HVAC fan improves cooling system efficiency and maximizes sensible cooling recovery from the evaporator after the AC compressor is turned off with an extended variable fan-off time delay based on the cooling cycle duration P3 defined as a cooling on time from when the thermostat initiates a call for cooling until the thermostat terminates the call for cooling or the cooling cycle duration defined as the cooling off time from when the thermostat terminates the call for cooling until the thermostat initiates the call for cooling plus the cooling on time. Known fixed-time delay control 8 is slightly more efficient at the beginning of the cycle due to an initial "wet coil" due to water left on the evaporator coil with no delay. The efficient fan controller 10 operates the fan for an extended variable fan-off delay based on P3 providing evaporative cooling at the end of the cycle delivering more sensible cooling and thermal comfort and extending the P11 off cycle to reduce compressor operation and save 10% compared to known control 8.

Figure 8:
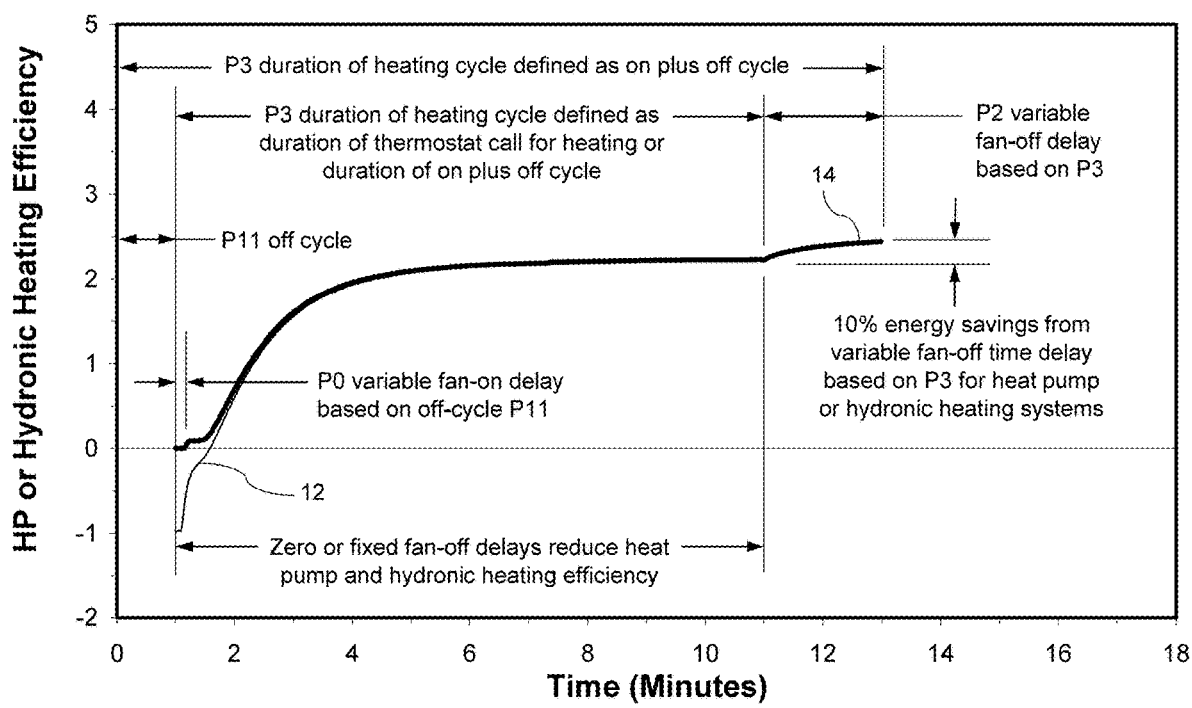
FIG. 8 shows a graph of delivered heat pump or hydronic heating efficiency for the known HVAC fan control and the fan control according to the efficient fan controller.

FIG. 8 shows a graph comparing heat pump (HP) or hydronic heating efficiency for the known fan control 12 and the efficient fan controller 14. The efficient fan controller 14 monitors and controls the HVAC fan and calculates a short fan-on delay P0 based on the previous heating off-cycle duration P11. The efficient fan control 14 improves heating efficiency and maximizes heat recovery from the heat pump coil or hydronic heat exchanger after the thermostat call for heating has ended with an extended variable fan-off time delay based on the heating cycle duration P3 defined as the heating on time from when the thermostat initiates a call for heating until the thermostat terminates the call for heating or the heating cycle duration defined as the heating off time from when the thermostat terminates the call for heating until the thermostat initiates the call for heating plus the heating on time. Known fixed-time delay control 12 wastes energy by leaving the heat pump or hydronic heat exchanger with unrecovered sensible heating energy and higher heat exchanger temperatures of 110° F. for heat pumps and 130 to 160° F. for hydronic heating systems. FIG. 8 shows the efficient fan control 14 improving saving 10% compared to known control 12.

Figure 9:
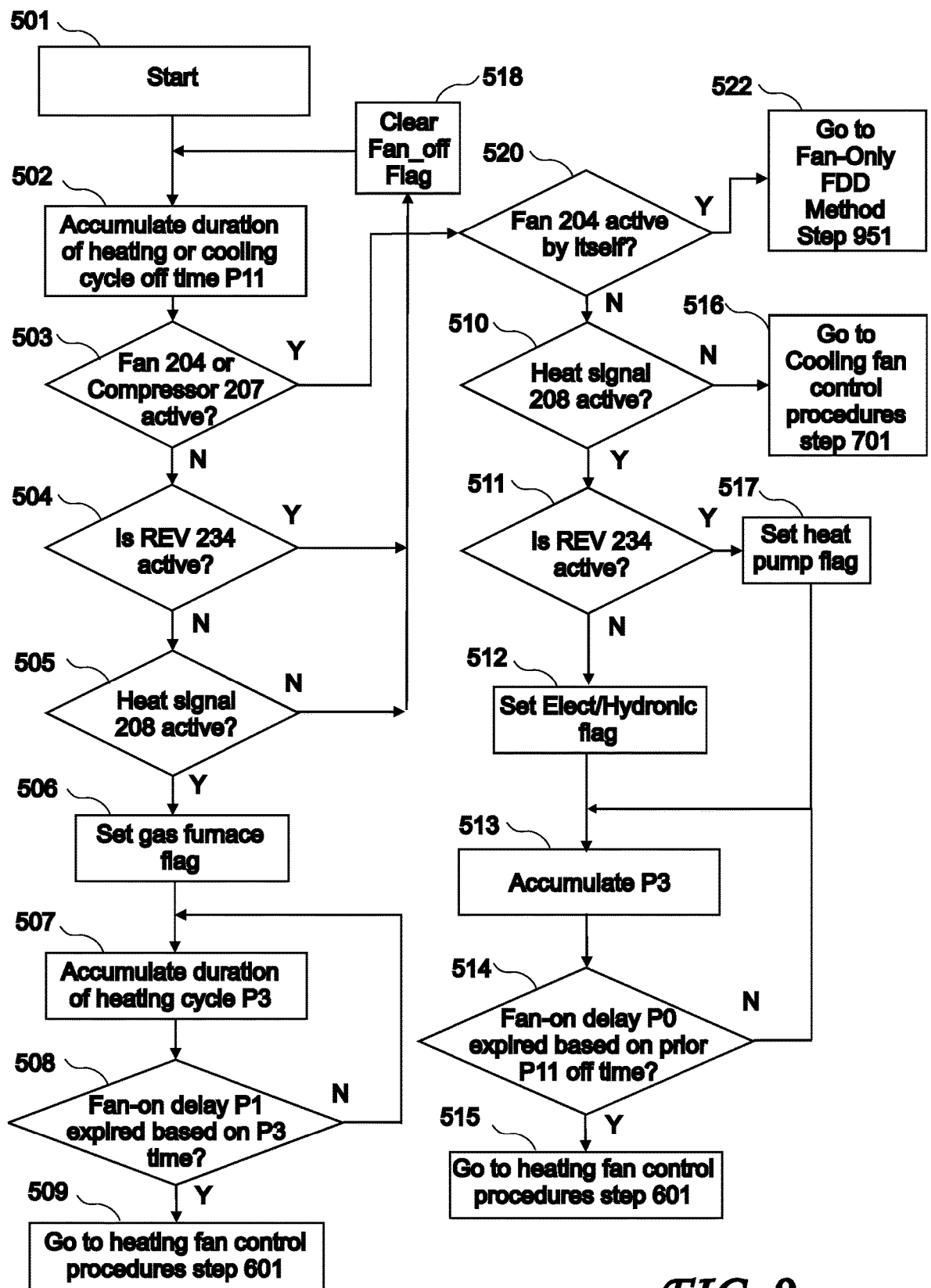
FIG. 9 shows a first method for determining what type of system is connected and what operational mode to execute, according to the present invention.

FIG. 9 shows a first method for the efficient fan controller used to determine what type of system is connected and what operational mode to execute. Step 501 is the reset point of the software and the point which is used once the variable fan-off delay P2 is completed. If not already done, switch 309 is moved from the normally closed position to the normally open position to connect the fan output signal 212 to the switch 301. Step 502 is used to keep track of the amount of time the duration of the heating or cooling cycle off time P11. This time is accumulated to P11 and is referenced when there is a fan-on time delay PO for the start of the fan. In some systems, the fan start time is delayed by PO before being energized while the heat or cooling source is brought to operational temperature. Thermostats connect at least one output signal to the transformer Hot R 209 when calling for either heating or cooling. Step 503 is used by the efficient fan controller to determine if the Fan G 204 signal received by efficient fan controller input 214 or the AC Y 207 signal received by efficient fan controller input 215 is "on" or active. If either signal is active, then the efficient fan controller determines whether or not the heat source Heat W 208 signal is active simultaneously which would indicate either a heat pump, electric heat, or hydronic heat is active. If Step 503 determines that the Fan 204 or Compressor 207 signal is active then the efficient fan controller goes to Step 520 to determine if the fan 204 is active by itself, and if so, then proceeds to Step 522 "Go to Fan-only FDD method Step 951.

If the Fan G 204 signal is not active, then the efficient fan controller drops to Step 504 to determine if it is configured for heat pump operation by connecting input HP 234 to the hot side of the system transformer 210*b* through wire 265 for a heat pump with reversing valve normally energized for cooling (see FIG. 3) or a wire with a diode 275 for a heat pump with reversing valve normally energized for heating (see FIG. 4). Step 504 is used to determine if HP 234 is connected to the hot side of the system transformer 210*b*. If HP 234 is connected to the hot side of the system transformer 210*b*, either with a wire 265 or a diode 275, then the efficient fan controller knows it is connected to a heat pump. If the efficient fan controller is connected to a heat pump, and the fan signal 204, or compressor signal 207 are not active, then the efficient fan controller can ignore the signal on the Heat W 208 since the main driver of a heat pump is the compressor and the efficient fan controller will determine that the compressor is not energized. Step 505 is enabled after the efficient fan controller determines that the HP 234 input is floating and not connected to the hot side of the system transformer 210*b*. Step 505 is then used by the efficient fan controller to check if the Heat W 208 signal to input 216 is active. If the Heat W 208 signal to input 216 is active and no other inputs are active, then the efficient fan controller knows the system is a gas furnace and the thermostat is calling for heating. Step 506 sets a flag to indicate that the system is a gas furnace in heating mode. Step 507 is the entry into the loop that accumulates the duration of the heating cycle P3 while the gas furnace is operating before the fan-on time delay P1 has expired. The fan-on time delay P1 is used to activate the system fan. Step 508 determines whether or not the fan-on time delay P1 has expired. If time P1 has not expired, then the efficient fan controller continues to accumulate the duration of the heating cycle P3. If fan-on delay time P1 has expired, the efficient fan controller immediately jumps to Step 509 and Step 601 for heating fan control procedures (see FIG. 10). Step 602 activates the switch 301 which drives a 24 VAC signal to the output 212 which in turn activates the fan relay 205 and turn on the system fan/blower 206.

Step 510 is entered after the efficient fan controller 211 has detected that either the fan signal 204 or compressor signal 207 are active in Step 503. Step 510 checks if the HP reversing valve signal REV 235 to input 216 is active as well (see FIGS. 3 and 4). If the REV signal 235 to input 216 is not active, then the efficient fan controller knows the system is either in cooling mode or fan only mode and jumps to Step 516 and Step 701 to continue with cooling fan control procedures. If the REV signal 235 to input 216 is active simultaneously with the fan signal 204 to input 214 or compressor signal 207 to input 215, then the efficient fan controller proceeds to Step 511 and examines the HP 234 signal. Step 511 checks to see if the fan controller 211 is connected to a heat pump by the HP signal 234 connected to the system transformer hot signal 210b. If the HP 234 signal is connected to the hot side system transformer 210b, then the efficient fan controller goes to Step 517 to set a flag to indicate the efficient fan controller is connected to a heat pump system in heating mode and the thermostat is actively calling for heat. If the HP 234 is floating, then the efficient fan controller has determined it is connected to an electric or hydronic heating system and heat is being called for by the thermostat 201. Step 512 sets a flag indicating that the efficient fan controller is in electric or hydronic heating mode. Step 513 is the entry for a loop used to accumulate the duration of the heating cycle P3 for a fan-on delay time P0 based on the previous off-cycle time P11 during which the heating element is allowed to reach operational temperature. Step 513 accumulates the duration of the heating cycle P3 prior to expiration of the fan-on delay time P0. Step 514 is used to determine whether or not the fan-on delay time P0 has expired. If the system has been off for a longer period of time, then the fan-on time delay P0 is increased as it would take longer for the heating element (or heating coil) to reach a useful heating temperature required to deliver warm air to the conditioned space. The efficient fan controller may set the heating fan-on time delay P0 to zero. In Step 514, after the fan-on delay time P0 has expired, the efficient fan controller immediately jumps to Step 515 and Step 601 for heating fan control procedures (see FIG. 10). Step 602 activates the switch 301 which drives a 24 VAC signal to the output 212 which in turn activates the fan relay 205 and turn on the system fan.

Figure 10:
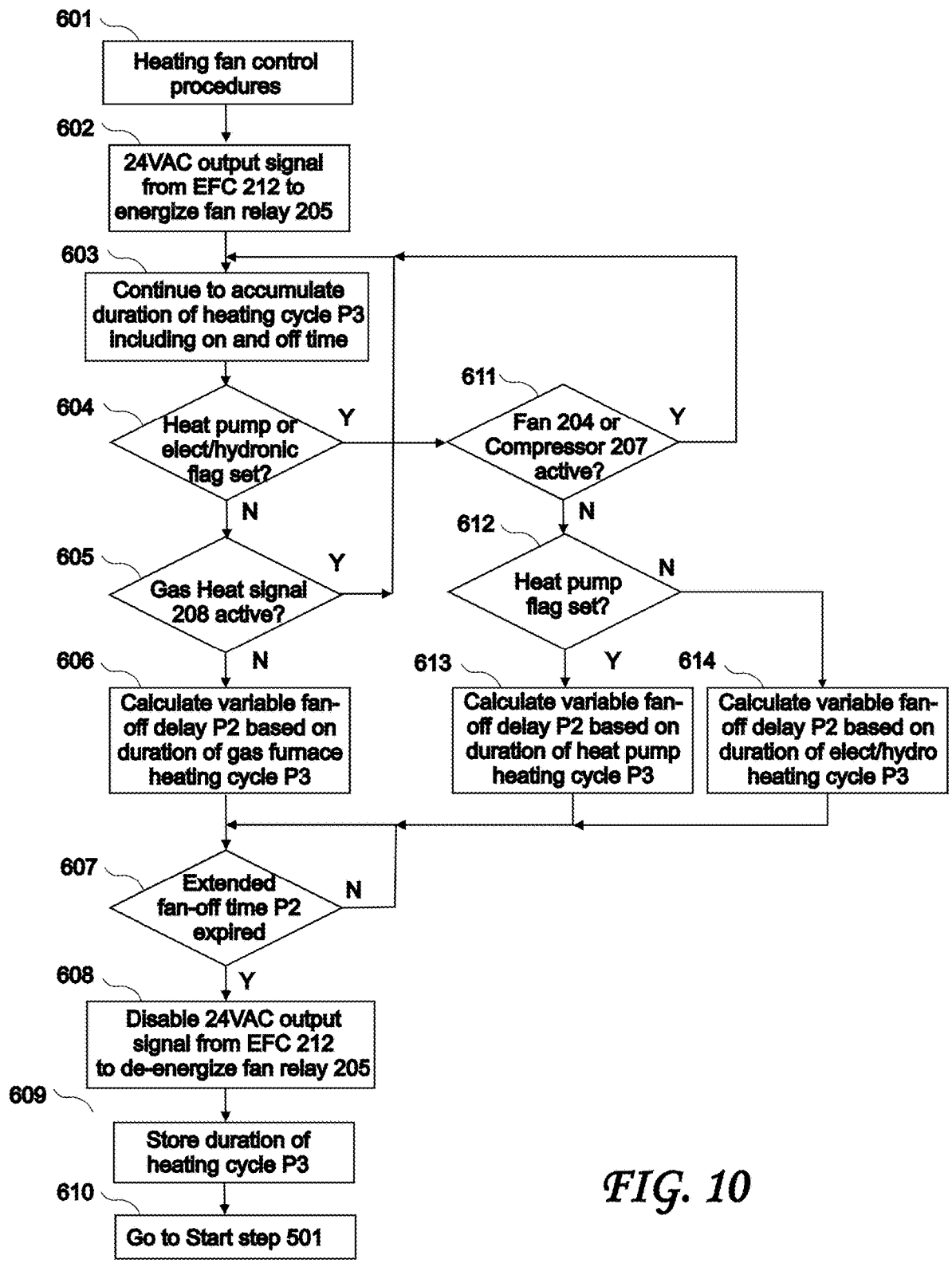
FIG. 10 shows a method for determining variable fan-on and fan-off time delays based on the heat mode operational time, according to the present invention.

FIG. 10 shows a method for heating according to the present invention. Step 601 is the beginning of the method for heating fan control procedures. Step 602 activates switch 301 which connects 24 VAC to the output 212. This in turn connects 24 VAC to the fan relay 205 which activates the system fan 206. Step 603 is the entry of a loop that runs continuously while the thermostat 201 is calling for heat, regardless of system type. The duration of the heating cycle P3 is accumulated until the thermostat 201 is satisfied and discontinues the call for heating. Step 604 is used to check if the system is connected to a gas furnace or one of the other system configurations such as a heat pump, electric heating, or hydronic heating based on previous flag settings. If connected to a gas furnace, the efficient fan controller proceeds to Step 605, and if the gas furnace signal 208 to input 216 is still active, the efficient fan controller keeps looping and accumulating the duration of the heating cycle P3. If the efficient fan controller is not connected to a furnace, it uses the compressor signal 207 to input 215 or the fan signal 204 to input 214 to continue in the loop and accumulate the duration of the heating cycle P3. Step 606 is entered when the thermostat 201 call for heating has been satisfied and the gas furnace heat source has been de-activated. Step 606 now has all the necessary information to calculate the fan-off time delay P2 based on the duration of the heating cycle P3, and the fact that the efficient fan controller is connected to a gas furnace. Step 607 continues to operate the system fan 206 for the variable fan-off time delay P2 until the time delay P2 has expired. After the time delay P2 has expired the efficient fan controller proceeds to Step 608 and turns off the switching device 301 which removes the 24 VAC from the efficient fan controller output 212 which in turn deactivates the fan relay 205 and the system fan 206. Step 609 stores the duration of the heating cycle P3 of the heat source for later use. Step 610 is entered when all the housekeeping is completed for the system heating mode and fan operation, and the system returns to the start Step 501 (see FIG. 9).

Step 611 is entered when the efficient fan controller is connected to either a heat pump, electric heater, or hydronic heat system and the thermostat 201 is calling for heating. Step 611 looks to see if the compressor signal 207 to input 215 or the fan signal 204 to input 214 are still active. At least one of these signals is active during the entire heating cycle. If either signal is active, then the efficient fan controller loops to accumulate the duration of the heating cycle P3. Step 612 is entered when the thermostat 201 on the heat pump, electric, or hydronic system has been satisfied and de-energizes the heat source. Step 612 further determines if the just completed cycle was for a heat pump by examining the heat pump flag. The fan-off time delay P2 is then determined based on the type of system that called for heating. Step 613 is entered when the thermostat 201 has been satisfied and turns off the heat pump. Step 613 now has all the information necessary to calculate the fan-off time delay P2 based on the duration of the heating cycle P3, and the efficient fan controller has determined that the controller is connected to a heat pump. Step 614 is entered when the thermostat 201 has been satisfied and turns off the electric or hydronic heat source. Step 614 now has all the information necessary to calculate the fan-off time delay P2 based on the duration of the heating cycle P3, and the efficient fan controller has determined that it is connected to an electric or hydronic heat source.

Figure 11:
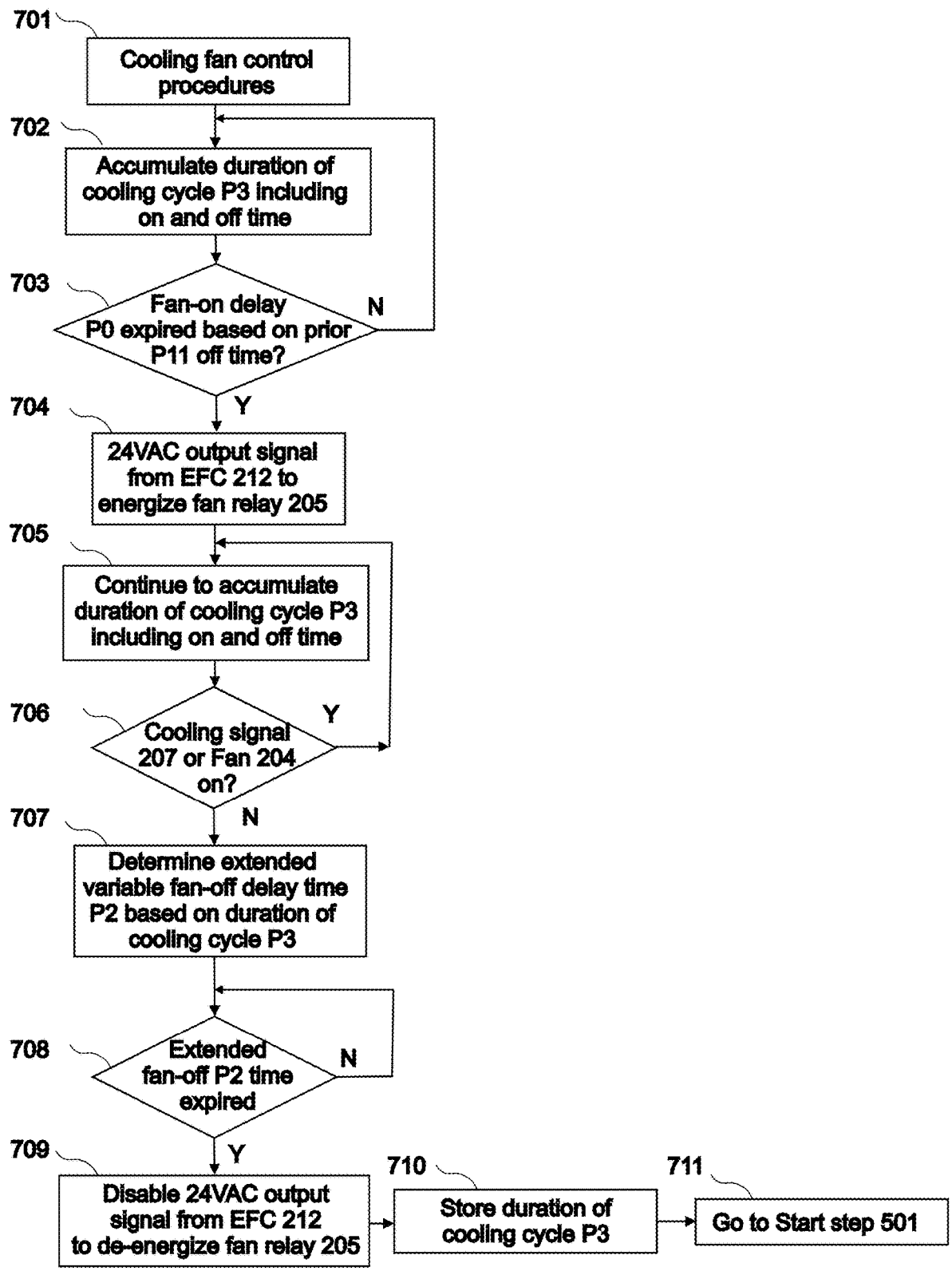
FIG. 11 shows a method for determining variable fan-on and fan-off time delays based on the cooling mode operational time, according to the present invention.

FIG. 11 shows a method for cooling fan control according to the present invention. Step 701 is the entry point for cooling or fan only operation of all types of systems. Step 702 is the entry point for a loop which accumulates the duration of the cooling cycle P3. Step 703 evaluates whether or not the fan-on delay time P0 has expired based on the current cycle P3 and the previous cooling cycle off time P11. Step 703 is used to check if the delay time P0 has expired and if not, continue to accumulate the duration of the cooling cycle P3 for the entire duration of the cooling cycle. The efficient fan controller may set the cooling fan-on time delay P0 to zero. Step 704 activates switch 301 which connects 24 VAC signal to the output 212. This in turn connects 24 VAC to the fan relay 205 which activates the system fan 206. Step 705 is the entry of a loop that runs continuously while the thermostat 201 is calling for cooling. Step 705 continues to the duration of the cooling cycle P3 until the thermostat 201 temperature is satisfied and discontinues to call for cooling. Step 706 checks the compressor cooling signal 207 to input 215 and fan signal 204 to input 214 to determine if cooling is still active, and if so continues to loop and accumulate the duration of the cooling cycle P3. Step 707 is entered when the thermostat 201 temperature setting has been satisfied and turns off the cooling compressor. Step 707 now has all the information necessary to calculate the fan-off time delay P2 based on the duration of the cooling cycle P3. Step 708 continues to operate the system fan 206 for the variable fan-off delay time P2 until the fan-off time delay P2 has expired. Step 709 turns off the switching device 301 which removes the 24 VAC from the efficient fan controller output 212 which in turn de-activates the fan relay 205 and the system fan 206. Step 710 stores the duration of the cooling cycle P3 for later use. Step 711 is entered when all the housekeeping is completed for the system cooling mode and fan operation, and the system returns to the start step 501 (see FIG. 9).

Figure 12:
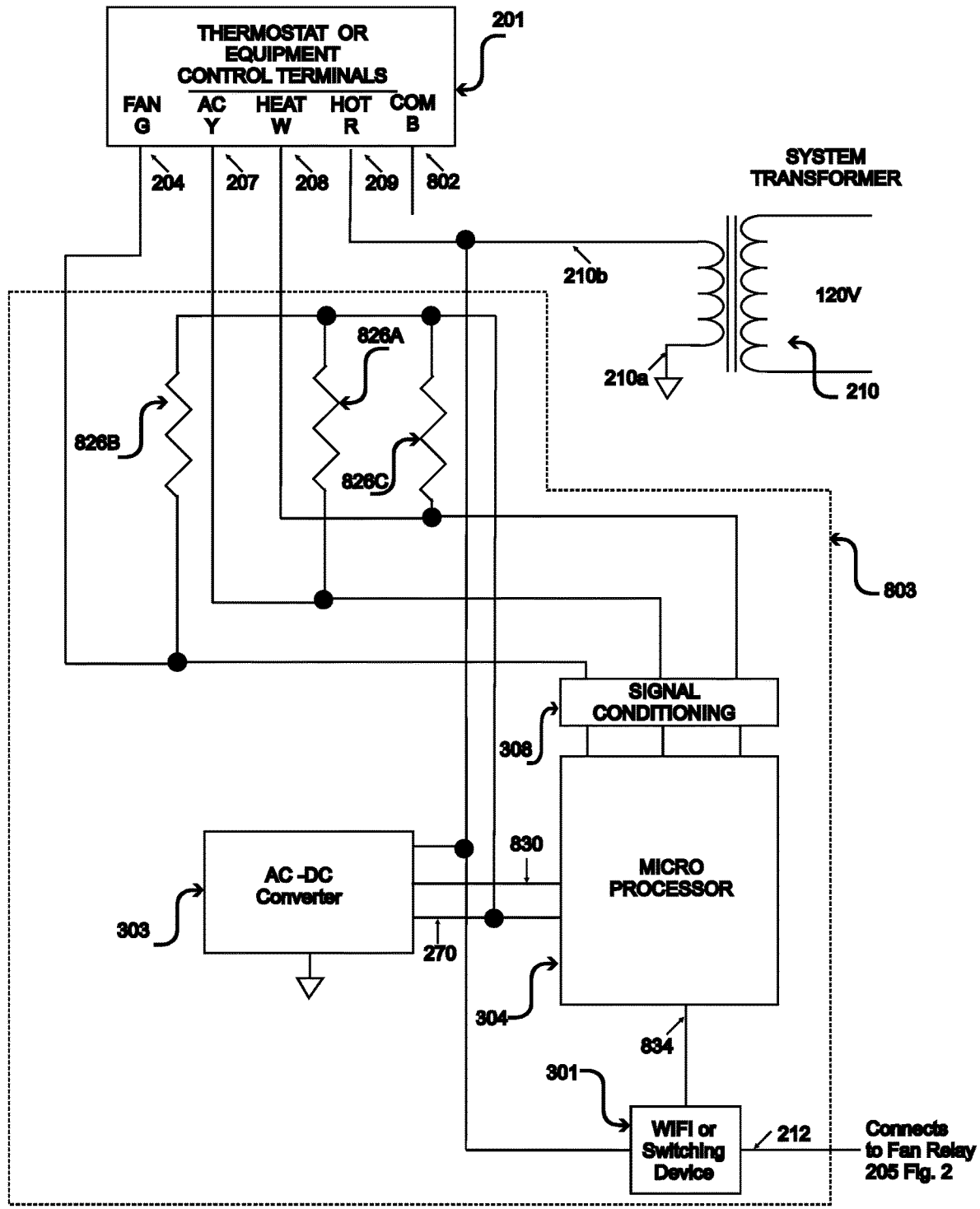
FIG. 12 shows the signals coming from the thermostat and going to the microprocessor with pull up resistors used to facilitate the processor interpreting three distinct states of the input signals, active, floating, or off.

FIG. 12 shows three resistors 826A, 826B, and 826C used to pull up the Fan G 204, AC Y 207, and Heat W 208 signal inputs to microprocessor 304 to a known state (+5 VDC) when the input signal floats (i.e., neither ground nor 24 VAC). Also shown in FIG. 12 is the Alternating Current Direct Current (AC-DC) converter 303 which converts the 24 VAC 60 Hertz (Hz) power signal 210b from the system transformer 210 into a synchronous zero to +5 VDC 60 Hz square wave which is referred to as a fifth digital timing HVAC control signal 345 on wire connection 830 to the microprocessor 304 (see discussion regarding FIGS. 14-16). The fifth HVAC control signal 345 is used by the microprocessor 304 software as a zero crossing detector timing signal function similar to the zero crossing detector function shown in block 302 of FIG. 5. The zero crossing detector function is disclosed in the Walsh U.S. Pat. No. 8,763,920 ('920 patent) to which this application claims priority and the '920 patent is incorporated herein by reference in its entirety. See, e.g., Walsh '920 at Col. 6, lines 14-41. The microprocessor 304 zero crossing detector software function is used to determine when the 24 VAC 60 Hz power supply input 210b from the system transformer 210 transitions from a positive voltage to a negative voltage or from a negative voltage to a positive voltage, for timing to sample the thermostat outputs 204, 207, and 208 through signal conditioning element 308. The signal conditioning element 308 converts analog HVAC control signal inputs from the thermostat 201 into digital HVAC control signals used by the microprocessor 304.

FIG. 13 shows prior art thermostat wiring when only 4 wires are available in the wiring harness. This case is prevalent in existing buildings which were built before Smart Communicating Thermostats were available. Most thermostats prior to Smart Communicating Thermostats simply connected the Hot R terminal 209 to the appropriate output based on whether the thermostat was set for heating or cooling. For cooling, the standard thermostat connects the Hot R terminal 209 to both the Fan G terminal 204 and the AC Y terminal 207. This activates the compressor and the system fan. For heating, the thermostat connects the Hot R terminal 209 to the Heat W 208 terminal. With these 4 wires, a standard thermostat can control the HVAC system to heat or cool a building. Smart Communicating Thermostats generally require an additional wire to bring a Common 802A signal to the thermostat Com B input 802. Without the fifth wire included in the original wiring harness, a solution is required to use one of the existing 4 wires to carry two signals and free one of the other wires to supply the transformer 210 common wire to the thermostat Com B 802 input.

Figure 14:
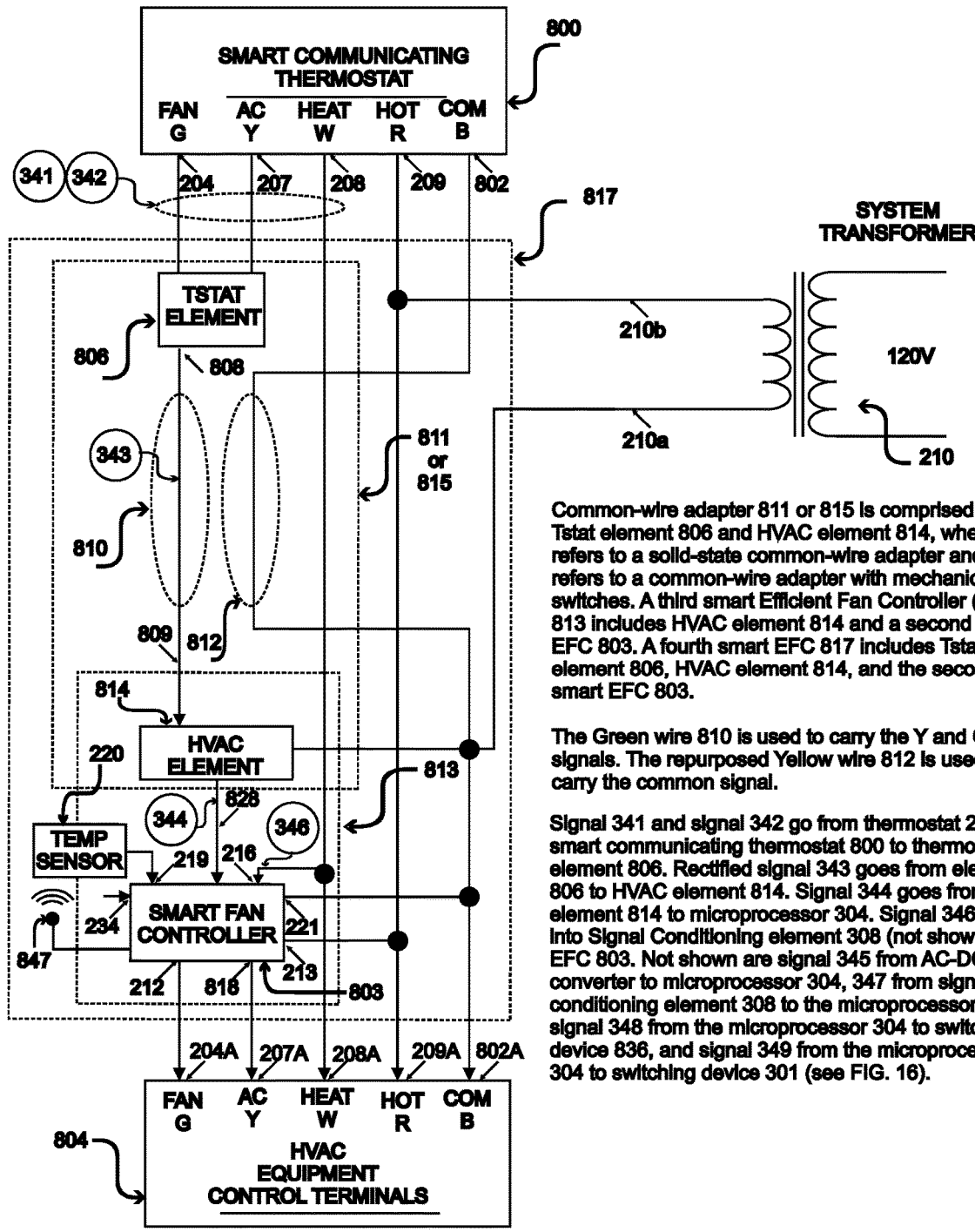
FIG. 14 shows a solid-state common-wire adapter 811 or common wire adapter 815 comprised of a Thermostat Element 806 and an HVAC Element 814 where the HVAC Element 814 can be an integrated element of the Efficient Fan Controller (EFC) 813. The present invention Efficient Fan Controller embodiment 817 comprises: 1) a thermostat element 806, 2) an HVAC element 814, and 3) an EFC element 813. The Thermostat Element 806 inputs are connected to the thermostat G and thermostat Y or thermostat W terminals on one side and the thermostat element 806 is connected using a repurposed wire or electrical connection 810 to input 809 of the HVAC Element 814 on the other side. The Efficient Fan Controller 817 output 212 connects to the fan relay 205 and output 818 connects to the Y terminal or the W terminal or the HP reversing valve O or B terminals of the HVAC equipment control terminals 804. The smart fan controller includes a temperature sensor input 219 for an air temperature sensor 220 to measure an air temperature.

FIG. 14 shows a common-wire adapter comprising a Thermostat Element 806 and an HVAC Element 814 according to the present invention used to create a common signal path with only four wires between the thermostat 201 or the Smart Communicating Thermostat 800 and HVAC equipment 804. The Smart Communicating Thermostat 800 has for example the Fan G terminal 204 and the AC Y terminal 207 signals going into the Thermostat Element 806. A single repurposed wire or electrical connection 810 comes out of the Thermostat Element 806. This single repurposed wire or electrical connection 810 can be either the existing Yellow wire from AC Y 207 to AC Y 207A or the existing Green wire from Fan G 204 to Fan G 204A or an existing Orange wire from Rev O 235 to Rev O 235A (for a HP reversing valve) or an existing Brown wire from Rev BR 236 to Rev BR 236A (for a HP reversing valve). FIG. 14 shows the Green wire indicated by a dashed oval 810 used for both the Green and Yellow wire signals. With two signals now on a single repurposed wire or electrical connection 810 the Yellow wire in the harness is available to be reconnected at the HVAC Equipment Terminals 804 to the Com B terminal 802A. The Yellow wire is repurposed with a new function to carry the Common signal from the HVAC Equipment Control Terminals to the Smart Communicating Thermostat 800 Com B input. The new function is represented by the dashed oval 812. At the Smart Communicating Thermostat 800, the Yellow wire is connected to the Com B terminal 802. The output of the Thermostat Element 806 goes to the input 809 of the HVAC Element 814. The function of the HVAC Element 814 is to reproduce the signals routed through the Thermostat Element 806 to the HVAC Equipment Control Terminals 804 with full fidelity.

FIG. 14 shows the Thermostat Element 806 receives at least one first analog HVAC control signal 341 and one second analog HVAC control signal 342 (circled numbers identify control signals) from the thermostat 201 or the Smart Communicating Thermostat 800. The thermostat element 806 rectifies the at least one first analog HVAC control signal 341 and the at least one second analog HVAC control signal 342 into at least one third analog HVAC control signal 343. The signal conditioning element 308 receives at least one sixth analog HVAC control signal 346 from the thermostat 201 or a smart communicating thermostat 800. The HVAC element 814 converts the at least one third analog HVAC control signal 343 into at least one fourth digital HVAC control signal 344, and provides the at least one fourth digital HVAC control signal 344 to the microprocessor 304 using electrical connection 828. The microprocessor 304 uses the fourth HVAC control signal 344 and a fifth digital timing control signal 345 from an Alternating Current to Direct Current (AC-DC) converter 303 (shown in FIG. 16) to detect an active Fan G 204 signal or an active AC Y 207 signal or an active Heat W signal. The AC-DC converter 303 (shown in FIG. 16) converts a 24 Volt Alternating Current (VAC) 60 Hertz (Hz) power signal from the system transformer 210 to a 5 VDC signal 270 used to power the Fan Controller or EFC 803. The fifth digital timing HVAC control signal 345 from the AC-DC convertor 303 to the microprocessor 304 is synchronous with the 24 VAC 60 Hz power signal from the system transformer 210. The microprocessor 304 also uses the signal conditioning element 308 (shown in FIG. 18) to process and detect at least one sixth analog HVAC control signal 346. A first switching device 836 is connected to the microprocessor 304 and receives a control signal from the microprocessor 304, if the microprocessor 304 determines that the at least one fourth digital HVAC control signal 344 is zero VDC based on the at least one first analog HVAC control signal 341 being positively or negatively rectified during a time when the at least one fifth digital timing HVAC control signal 345 transitions to a positive or a negative edge of a 60 Hz input. The first switching device 836 energizes at least one HVAC device 340 selected from the group consisting of: an AC/Heat Pump (AC/HP) compressor 203, a HP reversing valve 263 or 264, a heat source 202, a fan relay 205, and system fan/blower 206. A second switching device 301 is connected to the microprocessor 304 to energize the second switching device 301 if the microprocessor 304 determines that the at least one fourth digital HVAC control signal 344 is zero VDC based on the at least one second analog HVAC control signal 342 being positively or negatively rectified during a time when the at least one fifth digital timing HVAC control signal 345 transitions to a positive or a negative edge of the 60 Hz input, whereupon the second switching device 301 energizes the fan relay 205 and the system fan/blower 206. The signal conditioning element 308 is configured to provide at least one seventh HVAC control signal 347 selected from the group consisting of: a digital fan signal, a digital AC/HP compressor signal, and a digital heat signal to the microprocessor 304 by converting at least one active or inactive sixth analog HVAC control signal 346 from the thermostat 201 or the smart communicating thermostat 800, wherein the signal conditioning element 308 converts an active analog HVAC control signal to a zero VDC digital HVAC control signal and the signal conditioning element 308 converts an inactive analog HVAC control signal to a non-zero VDC HVAC control signal. Alternatively, a non-zero VDC signal could be used to indicate an active analog HVAC control signal and a zero VDC signal could be used to indicate an inactive analog HVAC control signal (see paragraph 0138).

Figure 15:
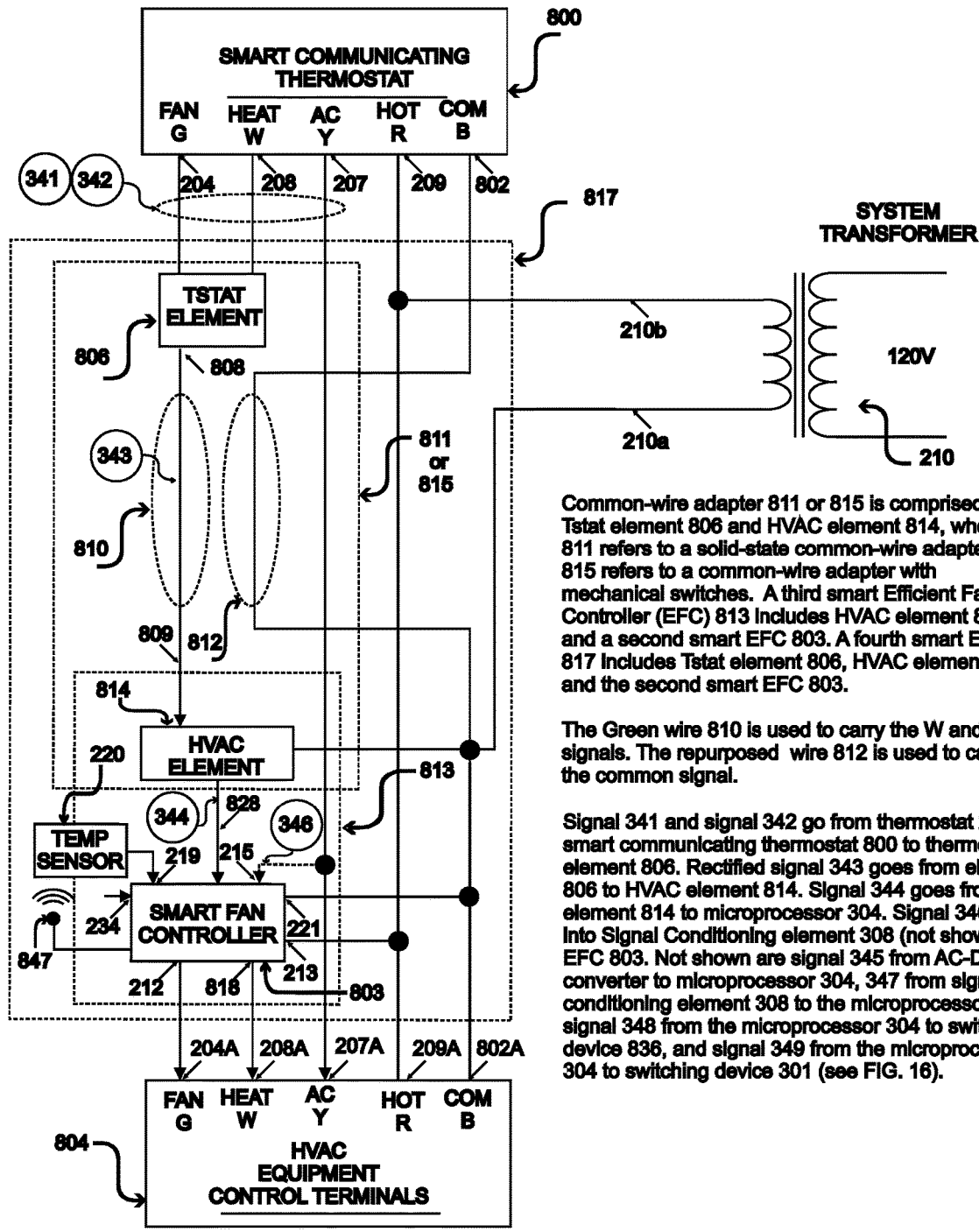
FIG. 15 shows a Common Wire Adapter 815 comprised of a Thermostat Element 806 and an HVAC Element 814 where the HVAC Element 814 is an integrated element of the Efficient Fan Controller (EFC) (811) embodiment. The Thermostat Element 806 inputs are connected to the thermostat G and thermostat W terminals on one side and connected to input 808 of the HVAC Element 814 on the other side. The Efficient Fan Controller 811 output 212 connects to the ran relay 205 and output 818 connects to the W terminal.

FIG. 15 is similar to FIG. 14 with the exception being the Thermostat Element 806 is connected to the G 204 and the W 208 terminals of the thermostat. These two signals are then combined using the diodes 820 and 822 (see FIG. 16), and the rectified signal is sent to the HVAC element via the repurposed wire or electrical connection 810. The HVAC element output wire 818 is connected to the Heat W 208A terminal of the HVAC Equipment Control Terminals 804. The wire from the smart communicating thermostat 800 AC Y terminal 207 now makes an uninterrupted connection to the AC Y terminal 207 A HVAC Equipment Control Terminal. FIG. 14 and FIG. 15 show the smart communicating thermostat 800 Fan G terminal 204 connected to the thermostat element 806 with either the AC Y 207 (FIG. 14) or the Heat W 208 (FIG. 15) connected. In another embodiment, the AC Y 207 and Heat W 208 could be connected to the thermostat element 806 and the Fan G 204 terminal could be connected to the EFC 803 directly through the signal conditioning element 306 (shown in FIG. 16 and FIG. 18). Alternatively, the Fan G 204 could be connected to the thermostat element 806 with any other 24 VAC signal from the smart communicating thermostat 800 including the Heat W 208, AC Y 207, or if present, the reversing valve signal REV O 235 or Rev BR 236. The smart fan controller includes a temperature sensor input 219 for an air temperature sensor 220 to measure an air temperature.

Figure 16:
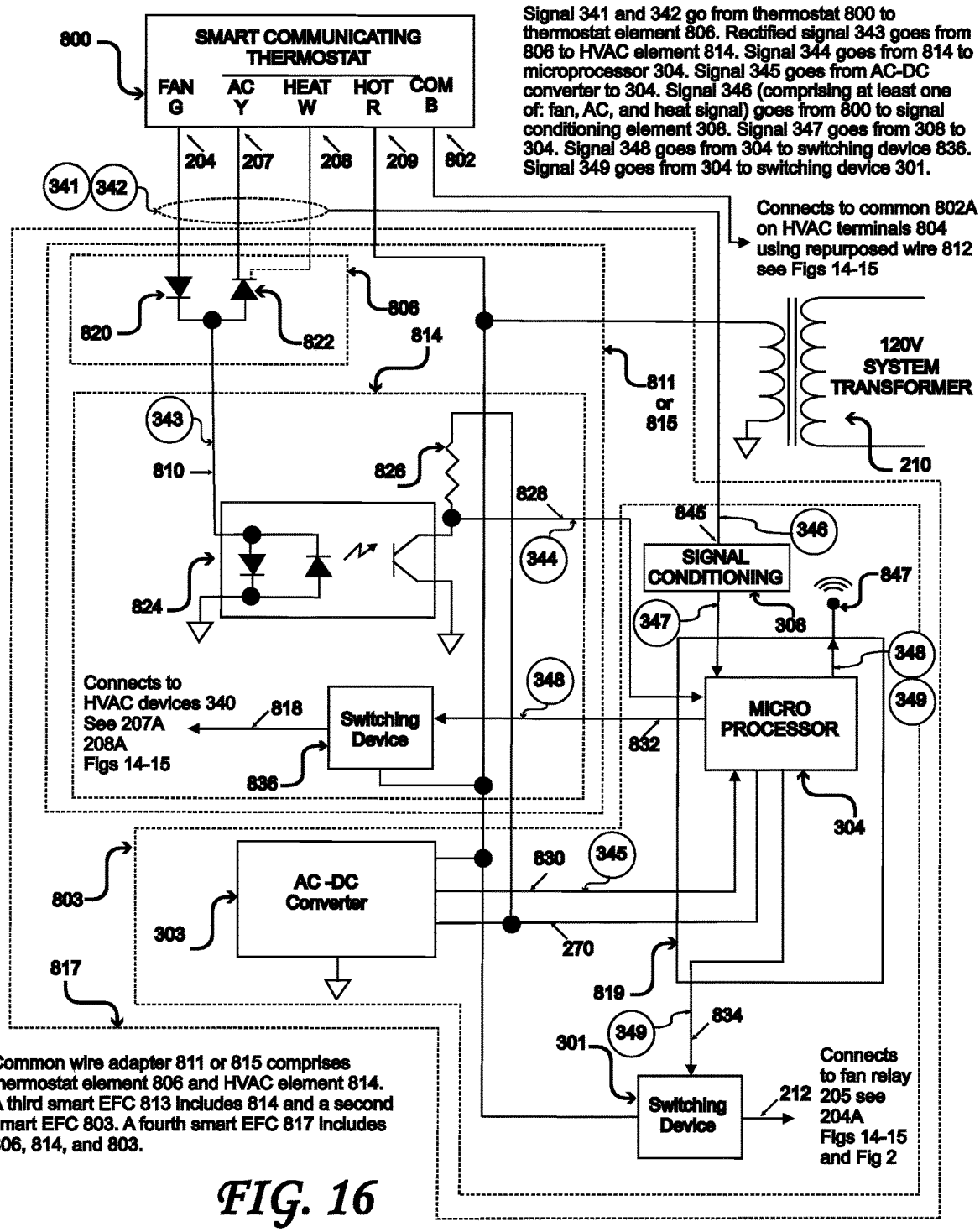
FIG. 16 shows an embodiment of the present invention of a common wire adapter 815 comprised of a Thermostat Element 806 and an HVAC Element 814. The HVAC Element uses optoisolators and a microprocessor to trigger switching devices to create a full sinusoid waveform from a positively or negatively rectified input signal (see FIG. 19) to allow a pre-existing wire to be repurposed and provide an electrical path to carry the common signal 802A of the system transformer 210 to the smart communicating thermostat 800.

FIG. 16 shows a Common Wire Adapter 815 comprised of a Thermostat Element 806 including two diodes 820 and 822 and an HVAC Element 814 including an optoisolator 824 and a pull up resistor 826. The HVAC Element 814 provides a fourth digital HVAC control signal 344 to the microprocessor 304 representing the first analog HVAC control signal 341 or the second analog HVAC control signal 342 in response to the third analog HVAC control signal 343 where the fourth digital HVAC control signal 344 is a zero Volts Direct Current (VDC) digital signal if there is a positively or negatively rectified signal from the thermostat element 806 and a non-zero VDC digital signal otherwise. In another embodiment, the HVAC Element 814 could provide a non-zero VDC fourth digital HVAC control signal 344 to represent an active first analog HVAC control signal 341 or active second analog HVAC control signal 342 if there is a positively or negatively rectified signal from the thermostat element 806 and a non-zero VDC digital signal otherwise. The AC-DC converter 303 provides a fifth digital timing control signal 345 to the microprocessor 304 that is synchronous with the 24 VAC 60 Hz power signal from the system transformer 210. The microprocessor 304 uses the fourth digital HVAC control signal 344 and the fifth digital HVAC control signal 345 to create a full sinusoid waveform from a positively rectified signal 351 or negatively rectified signal 352 (see FIG. 19) to trigger switching devices 836 or 301. The common wire adapter 815 allows a pre-existing wire 812 to be repurposed to provide an electrical path to carry the common signal 210a from the system transformer 210 to input 802 of the smart communicating thermostat 800 and provide reliable electric power. Two diodes 820 and 822 are connected to the Fan G 204 and AC Y 207 outputs of the Smart Communicating Thermostat 800. The anode of diode 820 is attached to the Fan G 204 terminal. The cathode of diode 822 is attached to the AC Y 207 terminal. FIG. 16 shows diode 820 connected to the Fan G 204 terminal, but this diode could alternatively be connected to the AC Y 207 or Heat W 208 (or Rev O or Rev BR for a heat pump) of the Smart Communicating Thermostat 800. FIG. 16 shows diode 822 connected to AC Y 207 of the Smart Communicating Thermostat 800, but the diode 822 could alternatively be connected to the Fan G or Heat W (or Rev O or Rev BR for a heat pump). This embodiment shows diode 820 connected to the Fan G 204 terminal and diode 822 connected to the AC Y 207 terminal as examples. The invention does not limit which output terminal is attached to the anode or cathode of each diode. The only restriction is that the diodes must be attached to the thermostat outputs in opposing polarity where one anode goes to one signal, and the cathode of the other diode goes to another thermostat output signal. In this way, the repurposed wire or electrical connection 810 from the Thermostat Element 806 will carry either a positively rectified waveform 351 through diode 820, a negatively rectified waveform 352 through diode 822, or a full sinusoid waveform 350 if both diodes are conducting in the case where both thermostat outputs are simultaneously active. FIG. 16 also shows a signal conditioning element 308 (similar to FIG. 5) used to convert analog HVAC control signals (such as the Heat W 208 signal shown in FIG. 16) from the smart communicating thermostat 800 into digital HVAC control signals used by the microprocessor 304.

In one embodiment of the HVAC Element 814, diodes 820 and 822 and an optoisolator 824 create the signals for the microprocessor 304 to trigger the switching devices 301 and 836. In other embodiments of the HVAC Element 814, individual diodes may replace the optoisolator. This embodiment also uses an AC-DC converter 303 to provide a 5 VDC power signal 270 (see FIG. 16) to the microprocessor 304 and the pull up resistor 826. The AC-DC converter 303 also provides a fifth digital timing HVAC control signal 345 on output 830 used by the microprocessor 304 to detect the rising edge of the synchronous 24 VAC 60 z input power signal from the system transformer 210. The fifth digital timing HVAC control signal 345 on AC-DC converter 303 output 830 is used by the microprocessor 304 to determine when to sample the at least one fourth digital HVAC control signal 344 on output 828 of the optoisolator 824 from the HVAC element 814 (similar to optoisolator 856 shown in FIG. 18). The output of the optoisolator 828 will be a zero if the at least one third analog HVAC control signal 343 on HVAC element 814 input 809 is a positively rectified signal 351 or negatively rectified signal 352. The microprocessor 304 samples the fifth digital timing HVAC control timing signal 345 on output 830 from the AC-DC converter 303 for a positive edge of the 60 Hz input and then samples the at least one fourth digital HVAC control signal 344 on output 828 of the optoisolator 824. If the at least one fourth digital HVAC control signal 344 on output 828 of the optoisolator 824 is zero after a rising edge of the 60 Hz signal 345 on AC-DC converter 303 output 830 is detected, then the microprocessor 304 activates output 834 to trigger the switching device 301 which passes the Hot R 209 signal to the smart fan controller output 212 which energizes the fan relay 205 and operates the system fan/blower 206. The microprocessor 304 monitors the at least one fourth digital HVAC control signal 344 on output 828 from the optoisolator 824 to detect every rising edge and keeps the signal active to the switching device 301 until the output from the optoisolator is high at the 60 Hz rising edge which would indicates that the call for the Fan G 204 has terminated. If the switching devices were a triac, the microprocessor would trigger the gate at both the positive and negative zero crossing events. In this way the switching device is continuously triggered to provide a continuous sinusoid waveform for the smart fan controller 803 switching device 301 output 212.

In the same way, the at least one fourth digital HVAC control signal 344 on output 828 from the optoisolator 824 is zero with a negatively rectified signal 352 on the at least one third analog HVAC control signal 343 on HVAC element 814 input 809. The microprocessor 304 samples the fifth digital timing HVAC control signal 345 from the power supply and monitors for a transition from a positive input to a zero input. This transition indicates that the 24 VAC 60 Hz Hot R 209 power signal 210b from the system transformer 210 has transitioned from a positive voltage level to a negative voltage level. The microprocessor then monitors the at least one fourth digital HVAC control signal 344 on output 828 from the optoisolator 824. If the voltage is zero at this transition, then the optoisolator 824 is receiving a negatively rectified signal 352 from the at least one third analog HVAC control signal 343 on HVAC element 814 input 809. Receiving a zero VDC signal from the at least one fourth digital HVAC control signal 344 on output 828 indicates to the microprocessor 304 that a negatively rectified waveform 352 input is being received and the microprocessor 304 triggers switching device 836 with a gate signal 832 which causes the Hot R 209 signal to be transmitted to the output 818 which is used to control at least one HVAC device selected from the group consisting of: an AC/HP compressor (203), a heat source (202), and a system fan/blower (206). If the switching device is a triac, the microprocessor would trigger the gate at both the positive and negative zero crossing events. In this manner, a negatively rectified signal waveform 352 from the thermostat element 806 would be used to conduct a full sinusoid waveform 350 to the output 818 until such time as the at least one fourth digital HVAC control signal 344 on output 828 from the optoisolator 824 is positive during a negative transition of the 60 Hz fifth digital timing HVAC control signal 345 input signal.

In the event that a common-wire adapter is not required, the invention will function as a standard fan controller 211 by connecting a wire from the Fan G 204 terminal of the thermostat or equipment control terminal 201 or smart communicating thermostat 800 to input 809 of the HVAC element 814. A full sinusoid signal will be provided to the optoisolator 824 and the microprocessor 304 will activate both switching devices. The switching device 301 will be activated with the energy efficiency delays per the efficient fan controller 211 functionality. The switching device 836 will also be activated but since the AC Y 207 uses the yellow wire in the existing harness and is connected to input 207A of the HVAC equipment control terminals 804, there is nothing connected to output 818 of the smart fan controller 817 and activating the switching device causes no effect.

Figure 17:
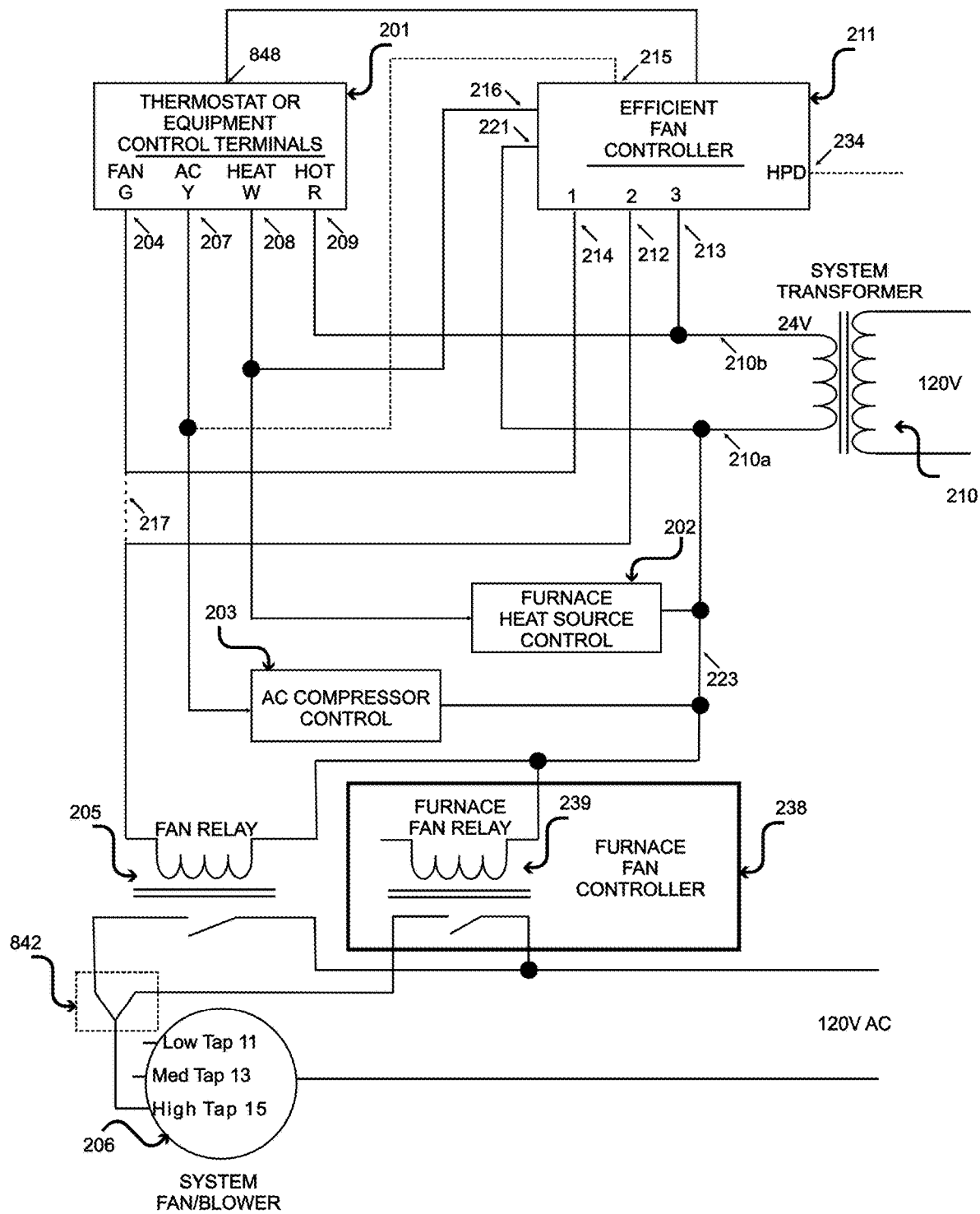
FIG. 17 shows the Y-adapter used to connect the outputs from the fan relay and furnace relay to the high-speed tap of the system fan/blower.

FIG. 17 shows the Y-adapter element 842 used to connect the output from the fan relay 205 and the furnace relay 239 together and the combined signal is connected to the high-speed tap 15 of the system fan/blower 206. In this way, when either relay 205 or 239 are activated, the system fan/blower will operate at a high speed.

FIG. 18 discloses how the invention is able to properly process signals that have a voltage that is neither 24 VAC nor 0VAC but some voltage that is approximately 10 VAC. This "stray" voltage appears due to thermostats power stealing current, faulty gas valves, faulty contactors, faulty fan relays, or induced voltage due to a wiring issue. When a "stray" voltage occurs, some devices interpret this 10 VAC signal as an indication that the thermostat is calling for heating or cooling when it is not. The present invention determines whether or not a thermostat signal is greater than a threshold voltage in order to differentiate a thermostat signal from a stray voltage signal. FIG. 18 shows at least one electrical input 845 to the signal conditioning element 308 where the at least one electrical input 845 can receive at least one active or an inactive analog HVAC control signal from the thermostat 201 or smart communicating thermostat 800. FIG. 18 shows at least one Zener diode between the at least one electrical input 845 and an optoisolator 856 where the Zener diode is configured to differentiate an active analog thermostat control signal from a stray voltage signal in order to deliver a correct digital control signal to the microprocessor 304. In one embodiment shown in FIG. 18, Zener diodes 850 and 851 are placed in series (i.e., anode-to-anode) with the input signal having opposite polarity. The signal then passes through an optoisolator. The optoisolator output is pulled up to the power rail through a pull-up resistor 854. This subtracts the rated value of the Zener, forward bias of a Zener, and the forward bias of the LEDs in the optoisolator from the input signal. If both diodes 850 and 851 have a value of 15 volts, then approximately 16.7 volts will be subtracted from the input signal before the microprocessor will receive an input other than a 5 volt signal from the pull-up resistor. Alternatively, if the optoisolator were configure differently, then a non-zero 5 volt signal could be used to indicate an active analog HVAC control signal to the microprocessor. Employing this method eliminates any "stray" voltage from being considered an active signal until it surpasses a threshold voltage of 16.7 volts for example in one embodiment. A resistor 852 shown in FIG. 18 is connected between the input pin to the transformer common. The purpose of the resistor 852 is to provide a current path to the thermostat 201 or smart communicating thermostat 800 in the event the signal is disrupted by the presence of the fan controller 211 (or 803) such as the fan 204 signal. The value of this resistance is such that the load into the thermostat is similar to an actual fan relay so the fan controller 211 is transparent to the thermostat.

Figure 19:
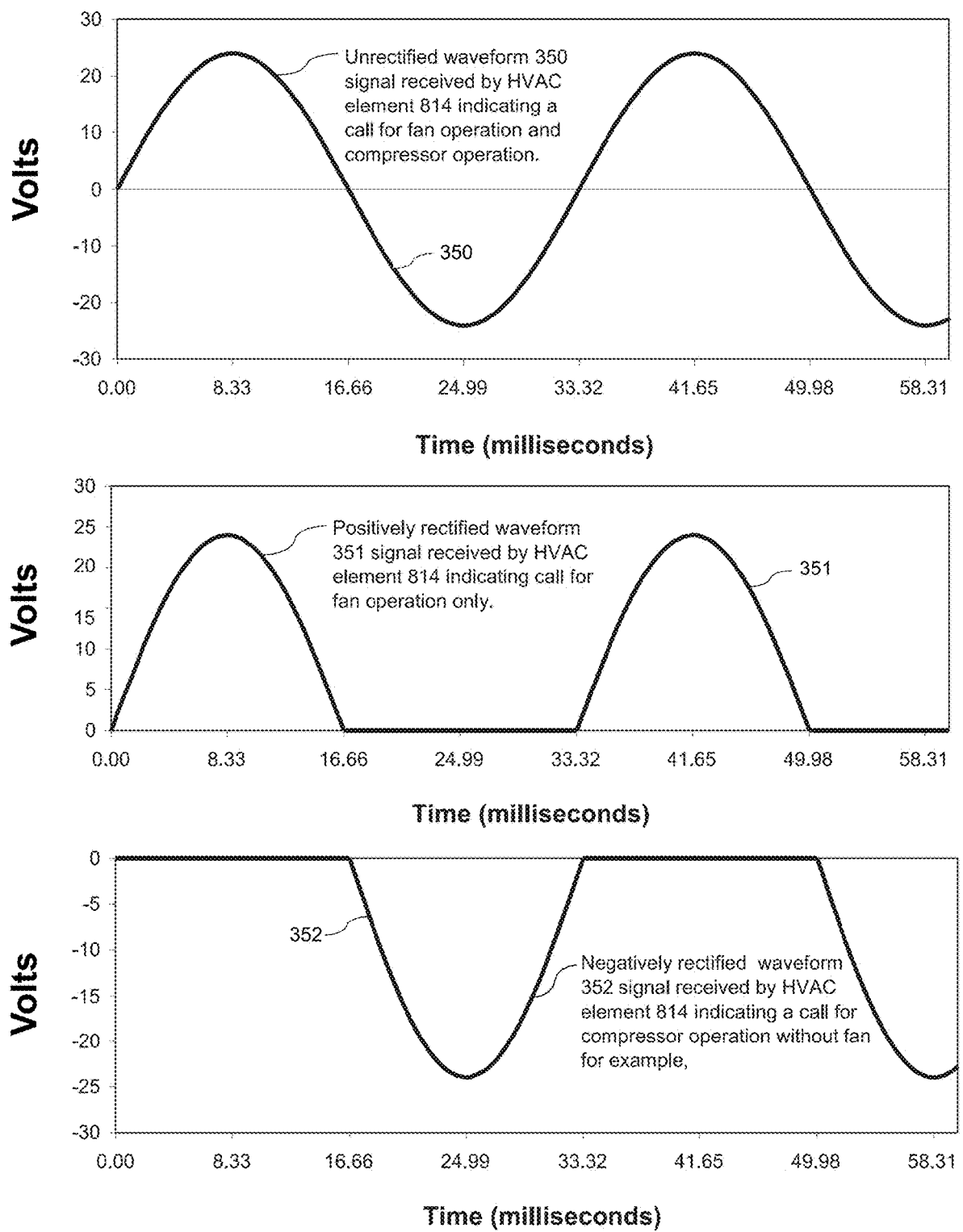
FIG. 19 shows the exemplary sinusoidal waveforms 350, 351 and 352 that can be present on a wire between the thermostat element and the HVAC element of the Common Wire Adapter 815 comprising HVAC Element 814 and Thermostat (Tstat) Element 806.

FIG. 19 shows the 24 VAC waveforms that can be sent from the thermostat element 806 via the repurposed wire or electrical connection 810 to the HVAC element 814. In this example for the apparatus shown in FIG. 18, the unrectified waveform 350 is received by the HVAC element 814 when both the AC Y 207 signal and the Fan G 204 signal are active. The positive half originates with the Fan G 204 signal and the negative half originates with the AC Y 207 signal. Both combined create a full sinusoid waveform. The positively rectified signal 351 with no negative component is created by the Fan G 204 signal as it passes through the diode 820. There is no negative component if the AC Y 207 signal is inactive. If the AC Y 207 signal is connected to the thermostat element 806 (as shown in FIG. 14) and only a positive waveform 351 is received by the HVAC element 814, then the microprocessor 304 creates the full sinusoid waveform, as a digital HVAC control signal 349 to switching device 301, which is sent to input 204A of the HVAC equipment control terminals 804 to activate the fan relay 205 and the system fan/blower 206. The negatively rectified signal 352 with no positive component is created by the AC Y 207 signal passing through diode 822. There is no positive component when the Fan G 204 signal is inactive. If the Heat W 208 signal is connected to the thermostat element 806 (as shown in FIG. 15) and only a negative waveform 352 is received by the HVAC element 814, then the microprocessor 304 creates the full sinusoid waveform, as a digital HVAC control signal 348 to switching device 836, which is sent to input 208A of the HVAC equipment control terminals 804 to activate the Heat Source 202. If the system is calling for cooling, the analog signal will resemble curve 350 since the AC Y 207 and Fan G 204 signals are active simultaneously. In some embodiments of the present invention, the G 204 signal must be connected since this signal is used to determine the cooling cycle duration. In other embodiments, the AC Y 207 signal must be connected since the AC Y 207 signal is used to determine the cooling cycle duration. In another embodiment, the second signal could instead be the Heat W 208 signal (described above) or the reversing valve signal (REV O 235 or REV BR 236).

Figure 20:
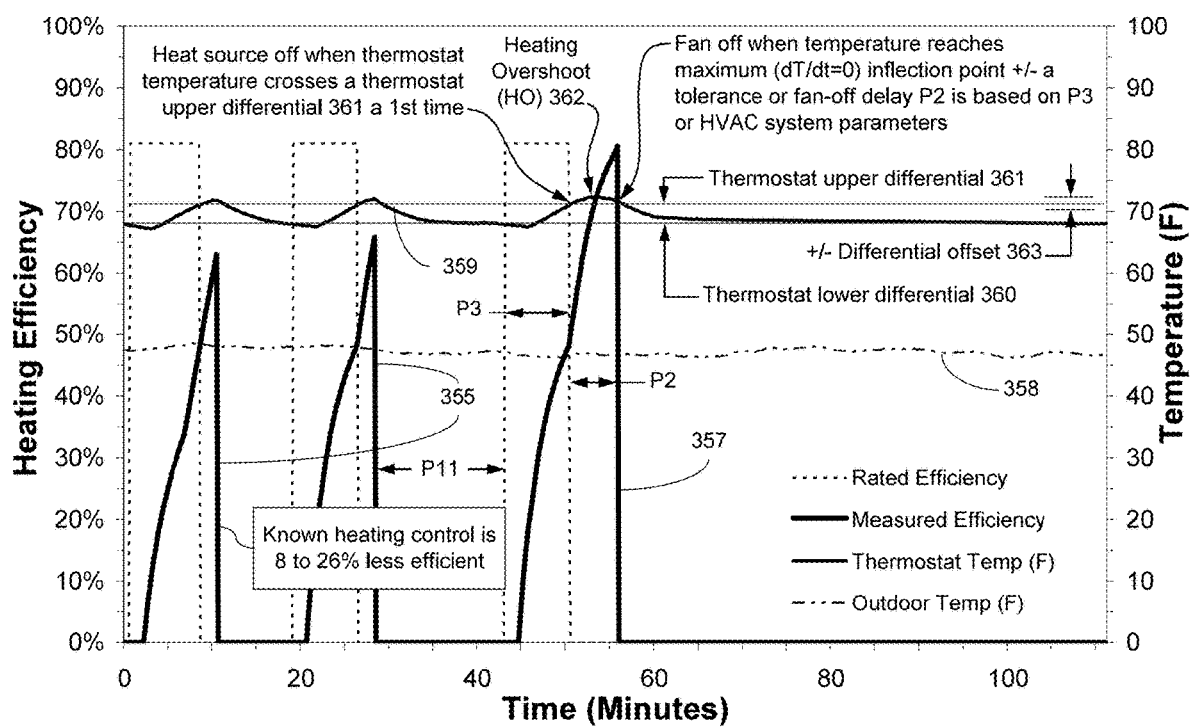
FIG. 20 shows a graph of heating efficiency, outdoor air temperature, indoor thermostat temperature, and rate of change of indoor thermostat temperature versus time of operation for a gas furnace heating system with known control where the heat source is turned off when the thermostat temperature reaches the setpoint hysteresis differential a first time and the heater ventilation fan operates for a fixed fan-off delay time after the heat source is turned off

FIG. 20 shows a graph of heating efficiency, outdoor air temperature, indoor thermostat temperature 359, and rate of change of indoor thermostat temperature versus time of operation for a gas furnace heating system with known control 355 where the heat source is turned off when the thermostat temperature reaches the setpoint hysteresis differential a first time and the heater ventilation fan operates for a fixed fan-off delay time after the heat source is turned off FIG. 20 also shows a graph of a curve 357 representing the energy efficiency of a heating system with heat source operational until a thermostat temperature reaches the upper limit of the setpoint hysteresis differential 361 a first time and the heater ventilation fan continues to operate for a variable fan-off delay time until the thermostat temperature declines to the same upper limit setpoint hysteresis differential a second time or a hysteresis differential offset 363 or the fan-off time delay P2 is based on the heating cycle duration P3 defined as the heating on time from when the thermostat initiates a call for heating until the thermostat terminates the call for heating or the heating cycle duration is defined as the heating off time defined from when the thermostat terminates the call for heating until the thermostat initiates the call for heating plus the heating on time. In another embodiment the variable fan-off delay time P2 is the time required for the thermostat temperature to reach a maximum temperature where the rate of change of respect to time, dT/dt, reaches an inflection point and is approximately equal to zero plus or minus a confidence interval tolerance shown in FIG. 20 as the heating overshoot (HO) 362. Operating individually or together, these fan-off delay time embodiments can be used to recover and deliver additional sensible heating energy from a heat source to improve efficiency and thermal comfort and reduce heat source operational time to save energy. In this embodiment, the fan controller temperature sensor can monitor and record the end-of-cycle conditioned space temperature at the end of the thermostat call for cooling. The fan controller will then energize or continue to energize the fan relay to operate the system fam/blower for the fan-off delay until the fan controller temperature sensor monitors a conditioned space temperature that is greater than the recorded end-of-cycle cooling temperature whereupon the fan controller will de-energize the fan relay to turn off the system fan/blower and end the fan-off delay.

Figure 21:
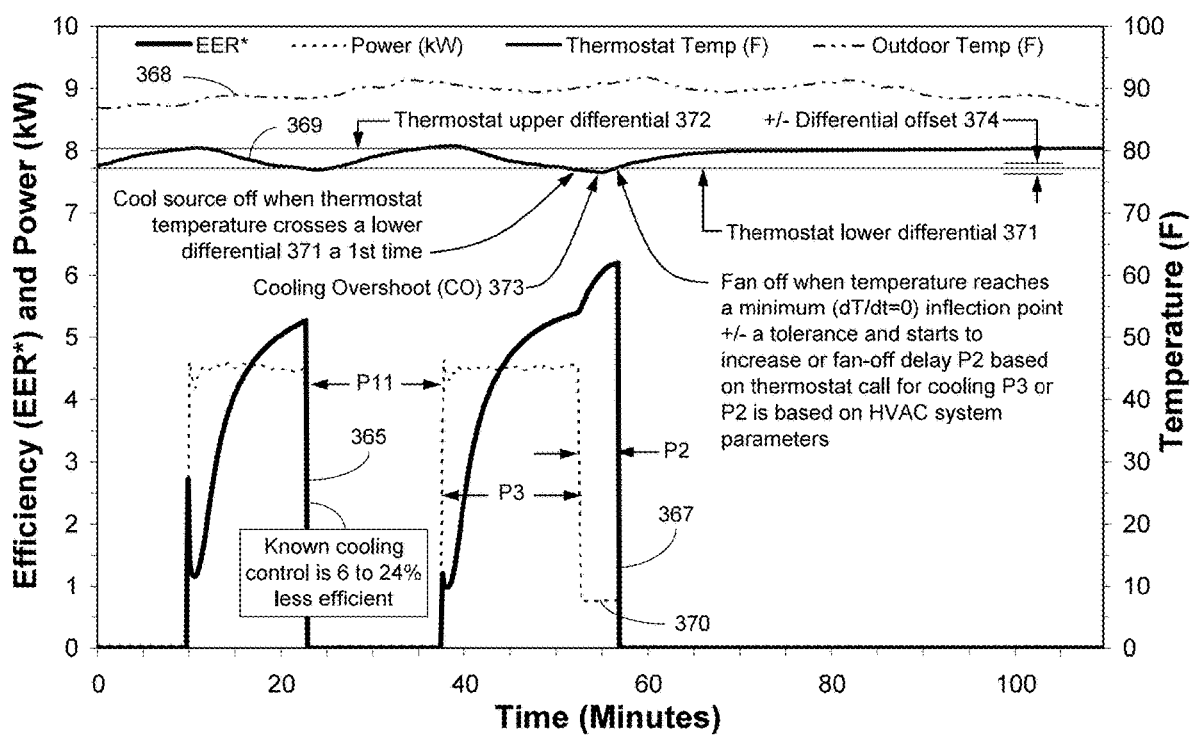
FIG. 21 shows a graph of cooling efficiency (i.e., Energy Efficiency Ratio, (EER)), cooling system power, outdoor air temperature, indoor thermostat temperature, and rate of change of indoor thermostat temperature versus time of operation for a direct-expansion air conditioning cooling system with known control where the cool source and cooling ventilation fan are turned off when the thermostat temperature decreases to the minimum setpoint hysteresis a first time.

FIG. 21 shows a graph of cooling efficiency (i.e., Energy Efficiency Ratio (EER)), cooling system power, outdoor air temperature, indoor thermostat temperature 369, and rate of change of indoor thermostat temperature versus time of operation for a direct-expansion air conditioning cooling system with known control 365 where the cool source and cooling ventilation fan are turned off when the thermostat temperature decreases to the minimum setpoint hysteresis a first time. FIG. 21 also shows a graph of a curve 367 representing the EER of a cooling system with cool source operational until a thermostat temperature reaches the lower limit of the setpoint differential 371 a first time and the cooling ventilation fan continues to operate for a variable fan-off delay time until the thermostat temperature increases to the same lower limit setpoint differential a second time or a differential offset 374 or the fan-off time delay P2 is based on the cooling cycle duration P3 defined as the cooling on time from when the thermostat initiates a call for cooling until the thermostat terminates the call for cooling or the cooling cycle duration is defined as the cooling off time defined from when the thermostat terminates the call for cooling until the thermostat initiates the call for cooling plus the cooling on time. In another embodiment the cooling ventilation fan continues to operate for a variable fan-off delay time P2 until the thermostat temperature decreases to the Cooling Overshoot (CO) 373 defined as the minimum thermostat temperature beyond the CLD after the cool source is turned off where the rate of change of temperature with respect to time, dT/dt, reaches an inflection point and is approximately equal to zero plus or minus a confidence interval tolerance. Operating individually or together, these fan-off delay time embodiments can be used to recover and deliver additional sensible cooling energy from a cool source to improve efficiency and thermal comfort and reduce cooling system operating time to save energy. In this embodiment, the fan controller temperature sensor can monitor and record the end-of-cycle conditioned space temperature at the end of the thermostat call for heating. The fan controller will then energize or continue to energize the fan relay to operate the system fam/blower for the fan-off delay until the fan controller temperature sensor monitors a conditioned space temperature that is less than the recorded end-of-cycle heating temperature whereupon the fan controller will de-energize the fan relay to turn off the system fan/blower and end the fan-off delay.

Figure 22:
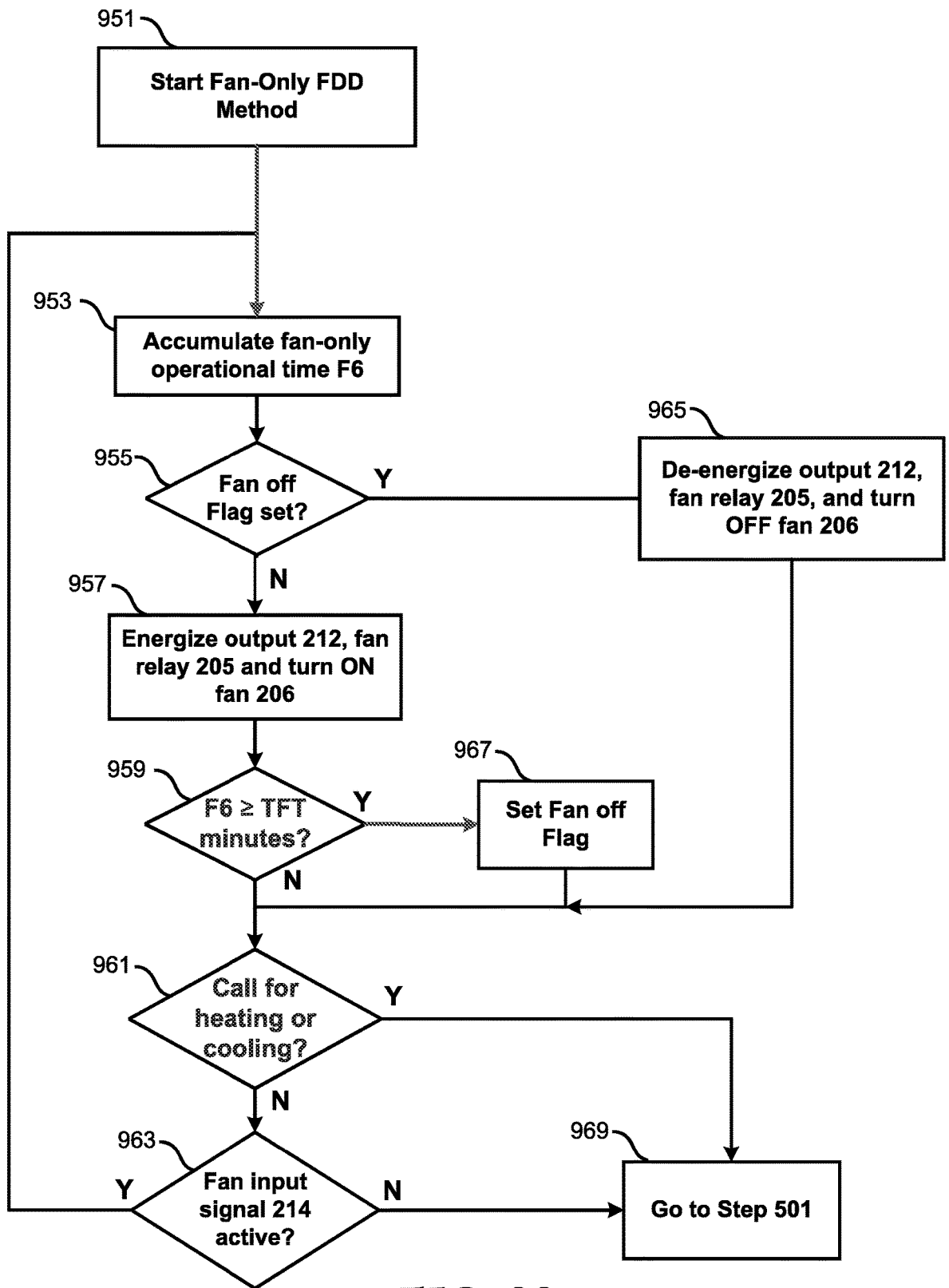

FIG. 22 shows a fan controller fan-only Fault Detection Diagnostics (FDD) method for a thermostat or equipment terminal (201) or a smart communicating thermostat (800) with a fan control having an AUTO setting and a fan-only ON setting according to the present invention. At Step 951, the fan controller starts the Fan-only FDD method with the fan ON and no call for heating or cooling or a fan signal during a fan-off delay. At Step 953, the fan controller accumulates fan-only operational time F6. At Step 953, the fan controller initiates a loop which runs continuously to accumulate the fan-only operational time F6 until the fan controller either receives a call for heating, a call for cooling, or the fan switch input 214 is de-energized. At Step 955 the fan controller determines whether or not the fan_off variable has been set to "1" in step 976.

At Step 957, if the fan_off flag is not set to "1", the fan controller energizes switch 301 which drives a 24 VAC signal to fan controller output 212 which in turn activates the fan relay 205 and turns ON the blower fan 206.

At Step 959, the fan controller determines if the fan-only time has exceeded the Threshold Fan-on Time TFT, in one embodiment, the TFT could be set to preferably between 0 and 60 minutes, and more preferably to 10 minutes, not including the fan-off delay time. If so, the fan controller proceeds to Step 967. If not the fan controller continues to Step 961.

At Step 961, the fan controller determines if there is a call for heating or cooling and if so, proceeds to Step 969. If there is not a call for heating or cooling, the fan controller continues to Step 963.

At Step 963, the fan controller determines if the fan signal input 214 is still energized and if so loops back to Step 953. If the fan switch input 214 is not active, the fan controller proceeds to step 969 and goes to Step 501 to determine system type and heating or cooling mode (FIG. 9).

At Step 965, the present invention method turns OFF the fan 206, if the fan has been on longer than the TFT and the Fan off flag is set to a value of "1", to indicate that the fan 206 is accidentally turned ON with no call for heating or cooling or fan operation during a fan-off delay. The fan controller in Step 965 de-energizes the output 212 which de-energizes the fan relay 205 and turns the fan 206 OFF. The fan controller then proceeds to Step 961 and continues the loop until there is a call for heating, a call for cooling, or the fan switch input 214 is de-energized. If a thermostat call for cooling or heating occurs during the fan-only "ON" time F6, then the FDD method can temporarily pause monitoring F6 and continue monitoring F6 when fan-only operation continues, or in another embodiment monitor F6 throughout the HVAC "ON" time and fan-only "ON" time. Either way, if the HVAC fan is operating continuously longer than a Threshold Fan Time (TFT) (i.e., F6 TFT) with or without a thermostat call for cooling or heating, then the present invention will de-energize the HVAC fan as shown by FIG. 22. In this way, the fan controller will turn OFF the fan 206 if the thermostat fan switch is accidentally left in the ON position.

Also disclosed in this invention is a method solving an unresolved need for increasing fan speed to improve comfort, efficiency and satisfy the thermostat sooner to save energy. The present invention enables control of the system fan/blower to high speed operation using at least one method selected from the group consisting of: 1) installing a 24-volt wire jumper from the fan only tap to the high-speed or "cool" tap of the system fan/blower 206 to enable the thermostat "G" signal wire to control high speed fan operation, and 2) installing a high-voltage Y-adapter 842 combining the two high voltage signal outputs, one from the fan relay 205 and the other from the furnace relay 239 on the Forced Air Unit (FAU) control board 238 to the high speed tap 15 of the system fan/blower 206 to enable high speed fan operation in cooling and heating modes, and 3) using a dip switch other electrical control switching device on the Forced Air Unit (FAU) control board 238 to enable high speed system fan/blower operation when the thermostat G terminal is energized in cooling or heating modes, and 4) using wired or wireless (WIFI) software application commands to control a switching device to enable high speed system fan/blower operation when the thermostat G terminal is energized in cooling or heating modes, and 5) using an electrical signal waveform 848 identified by a controller to enable high speed system fan/blower operation when the thermostat G terminal is energized in cooling or heating modes.

Some HVAC systems will disregard the activation of the fan signal 212 when heating and continue to operate the system fan/blower at a low speed. In that event the system will be less efficient than operating the fan at a high speed which delivers more heat to the conditioned space and satisfies the thermostat more quickly. By connecting together the output of the fan relay 205 and the output of the relay which is activated when heating using a "Y" adapter to the high-speed tap of the system fan/blower the fan will operate at a high speed during either heating or cooling. Thus a method for increasing fan speed to improve comfort, efficiency and satisfy the thermostat sooner to save energy has been disclosed.

The fan controller 211 can include at least one temperature sensor input to connect to a temperature sensor to monitor at least one temperature selected from the group consisting of: a conditioned space temperature, a return air temperature and a supply air temperature. The monitored temperature sensor input can be used at an end of the cooling cycle or heating cycle to either energize or continue to energize the fan relay signal output (212) to operate the system fan (206) for a variable fan-off delay time to deliver additional cooling or heating energy to a conditioned space wherein the variable fan-off delay time is determined based on at least one threshold temperature selected from the group consisting of: the conditioned space temperature, the return air temperature and the supply air temperature. The temperature threshold can be based on at least one temperature threshold selected from the group consisting of: a supply air temperature threshold less than the conditioned space temperature for cooling, a supply air temperature threshold greater than the conditioned space temperature for heating, a supply air temperature threshold less than the return air temperature for cooling, a return air temperature threshold less than the supply air temperature for heating, a temperature split threshold for cooling defined as the return air temperature minus the supply air temperature, a temperature rise threshold for heating defined as the supply air temperature minus the return air temperature, and a threshold inflection point where the rate of change of the conditioned space temperature with respect to time equals zero plus or minus a confidence interval tolerance.

While the invention herein disclosed has been described by means of specific embodiments and applications thereof, numerous modifications and variations could be made thereto by those skilled in the art without departing from the scope of the invention set forth in the claims.

LIST OF ELEMENTS:

4—a curve representing the delivered heating efficiency for a gas furnace HVAC system 100 with the known fixed fan-off time delay and low fan speed operation.
6—a curve representing the increase in delivered heating efficiency for the same gas furnace HVAC system 100 with the fan controller switching the blower fan from a low fan speed used for heating to a higher fan speed used for cooling plus extended variable fan-off time delay P2 based on the duration of the heating cycle P3 including on time or on time plus off time.
8—a curve representing the delivered sensible cooling efficiency for a direct-expansion air conditioning system with a known fixed fan-off time delay.
10—a curve representing the increase in sensible cooling efficiency for the same direct-expansion air conditioning system with the fan controller providing an extended variable fan-off time delay P2 based on the duration of the cooling cycle P3 including on time or on time plus off time.
11—Low speed tap of the system fan/blower.
12-a curve representing the delivered sensible heating efficiency for a heat pump or hydronic HVAC system 100 in heating mode with no fan-on time delay representing the negative value in sensible heating that occurs when the system fan/blower is activated before a heat pump or hydronic system has generated useful heat and no fan-off time delay.
13—Medium speed tap of the system fan/blower.
14—a curve representing the increase in delivered heating efficiency for the same heat pump or hydronic HVAC system 100 in heating mode with the fan controller providing a short variable fan-on time delay based on the off-cycle duration P11 and an extended variable fan-off time delay P2 based on the duration of the heating cycle P3 including on time or on time plus off time in order to increase delivered heating capacity and efficiency for the heat pump or hydronic heating system.
15—High speed tap of the system fan/blower.
100—Heating Ventilating Air Conditioning (HVAC) System.
102—a floating signal
104—a ground or zero voltage signal
106—a non-zero VDC signal
108—a sinusoid signal or a 24 VAC signal
110—a rectified signal including a positively rectified signal 351 or a negatively rectified signal 352
201—a thermostat or equipment control terminals.
202—a furnace heat-source control used to indicate a device that when energized, produces heating for the system.
203—an AC compressor control used to indicate a device that when energized produces cooling for the system when the system is a direct-expansion cooling system; In a heat pump, this device is energized in both heating and cooling. The heating or cooling mode is determined by the reversing valve 263, and 264.
204—a FAN "G" terminal of a thermostat energized when the system fan is ON or the thermostat calls for air conditioning.
205—a high-speed relay used to indicate a device that when energized connects 120 VAC to the high speed tap of the system fan/blower 206.
206—a system fan/blower used to indicate a multiple speed motor with a low, medium, and high fan speed tap or setting.
207—an AC compressor thermostat "Y" terminal of the thermostat energized when the thermostat calls for cooling.
208—a heat thermostat "W" terminal energized when the thermostat calls for heating.
209—a Hot thermostat "R" terminal connected to the Hot leg 210b of the 24 VAC system transformer 210.
210—a system transformer used to step down the input voltage of 120 VAC to the 24 VAC system voltage with a neutral leg 210a and a hot leg 210b.
210a—a neutral or common leg 210a of the system transformer 210.
210b—a Hot leg 210b of the system transformer 210.
211—an embodiment of the fan controller 211.
212—a fan controller output signal to activate the fan relay 205 and when energized turns on the system fan/blower 206 to high speed and when de-energized can either stop the system fan/blower 206 or return control of the system fan/blower 206 to the low-speed relay on the furnace fan controller 238.
213—a fan Controller input signal connected to the Hot leg 210b of the system transformer where this signal is actually the system ground signal for the fan controller 211.
214—a fan controller fan signal input used to detect the presence or absence of a low-voltage fan signal on a thermostat "G" terminal 204 to determine system type and cooling or heating mode of operation based on other fan controller inputs, allow measurement of an off-cycle time P11, and used as a proxy to measure the duration of the cooling cycle P3 or the duration of the heating cycle P3 including on time or on time plus off time in order to calculate a fan-off time delay P2. The fan controller fan signal input 214 is active when the fan is on, or when the AC compressor is on, or for a heat pump when the thermostat is calling for heating or cooling based on the signal to the reversing valve. The fan controller fan signal input 214 can be used as a proxy for the duration of the AC compressor cycle and therefore, be used to measure the duration of the cooling cycle P3 including on time or on time plus off time. For a heat pump system, the fan controller fan signal input 214 can be used to determine the duration of the cooling cycle P3 or duration of the heating cycle P3 including on time or on time plus off time depending on the status of the signal to the reversing valve 216 and the HPD signal input 234.
215—an optional fan controller AC compressor input signal used to detect the presence or absence of a low-voltage fan signal on the AC thermostat "Y" terminal 207 to determine system type and cooling or heating mode of operation based on other fan controller inputs, allow measurement of an off-cycle time P11, and used to measure the duration of the cooling cycle P3 including on time or on time plus off or the duration of the heating cycle P3 for a heat pump including on time or on time plus off time in order to calculate a fan-off time delay P2. The fan controller AC signal input 215 is active when the AC compressor is on, or for a heat pump when the thermostat is calling for heating or cooling based on the signal to the reversing valve. The fan controller fan signal input 215 can be used to measure the duration of the AC compressor cycle and therefore, be used to measure the duration of the cooling cycle P3 including on time or on time plus off time. For a heat pump system, the fan controller fan signal input 215 can be used to determine the duration of the cooling cycle P3 or duration of the heating cycle P3 including on time or on time plus off time depending on the status of the signal to the reversing valve 216 and the HPD signal input 234.

216—a fan controller heat-source or HP reversing valve signal input used to detect the presence or absence of a low-voltage heat signal on the thermostat "W" terminal 208 to determine system type and cooling or heating mode of operation based on other fan controller inputs, allow measurement of an off-cycle time P11, or to allow measurement of the duration of the heating cycle P3 including on time or on time plus off time in order to calculate the fan-off time delay P2, or to detect the presence or absence of a low-voltage heat pump reversing valve signal on a thermostat "O" terminal (235) normally energized for cooling or a HP low-voltage reversing valve signal on the thermostat "BR" terminal (236) normally energized for heating.

217—a dashed line to indicate the disconnection of the FAN G terminal of the thermostat to the fan relay 205.

219—a temperature sensor input of the smart fan controller 817

220—air temperature sensor

221—a fan controller input signal from the system transformer neutral side;

223—a neutral side of the system transformer connected to other elements of the system.

234—a fan controller HPD signal input used by the fan controller to detect the presence or absence of a low-voltage signal from the system transformer hot 210*b* to determine whether or not a heat pump is connected. If the HPD signal input 234 is not connected to the system transformer hot 210*b*, then the fan controller determines it is connected to a gas, hydronic, or electric HVAC system 100 type in cooling or heating mode of operation depending on the low-voltage signals on other fan controller signal inputs. If the HPD signal input 234 is connected by a wire 265 to the system transformer hot 210*b*, then the fan controller HPD signal input 216 receives an unrectified low-voltage signal and determine it is connected to a heat pump HVAC system 100 with reversing valve "O" energized in cooling mode and de-energized in heating mode where the mode of cooling or heating operation is detected by the presence or absence of a low-voltage signal on fan controller input 216 based on a connection to the REV "O" thermostat terminal 235 (see waveform 350 in FIG. 11). If the HPD signal input 234 is connected to the system transformer hot 210*b* with a wire and a diode 275 in either polarity, then the fan controller HPD signal input 216 receives a rectified low-voltage signal and determine it is connected to a heat pump with reversing valve "BR" energized in heating mode where the mode of cooling or heating operation is detected by the presence or absence of a low-voltage signal on fan controller input 216 based on a connection to the REV "BR" thermostat terminal 236 (see waveform 351 and 352 in FIG. 11).

235—a heat pump REV "O" terminal of the thermostat energized for cooling and de-energized for heating.

236—a heat pump REV "BR" terminal of the thermostat de-energized for cooling and energized for heating.

238—Forced Air Unit (FAU) control board.

263—a reversing valve energized for cooling used to indicate a reversing valve on a heat pump system that is energized for cooling and de-energized for heating and referred to as an Orange ("O") reversing valve.

264—a reversing valve energized for heating used to indicate a reversing valve on a heat pump system that is energized for heating and de-energized for cooling and referred to as a Brown ("BR") reversing valve.

265—a connection between the system transformer hot 210*b* and the fan controller HPD signal input 234 when connected with a wire as shown in FIG. 3 where the fan controller signal input

216—is connected to the heat pump REV "O" thermostat terminal 235 energized for cooling and de-energized for heating.

270—a positive Direct Current (DC) voltage signal or a DC rail voltage that powers the microprocessor and associated circuitry as well as charges a super capacitor 312 where the rail voltage can originate from the AC-DC converter, or the optional battery 306.

72—a signal from the zero crossing detector 302 to the microprocessor 304 indicating a transition on the 24 VAC signal either from a positive voltage to a negative voltage, or from a negative voltage to a positive voltage.

275—a diode used in the path between the system transformer hot 210*b* and the fan controller HPD signal input 234 where the system transformer Hot leg 210*b* provides a 24 VAC signal. In the preferred orientation, the diode 275 allows current flow in a positive cycle, and blocks current flow in a negative cycle (see waveform 351 in FIG. 11). The fan controller HPD signal input 234 is designed to accommodate the condition with the diode 275 reversed with current flowing in the negative cycle and blocked in the positive cycle (see waveform 352 in FIG. 11). If the diode were not in place as shown in FIG. 3, then the current into the fan controller HPD signal input

301—a switching device used to indicate a device which connects the fan controller Hot signal input 213 to the fan controller fan signal output 212 to activate the high-speed fan relay 205.

302—a zero crossing detector used to indicate a function that signals to the microprocessor that the 24 VAC input to the fan controller has changed from either a positive voltage to a negative voltage, or from a negative voltage to a positive voltage.

303—an AC-DC converter taking multiple AC inputs and rectifies one or all to create a DC voltage to power the fan controller.

304—a microprocessor with flash memory used to indicate a device that is programmable to carry out the various tasks to enable the fan controller device to function.

305—an optional user interface used to indicate a function that allows a user to interact with the microprocessor. This interaction can be as simple as DIP switches to configure parameters, a key pad and display, or a communication interface such as USB or a wireless communication.

308—signal conditioning used to indicate a function that receives 24 VAC signals and conditions them to a level that can be safely read by the microprocessor 304.

306—an optional battery used to indicate an optional power source in the event the fan controller is unable to generate sufficient power from the input signals.

309—a relay used to connect the thermostat fan "G" terminal 204 to the high-speed relay 205 which eliminates the dashed line 217 to provide a hard connection. The purpose of this switch is to provide a fail-safe connection in the event the fan controller fails so the HVAC system 100 operates as though the fan controller were not connected to the circuit.

312—indicates an optional super capacitor which can be charged from the AC-DC converter and used to power the fan controller until sufficient voltage can be generated again from the fan controller input signals.

340—at least one HVAC device selected from the group consisting of: an AC/HP compressor 203, a heat source 202, a HP reversing valve 263 or 264, and a system fan/blower 206

341—at least one first analog HVAC control signal from a thermostat or equipment control terminal 201 or smart communicating thermostat 800

342—at least one second analog HVAC control signal from a thermostat or equipment control terminal 201 or smart communicating thermostat 800

343—at least one third analog HVAC control signal from the thermostat element 806 to the HVAC element 814

344—at least one fourth digital HVAC control signal from HVAC element 814 to the microprocessor 304 representing the at least one first analog HVAC control signal 341 or the at least one third analog HVAC control signal 343 in response to the at least one second analog HVAC control signal 342 wherein the at least one fourth digital HVAC control signal is a zero Volt Direct Current (VDC) signal if there is a positively or negatively rectified signal from the thermostat element 806 and a non-zero (+5 VDC) signal otherwise"

345—a fifth digital timing HVAC control signal from the AC-DC converter 303 to the microprocessor 304 synchronous with the 24 VAC 60 Hz power signal from the system transformer 210

346—at least one sixth analog HVAC control signal from the thermostat or equipment control terminal 201 or a smart communicating thermostat 800

347—at least one seventh digital HVAC control signal from the signal conditioning element 308 to the microprocessor 304 where the signal conditioning element 308 converts an active analog HVAC control signal to a zero VDC digital HVAC control signal and converts an inactive analog HVAC control signal to a non-zero VDC HVAC control signal 348—an eighth digital HVAC control signal from the microprocessor 304 to the switching device 836 to energize the AC compressor 203, heat source 202, or heat pump reversing valve (REV O 235 or REV BR 236)

349—a ninth digital HVAC control signal from the microprocessor 304 to the switching device 301 to control the fan relay 205 used to energize the system fan/blower 206

355—a curve representing the energy efficiency of a heating system with known control where the heat source is turned off when the thermostat temperature reaches the setpoint hysteresis 361 a first time and the heater ventilation fan operates for a fixed fan-off delay time after the heat source is turned off.

350—a sinusoid signal or a 24 VAC signal

351—A positively rectified sinusoid signal transmitted from the thermostat element 806 to the HVAC element 814.

352—a negatively rectified sinusoid signal transmitted from the thermostat element 806 to the HVAC element 814

357—a curve representing the energy efficiency of a heating system operating until a thermostat temperature reaches the upper limit of the setpoint hysteresis differential 361 a first time and the heater ventilation fan continuing to operate for a variable fan-off delay time until the thermostat temperature declines to the same upper limit setpoint hysteresis differential a second time or a hysteresis differential offset 363 or the fan-off time delay P2 is based on the duration of the heating cycle P3.

358—a curve representing the outdoor air temperature (° F.) during heating.

360—a curve representing the lower thermostat differential for the heating system.

361—a curve representing the lower upper thermostat differential for the heating system.

362—a curve representing the upper thermostat differential for the heating system. Heating Overshoot (HO).

363—a thermostat setpoint +/− differential offset for heating.

365—a curve representing the sensible energy efficiency of a cooling system with known control 365 where the cool source is turned off when the thermostat temperature reaches the lower limit of a cooling setpoint differential 369 a first time, and the cooling ventilation fan is turned off at the same time or continues to operate for a fixed fan-off delay time after the cool source is turned off 367—a curve representing the sensible energy efficiency of a cooling system with cool source operational until a thermostat temperature reaches the lower limit of the cooling setpoint differential 369 a first time and the cooling ventilation fan continuing to operate for a variable fan-off delay time until the thermostat temperature increases to the same lower limit cooling setpoint differential a second time or to a setpoint hysteresis offset 373 or the fan-off delay time P2 is based the duration of the cooling cycle P3.

368—a curve representing the outdoor air temperature (° F.) during cooling.

370—a curve representing the electrical power of a cooling system operating until a thermostat temperature reaches the lower limit of the setpoint differential 371 a first time and the cooling fan continuing to operate for a variable fan-off delay time until the thermostat temperature increases to the same lower limit setpoint differential a second time or differential offset 374 or the fan-off time delay P2 is based on the duration of the cooling cycle P3.

373—a thermostat differential offset for cooling. Cooling Overshoot (CO).

374—a thermostat +/− differential offset for cooling.

800—a Smart Communicating Thermostat

802—a Common B input to the thermostat,

802A—a Common B input to the HVAC Equipment Control Terminals,

803—EFC fan controller element excluding thermostat element 806 and HVAC element 814, 804—HVAC Equipment Control Terminals 806—a Thermostat Element 808—an Output from the Thermostat Element 809—an Input to the HVAC element 814 from the repurposed wire or electrical connection 810 used to carry the positively or negatively rectified signals from the thermostat 810—a repurposed wire or electrical connection used to carry the positively or negatively rectified signals from the thermostat 811—a solid-state common-wire adapter 812—a repurposed wire used to carry the common signal to the thermostat 813—EFC fan controller and HVAC Element 814 subassembly including a wireless (WIFI) communication channel 847 to send/receive HVAC control signals to/from the HVAC equipment control terminals 804, 814—an HVAC Element 815—a Common Wire Adapter, 817—EFC element including thermostat element 806, HVAC element 814 and fan controller element 211

818—an output from a switching device

819—EFC fan controller subassembly circuit board in the smart fan controller 803, 813, and 817 including a wireless (WIFI) communication channel 847 to send/receive HVAC control signals to/from the HVAC equipment control terminals 804, 820—a diode attached to a thermostat output
822—a diode attached to a thermostat output
824—an optoisolator used to signal a processor
826A—a pull up resistor
826B—a pull up resistor
826C—a pull up resistor
828—an output from the optoisolator
830—a wire used to carry a digital signal synchronous to the 24 VAC 60 Hz input power signal from the system transformer 210 signal from the power supply 303 used by the microprocessor 304 to detect the rising edge and falling edge of the 24 VAC 60 Hz input
832—an output from the microprocessor to trigger a switching device
834—an output from the microprocessor to trigger a switching device
836—a switching device
840—a jumper wire to enable high speed fan operation in heating and cooling
842—a high-voltage Y-adapter combining the two high voltage signal outputs from the Forced Air Unit (FAU) control board to the high speed tap of the system fan/blower (206) to enable high speed fan operation in cooling and heating modes.
844—a dip switch or other electrical control switching device on the FAU control board to enable high speed system fan/blower operation when the thermostat G terminal is energized in cooling or heating modes.
845—an input to the signal conditioning element 308 to receive an active or inactive analog HVAC control signal from the thermostat 201 or the smart communicating thermostat 800.
846—a wired or wireless (WIFI) software application commands to control a switching device to enable high speed system fan/blower operation when the thermostat G terminal is energized in cooling or heating modes,
847—a wireless (WIFI) communication channel on the smart fan controller 803, 813, and 817 to send/receive HVAC control signals to/from the HVAC equipment control terminals 804,
848—an electrical signal waveform identified by a controller to enable high speed system fan/blower operation when the thermostat G terminal is energized in cooling or heating modes,
849—a wireless (WIFI) communication channel on the HVAC equipment control terminals 804 to send/receive HVAC control signals to/from the smart fan controller 803, 813, and 817,
850—a Zener diode,
851—a Zener diode,
852—a Load resistor,
854—a Pull up resistor, and
856—an Optoisolator.

We claim:

1. A smart fan controller (817) for a Heating Ventilation Air Conditioning (HVAC) system, comprising:
a microprocessor (304);
a thermostat element (806) configured to receive a first analog control signal (341) and a second analog control signal (342) from a thermostat (201 or 800), where the thermostat element (806) is configured to rectify and combine the first analog control signal (341) and the second analog control signal (342) into a third analog control signal (343);
an HVAC element (814) configured to receive the third analog control signal (343) from thermostat element (806) and provide a fourth digital control signal (344) to the microprocessor (304) in response to the third analog control signal (343);
an Alternating Current to Direct Current (AC-DC) converter (303) configured to provide a fifth digital timing control signal (345) to the microprocessor (304) synchronous with a low voltage power signal from a system transformer (210);
a signal conditioning element (308) configured to receive an at least one sixth analog control signal (346) from the thermostat (201 or 800) and convert the at least one sixth analog control signal (346) to an at least one seventh digital control signal (347) provided to the microprocessor (304) wherein the at least one seventh digital control signal (347) is selected from the group consisting of: a digital fan signal, a digital AC/HP compressor signal, and a digital heat signal;
a first switching device (836) configured with a wired electrical output (212) or a wireless (WIFI) communication channel (847) for the microprocessor (304) to use an eighth digital control signal (348) to energize or de-energize at least one HVAC device (340) selected from the group consisting of: an AC/HP compressor (203), a HP reversing valve (263 or 264), and a heat source (202);
a second switching device (301) configured with a wired electrical output (212) or a wireless (WIFI) communication channel (847) for the microprocessor (304) to use a ninth digital control signal (349) to energize or de-energize a fan relay (205);
wherein the microprocessor (304) is further configured to perform at least one action selected from the group consisting of:
monitor a cooling cycle duration and determine a variable fan-off delay time based on the cooling cycle duration and at an end of the cooling on cycle, either activate or continue to active the ninth digital control signal (349) to operate the fan relay (205) until the variable fan-off delay time has expired; and
monitor a heating cycle duration and determine the variable fan-off delay time based on the heating cycle duration and at an end of a heating on cycle, either activate or continue to activate the ninth digital control signal (349) to operate the fan relay (205) until the variable fan-off delay time has expired.

2. The smart fan controller (817) of claim 1, wherein the first analog control signal (341) and the second analog control signal (342) are selected from the group consisting of: an analog fan signal, an analog Air Conditioning/Heat Pump (AC/HP) compressor signal, and an analog heat signal from a thermostat (201 or 800).

3. The smart fan controller (817) of claim 1, wherein a repurposed wire (810) is used to carry the third analog control signal (343) from the thermostat element (806) to the HVAC element (814).

4. The smart fan controller (817) of claim 1, wherein the fourth digital control signal (344) from the HVAC element (814) is at least one signal selected from the group consisting of: a zero Volts Direct Current (VDC) digital signal if there is a positively or negatively rectified signal from the thermostat element (806) and a non-zero VDC digital signal if there is no signal from the thermostat element (806).

5. The smart fan controller (817) of claim 1, wherein the low voltage power signal from the system transformer (210) converted by the AC-DC converter (303) is a 24 Volts Alternating Current (VAC) 60 Hertz (Hz) power signal from the system transformer (210).

6. The smart fan controller (817) of claim 1, wherein the first switching device (836) is energized by the eighth digital control signal (348) from the microprocessor (304), if the microprocessor determines that the first analog control signal (341) from the thermostat (201 or 800) is active or the second analog control signal (342) from the thermostat (201 or 800) is active.

7. The smart fan controller (817) of claim 1, wherein the first switching device (836) is energized by the eighth digital control signal (348) from the microprocessor (304), if the microprocessor determines that the fourth digital control signal (344) from the HVAC element (814) is zero VDC during a time when the fifth digital timing control signal (345) from the AC-DC converter (303) transitions to a positive or a negative edge.

8. The smart fan controller (817) of claim 1, wherein the second switching device (301) is energized by the ninth digital control signal (349) from the microprocessor (304), if the microprocessor determines that at least one control signal combination is met where the at least one control signal combination is selected from the group consisting of:
the fourth digital control signal (344) from the HVAC element (814) is zero VDC during a time when the fifth digital timing control signal (345) from the AC-DC converter (303) transitions to a positive or a negative edge wherein the microprocessor (304) activates the ninth digital control signal (349) immediately,
the fourth digital control signal (344) from the HVAC element (814) is non-zero VDC and the digital heat signal from the signal conditioning element (308) is zero VDC during a time when the fifth digital timing control signal (345) from the AC-DC converter (303) transitions to a positive or a negative edge wherein the microprocessor (304) activates the ninth digital control signal (349) at the end of the heating on cycle or after an initial fan-on delay,
the digital fan signal or the digital AC/HP signal from the signal conditioning element (308) is zero VDC during a time when the fifth digital timing control signal (345) from the AC-DC converter (303) transitions to a positive or a negative edge wherein the microprocessor (304) activates the ninth digital control signal (349) immediately, and
the digital fan signal from the signal conditioning element (308) is non-zero VDC and the fourth digital control signal (344) from the HVAC element (814) is zero VDC during a time when the fifth digital timing control signal (345) from the AC-DC converter (303) transitions to a positive or a negative edge wherein the microprocessor (304) activates the ninth digital control signal (349) at the end of the heating on cycle or after an initial fan-on delay.

9. The smart fan controller (817) of claim 1, wherein the second switching device (301) is energized by the ninth digital control signal (349) from the microprocessor (304), if the microprocessor determines at least one control signal combination is met where the at least one control signal combination is selected from the group consisting of:
the analog fan signal from the thermostat (201 or 800) is active wherein the microprocessor energizes the second switching device (301) immediately, and
the analog heat signal is active when the analog fan signal from the thermostat (201 or 800) and the analog AC/HP signal from the thermostat (201 or 800) are inactive wherein the microprocessor (304) activates the ninth digital control signal (349) at the end of the heating on cycle or after an initial fan-on delay.

10. The smart fan controller (817) of claim 1, wherein the cooling cycle comprises at least one cooling cycle selected from the group consisting of: a cooling on cycle, and a cooling off cycle.

11. The smart fan controller (817) of claim 1, wherein the heating cycle comprises at least one heating cycle selected from the group consisting of: a heating on cycle, and a heating off cycle.

12. The smart fan controller (817) of claim 1, wherein the signal conditioning element (308) includes at least one electrical input (845) having at least one Zener diode between the at least one electrical input (845) and an optoisolator (856) to differentiate an active analog thermostat control signal from a stray voltage signal in order to deliver a correct digital control signal to the microprocessor (304).

13. The smart fan controller (817) of claim 1, wherein the smart fan controller (817) is embodied in a Forced Air Unit (FAU) control board (293) or the thermostat (201 or 800).

14. The smart fan controller (817) of claim 1, wherein the system fan/blower (206) is controlled to a higher fan speed, higher than a lower fan speed used for heating, when the thermostat Fan G (204) signal is energized in cooling or heating modes based on at least one mechanism selected from the group consisting of:
a high-voltage Y-adapter (842) configured to combine two high-voltage signal outputs from a Forced Air Unit (FAU) control board (238) to enable the higher fan speed,
a wired or wireless (WIFI) software application (846) configured to command a switching device to enable the higher fan speed, and
a fan speed controller configured to identify an electrical signal waveform (848) when the thermostat G terminal is energized to enable the higher fan speed.

15. The smart fan controller (817) of claim 1, wherein a load resistor (852) is provided between the system transformer common (210a) and the smart fan controller (817) electrical inputs to avoid false thermostat activation signals for the system fan/blower (206).

16. The smart fan controller (817) of claim 1, wherein the microprocessor (304) is configured to:
monitor signals present or absent on a thermostat or equipment terminal (201) or a smart communicating thermostat (800) with a fan control having an AUTO setting and a fan-only ON setting to perform a fan-only Fault Detection Diagnostic (FDD) procedure;
detect and monitor the fan-only ON setting based on the presence of a fan signal and the absence of: a heat signal, a cool signal, and a fan signal during a fan-off delay;
correct a fan-only ON setting fault by de-energizing a fan relay (205) to override the fan-only ON setting after a Threshold Fan-on Time (TFT) has expired based on the presence throughout the TFT of the fan signal with or without a thermostat call for cooling or heating.

17. The smart fan controller (817) of claim 16, wherein the fan controller TFT can vary from 0 to 60 minutes.

18. A smart fan controller (817) for a Heating Ventilation Air Conditioning (HVAC) system, comprising:
a microprocessor (304);
a thermostat element (806) configured to receive a first analog control signal (341) and a second analog control signal (342) from a thermostat (201 or 800), where the thermostat element (806) is configured to rectify and combine the first analog control signal (341) and the second analog control signal (342) into a third analog control signal (343);

an HVAC element (814) configured to receive the third analog control signal (343) from thermostat element (806) and provide a fourth digital control signal (344) to the microprocessor (304) in response to the third analog control signal (343);

an Alternating Current to Direct Current (AC-DC) converter (303) configured to provide a fifth digital timing control signal (345) to the microprocessor (304) synchronous with a low voltage power signal from a system transformer (210);

a signal conditioning element (308) configured to receive at least one sixth analog control signal (346) from the thermostat (201 or 800) and convert the at least one sixth analog control signal (346) to an at least one seventh digital control signal (347) provided to the microprocessor (304) wherein the at least one seventh digital control signal (347) is selected from the group consisting of: a digital fan signal, a digital AC/HP compressor signal, and a digital heat signal;

at least one electrical input for at least one temperature sensor measurement used by the microprocessor (304) to monitor at least one air temperature;

a first switching device (836) configured with a wired electrical output (212) or a wireless (WIFI) communication channel (847) for the microprocessor (304) to use an eighth digital control signal (348) to energize or de-energize at least one HVAC device (340) selected from the group consisting of: an AC/HP compressor (203), a HP reversing valve (263 or 264), and a heat source (202);

a second switching device (301) configured with a wired electrical output (212) or a wireless (WIFI) communication channel (847) for the microprocessor (304) to use a ninth digital control signal (349) to energize or de-energize a fan relay (205);

wherein the microprocessor (304) is further configured to perform at least one action selected from the group consisting of:

monitor a cooling cycle duration and determine a variable fan-off delay time based on the cooling cycle duration and at an end of the cooling on cycle, either activate or continue to active the ninth digital control signal (349) to operate the fan relay (205) until the variable fan-off delay time has expired;

monitor a heating cycle duration and determine the variable fan-off delay time based on the heating cycle duration and at an end of a heating on cycle, either activate or continue to activate the ninth digital control signal (349) to operate the fan relay (205) until the variable fan-off delay time has expired; and monitor the temperature sensor measurement, and at an end of the cooling cycle or heating cycle either energize or continue to energize the switching device (301) and the fan relay (205) to operate a system fan/blower (206) for the variable fan-off delay time to deliver additional cooling or heating energy to a conditioned space wherein the variable fan-off delay time is based on at least one Conditioned Space Temperature (CST) measurement threshold selected from the group consisting of: the CST reaches a heating fan-off delay differential offset (363), the CST reaches a cooling fan-off delay differential offset (374), and the CST reaches an inflection point where the rate of change of the CST with respect to time equals zero plus or minus a confidence interval tolerance.

19. The smart fan controller (817) of claim 18, wherein the heating fan-off delay differential offset (363) is within plus or minus 0.5 degrees Fahrenheit of the CST at the end of the thermostat call for heating which is equivalent to an upper limit thermostat differential temperature where the thermostat terminates a call for heating.

20. The smart fan controller (817) of claim 18, wherein the cooling fan-off delay differential offset (374) is within plus or minus 0.5 degrees Fahrenheit of the CST at the end of the thermostat call for cooling which is equivalent to a lower limit thermostat differential temperature where the thermostat terminates a call for cooling.

21. The smart fan controller (817) of claim 18, wherein the first analog control signal (341) and the second analog control signal (342) are selected from the group consisting of: an analog fan signal, an analog Air Conditioning/Heat Pump (AC/HP) compressor signal, and an analog heat signal from a thermostat (201 or 800).

22. The smart fan controller (817) of claim 18, wherein a repurposed wire (810) previously used to carry a single analog signal from the thermostat element (806) to HVAC Equipment Control Terminals 804, is used to carry the third analog control signal (343) from the thermostat element (806) to the HVAC element (814).

23. The smart fan controller (817) of claim 18, wherein the fourth digital control signal (344) from the HVAC element (814) is at least one signal selected from the group consisting of: a zero Volts Direct Current (VDC) digital signal if there is a positively or negatively rectified signal from the thermostat element (806) and a non-zero VDC digital signal if there is no signal from the thermostat element (806).

24. The smart fan controller (817) of claim 18, wherein the low voltage power signal from the system transformer (210) converted by the AC-DC converter (303) is a 24 Volts Alternating Current (VAC) 60 Hertz (Hz) power signal from the system transformer (210).

25. The smart fan controller (817) of claim 18, wherein the first switching device (836) is energized by the eighth digital control signal (348) from the microprocessor (304), if the microprocessor determines that the first analog control signal (341) from the thermostat (201 or 800) is active or the second analog control signal (342) from the thermostat (201 or 800) is active.

26. The smart fan controller (817) of claim 18, wherein the first switching device (836) is energized by the eighth digital control signal (348) from the microprocessor (304), if the microprocessor determines that the fourth digital control signal (344) from the HVAC element (814) is zero VDC during a time when the fifth digital timing control signal (345) from the AC-DC converter (303) transitions to a positive or a negative edge.

27. The smart fan controller (817) of claim 18, wherein the second switching device (301) is energized by the ninth digital control signal (349) from the microprocessor (304), if the microprocessor determines that at least one control signal combination is met where the at least one control signal combination is selected from the group consisting of:

the fourth digital control signal (344) from the HVAC element (814) is zero VDC during a time when the fifth digital timing control signal (345) from the AC-DC converter (303) transitions to a positive or a negative edge wherein the microprocessor (304) activates the ninth digital control signal (349) immediately, the fourth digital control signal (344) from the HVAC element (814) is non-zero VDC and the digital heat signal from the signal conditioning element (308) is zero VDC during a time when the fifth digital timing control signal (345) from the AC-DC converter (303) transitions to a positive or a negative edge wherein the microprocessor (304) activates the ninth digital control signal (349) at the end of the heating on cycle or after an initial fan-on delay, the digital fan signal or the digital AC/HP signal from the signal conditioning element (308) is zero VDC during a time when the fifth digital timing control signal (345) from the AC-DC converter (303) transitions to a positive or a negative edge wherein the microprocessor (304) activates the ninth digital control signal (349) immediately, and the digital fan signal from the signal conditioning element (308) is non-zero VDC and the fourth digital control signal (344) from the HVAC element (814) is zero VDC during a time when the fifth digital timing control signal (345) from the AC-DC converter (303) transitions to a positive or a negative edge wherein the microprocessor (304) activates the ninth digital control signal (349) at the end of the heating on cycle or after an initial fan-on delay.

28. The smart fan controller (817) of claim 18, wherein the second switching device (301) is energized by the ninth digital control signal (349) from the microprocessor (304), if the microprocessor determines at least one control signal combination is met selected from the group consisting of:
the analog fan signal from the thermostat (201 or 800) is active wherein the microprocessor energizes the second switching device (301) immediately, and
the analog heat signal is active when the analog fan signal from the thermostat (201 or 800) and the analog AC/HP signal from the thermostat (201 or 800) are inactive wherein the microprocessor (304) activates the ninth digital control signal (349) at the end of the heating on cycle or after an initial fan-on delay.

29. The smart fan controller (817) of claim 18, wherein the cooling cycle is selected from the group consisting of: a cooling on cycle, and a cooling off cycle.

30. The smart fan controller (817) of claim 18, wherein the heating cycle is selected from the group consisting of: a heating on cycle, and a heating off cycle.

31. The smart fan controller (817) of claim 18, wherein the signal conditioning element (308) includes at least one electrical input (845) having at least one Zener diode between the at least one electrical input (845) and an optoisolator (856) to differentiate an active analog thermostat control signal from a stray voltage signal in order to deliver a correct digital control signal to the microprocessor (304).

32. The smart fan controller (817) of claim 18, wherein the smart fan controller (817) is embodied in a Forced Air Unit (FAU) control board (293) or the thermostat (201 or 800).

33. The smart fan controller (817) of claim 18, wherein the system fan/blower (206) is controlled to a higher fan speed, higher than a lower fan speed used for heating, when the thermostat Fan G (204) signal is energized in cooling or heating modes based on at least one mechanism selected from the group consisting of:
a high-voltage Y-adapter (842) configured to combine two high-voltage signal outputs from a Forced Air Unit (FAU) control board (238) to enable the higher fan speed,
a wired or wireless (WIFI) software application (846) configured to command a switching device to enable the higher fan speed, and
a fan speed controller configured to identify an electrical signal waveform (848) when the thermostat G terminal is energized to enable the higher fan speed.

34. The smart fan controller (817) of claim 18, wherein a load resistor (852) is provided between the system transformer common (210*a*) and the smart fan controller (817) electrical inputs to avoid false thermostat activation signals for the system fan/blower (206).

35. The smart fan controller (817) of claim 18, wherein the microprocessor (304) is configured to:
monitor signals present or absent on a thermostat or equipment terminal (201) or a smart communicating thermostat (800) with a fan control having an AUTO setting and a fan-only ON setting to perform a fan-only Fault Detection Diagnostic (FDD) procedure;
detect and monitor the fan-only ON setting based on the presence of a fan signal and the absence of: a heat signal, a cool signal, and a fan signal during a fan-off delay;
correct a fan-only ON setting fault by de-energizing a fan relay (205) to override the fan-only ON setting after a Threshold Fan-on Time (TFT) based on the presence throughout the TFT of the fan-only signal with or without a thermostat call for cooling or heating.

36. The smart fan controller (817) of claim 35, wherein the fan controller TFT can vary from 0 to 60 minutes.

37. A smart fan controller for a Heating Ventilation Air Conditioning (HVAC) system, comprising:
a microprocessor (304);
at least one electrical input (845) to receive at least one HVAC control signal (341) from a thermostat or equipment control terminal (201) or a smart communicating thermostat (800) wherein the at least one HVAC control signal (341) is selected from the group consisting of: a fan signal, an Air Conditioning/Heat Pump (AC/HP) compressor signal, and a heat signal;
a signal conditioning element (308) configured to receive the at least one HVAC control signal (341) and convert the at least one HVAC control signal (341) to at least one digital control signal (347) provided to the microprocessor (304) wherein the at least one digital HVAC control signal (347) is selected from the group consisting of: a digital fan signal, a digital AC/HP compressor signal, and a digital heat signal;
an Alternating Current to Direct Current (AC-DC) converter (303) configured to provide a digital timing control signal (345) to the microprocessor (304) synchronous with a low voltage power signal from a system transformer (210);
a switching device (301) configured with a wired electrical output (212) or a wireless (WIFI) communication channel (847) for the microprocessor (304) to energize or de-energize a fan relay (205);
wherein the microprocessor (304) is further configured to perform at least one action selected from the group consisting of:
monitor a cooling cycle duration and determine a variable fan-off delay time based on the cooling cycle duration and at an end of the cooling on cycle, either energize or continue to energize the fan relay (205) until the variable fan-off delay time has expired in order to improve energy efficiency; and
monitor a heating cycle duration and determine the variable fan-off delay time based on the heating cycle duration and at an end of a heating on cycle, either energize or continue to energize fan relay (205) until the variable fan-off delay time has expired in order to improve energy efficiency.

38. The smart fan controller of claim 37, wherein the low voltage power signal from the system transformer (210) converted by the AC-DC converter (303) is a 24 Volts Alternating Current (VAC) 60 Hertz (Hz) power signal from the system transformer (210).

39. The smart fan controller of claim 37, wherein the switching device (301) is energized by the microprocessor (304), if the microprocessor determines that at least one control signal combination is met where the at least one control signal combination is selected from the group consisting of:
the digital fan signal is zero VDC, during a time when the digital timing HVAC control signal (345) transitions to a positive or a negative edge wherein the microprocessor (304) energizes the switching device (301) and the fan relay (205) immediately, and
the digital fan signal is non-zero VDC and the digital heat signal is zero VDC during a time when the digital timing HVAC control signal (345) transitions to a positive or a negative edge wherein the microprocessor (304) energizes the switching device (301) and the fan relay (205) at the end of a heating on cycle or after an initial fan-on delay.

40. The smart fan controller of claim 37, wherein the switching device (301) is energized by the microprocessor (304), if the microprocessor determines at least one control signal combination is met where the at least one control signal combination is selected from the group consisting of:
the fan signal is active wherein the microprocessor energizes the switching device (301) immediately, and
the heat signal is active when the fan signal is inactive or the AC/HP signal is inactive wherein the microprocessor (304) energizes the switching device (301) at the end of the heating on cycle or after an initial fan-on delay.

41. The smart fan controller of claim 37, wherein the cooling cycle is selected from the group consisting of: a cooling on cycle, and a cooling off cycle.

42. The smart fan controller of claim 37, wherein the heating cycle is selected from the group consisting of: a heating on cycle, and a heating off cycle.

43. The smart fan controller of claim 37, wherein the signal conditioning element (308) includes at least one electrical input (845) having at least one Zener diode between the at least one electrical input (845) and an optoisolator (856) to differentiate an active analog thermostat control signal from a stray voltage signal in order to deliver a correct digital control signal to the microprocessor (304).

44. The smart fan controller of claim 37, wherein the smart fan controller is embodied in a Forced Air Unit (FAU) control board (293) or a thermostat (201 or 800).

45. The smart fan controller of claim 37, wherein the system fan/blower (206) is controlled to a higher fan speed, higher than a lower fan speed used for heating, when the thermostat Fan G (204) signal is energized in cooling or heating modes based on at least one mechanism selected from the group consisting of:
a high-voltage Y-adapter (842) configured to combine two high-voltage signal outputs from a Forced Air Unit (FAU) control board (238) to enable the higher fan speed,
a wired or wireless (WIFI) software application (846) configured to command a switching device to enable the higher fan speed, and
a fan speed controller configured to identify an electrical signal waveform (848) when the thermostat G terminal is energized to enable the higher fan speed.

46. The smart fan controller of claim 37, wherein a load resistor (852) is provided between the system transformer common (210a) and the smart fan controller electrical inputs to avoid false thermostat activation signals for the system fan/blower (206).

47. The smart fan controller of claim 37, wherein the microprocessor (304) is configured to:
monitor signals present or absent on a thermostat or equipment terminal (201) or a smart communicating thermostat (800) with a fan control having an AUTO setting and a fan-only ON setting to perform a fan-only Fault Detection Diagnostic (FDD) procedure;
detect and monitor the fan-only ON setting based on the presence of a fan signal and the absence of: a heat signal, a cool signal, and a fan signal during a fan-off delay;
correct a fan-only ON setting fault by de-energizing a fan relay (205) to override the fan-only ON setting after a Threshold Fan-on Time (TFT) based on the presence throughout the TFT of the fan-only signal with or without a thermostat call for cooling or heating.

48. The smart fan controller of claim 47, wherein the fan controller TFT can vary from 0to 60 minutes.

49. A smart fan controller for a Heating Ventilation Air Conditioning (HVAC) system, comprising:
a microprocessor (304);
at least one wired electrical input (845) or a wireless (WIFI) communication channel (847) to receive at an least one HVAC control signal (341) from a thermostat or equipment control terminal (201) or a smart communicating thermostat (800), wherein the at least one HVAC control signal (341) is selected from the group consisting of: a fan signal, an Air Conditioning/Heat Pump (AC/HP) compressor signal, and a heat signal;
a signal conditioning element (308) configured to receive the at least one HVAC control signal (341) and convert the at least one HVAC control signal (341) to at least one digital control signal (347) provided to the microprocessor (304) wherein the at least one digital HVAC control signal (347) is selected from the group consisting of: a digital fan signal, a digital AC/HP compressor signal, and a digital heat signal;
an Alternating Current to Direct Current (AC-DC) converter (303) configured to provide a digital timing control signal (345) to the microprocessor (304) synchronous with a low voltage power signal from a system transformer (210);
a switching device (301) configured with a wired electrical output (212) or a wireless (WIFI) communication channel (847) for the microprocessor (304) to energize or de-energize a fan relay (205);
wherein the microprocessor (304) is configured to:
monitor signals present or absent on a thermostat or equipment terminal (201) or a smart communicating thermostat (800) with a fan control having an AUTO setting and a fan-only ON setting to perform a fan-only Fault Detection Diagnostic (FDD) procedure;

detect and monitor the fan-only ON setting based on the presence of a fan signal and the absence of: a heat signal, a cool signal, and a fan signal during a fan-off delay;

correct a fan-only ON setting fault by de-energizing a fan relay (205) to override the fan-only ON setting after a Threshold Fan-on Time (TFT) based on the presence throughout the TFT of the fan-only signal with or without a thermostat call for cooling or heating.

50. The smart fan controller of claim 49, wherein the fan controller TFT can vary from 0 to 60 minutes.

* * * * *